United States Patent [19]
Sampson et al.

[11] Patent Number: 5,802,499
[45] Date of Patent: Sep. 1, 1998

[54] METHOD AND SYSTEM FOR PROVIDING CREDIT SUPPORT TO PARTIES ASSOCIATED WITH DERIVATIVE AND OTHER FINANCIAL TRANSACTIONS

[75] Inventors: Gerald P. Sampson, Luxembourg, Luxembourg; Melvin Strauss, Great Neck, N.Y.; Kathleen Tyson-Quah, London, United Kingdom; Jorge Haddock, Clifton Park, N.Y.; Thomas S. Sime, Luxembourg, Luxembourg

[73] Assignee: Cedel Bank, Luxembourg, Luxembourg

[21] Appl. No.: 501,901

[22] Filed: Jul. 13, 1995

[51] Int. Cl.$^6$ .................................................. G06F 17/60
[52] U.S. Cl. ........................................................ 705/35
[58] Field of Search ................................. 395/235, 236, 395/237, 238, 239, 380; 705/35, 36, 37, 38, 39

[56] References Cited

U.S. PATENT DOCUMENTS

| | | | |
|---|---|---|---|
| 5,285,383 | 2/1994 | Lindsey et al. | 395/237 |
| 5,375,055 | 12/1994 | Togher et al. | |
| 5,497,317 | 3/1996 | Hawkings et al. | |
| 5,563,783 | 10/1996 | Stolfo et al. | 395/236 |

FOREIGN PATENT DOCUMENTS

| | | |
|---|---|---|
| 0512702 | 11/1992 | European Pat. Off. |
| 9428496 | 12/1994 | WIPO |
| 9618160 | 6/1996 | WIPO |

OTHER PUBLICATIONS

Hybrid Instrument Transaction Service, Hybrid Instrument Service, cir. 1995.
"Collateralization Becomes More Important In Derivative Transactions, But Legal Roadblocks Must Be Removed (or Avoided)" by Takuhide Mitsui and Kunsen Gen, Derivatives, Mar./Apr. 1996, 6 pages.
"OTC Overtures", Clearing & Settlement, May/Jun. 1995, 2 pages.
"All Clear For Swaps?", International Financial, May 31, 1995, 2 pages.
"Proposal For A Swaps Clearing House/Swaps Depository", by the Chicago Board of Trade Clearing Corporation, May 18, 1995, 4 pages.
"A Long Unwinding Road", by Mark Johnson, Futures & Options World, May 1995, 2 pages.
"Managing Collateral On Exchanges and Off: A New Perspective" by Todd E. Petzel, The Journal of Derivatives, Spring 1995, 9 pages.
"Swaps Depository Deal Welcomed As A Timely Move" by Richard Metcalfe, Banking Technology, Feb. 1995, 1 page.
"Private-Sector Initiatives for Swaps Taking Shape" by Laurie Morse, 2 pages.
"Collateral Co-Operation", International Financial Products, Dec. 14, 1994, 1 page.
Swap Service Bureau, Chicago Board of Trade Clearing Corporation, Dec. 14, 1994, 8 pages.
"CME To Centralise Trade In Swaps Deals", The Financial Times, Dec. 9, 1994, 1 page.

(List continued on next page.)

*Primary Examiner*—Robert A. Weinhardt
*Assistant Examiner*—Thanh-Hang Voqui
*Attorney, Agent, or Firm*—Hopgood, Calimafde, Kalil & Judlowe

[57] ABSTRACT

A computer-based information network for managing credit exposure between counterparties to a plurality of credit support agreements. The network comprises information storage and processing systems. The systems store various types of information including information representative of assets of counterparties to a plurality of credit support agreements for use in covering credit exposures therebetween over a specified time period, and the plurality of credit support agreements. The systems process the information representative of the assets in order to effectively reflect a movement of certain of the assets to cover the credit exposures over the specified time period. An asset movement optimization process is used for determining an optimal movement of certain of said assets to cover credit exposures over the specified time period.

10 Claims, 52 Drawing Sheets

OTHER PUBLICATIONS

"Survey of Global Custody: Custodians Face Rising Demand—Derivates—The Growth of the Industry" by Richard Lapper, The Financial Times, Nov. 29, 1994, 2 pages.

"International Capital Markets: Study Calls For Exchange to Clear OTC Contracts—Derivatives", by Richard Lapper, The Financial Times, Nov. 17, 1994, 2 pages.

"Cedel In Talks on Collateral For OTC Derivatives" by Adam Bradbery, The Dow Jones Capital, Jun. 13, 1994, 2 pages.

"Mark-to-Market Arrangements" by Joseph H. Levie, et al., New York Law Journal, Apr. 7, 1994, 4 pages.

"The Potential for Clearing House Arrangements in the OTC Derivatives Market" by the Chicago Board of Trade Clearing Corporation, Mar. 11, 1994, 13 pages.

"All The World's A Stage" by Mark Harding and Barry Yin, Clearing Business, 1993, 3 pages.

"Reducing Credit Risk In Over-The-Counter Derivatives" by John P. Behor, Federal Reserve Bank of Chicago, Circa 1995, 11 pages.

"CME Swaps Collateral Depository Report".

"Hybrid Instrument Transation Service (HITS) Overview", Hybrid Instrument Service, Circa 1995, 6 pages.

CUSTOMER ACCOUNT

NATIVE ATTRIBUTES:

| | | | |
|---|---|---|---|
| ID | <1 - 1> | IDENTIFIER | CONCATENATION OF: |
| ID | | GCSS CUSTOMER NUMBER | |
| ID | <1 - 1> | GCSS CUSTOMER NUMBER | INFO TYPE: ACCOUNT NUMBER GCSS |
| ID | <1 - 1> | CUSTOMER LONG NAME | INFO TYPE: ALPHANUMERIC35 |
| ID | <1 - 1> | CUSTOMER SHORT NAME | INFO TYPE: ALPHANUMERIC15 |
| | <1 - 1> | ACCOUNT STATUS | INFO TYPE: ACCOUNT GCSS STATUS CODE |
| | <0 - 1> | MAIN CEDEL ACCOUNT NUMBER | INFO TYPE: ACCOUNT NUMBER |
| | <0 - 1> | SWIFT ADDRESS | INFO TYPE: ALPHANUMERIC20 |
| | <0 - 1> | PARENT ACCOUNT NUMBER | INFO TYPE: ACCOUNT NUMBER GCSS |
| | <0 - 1> | DATE OF MEMBERSHIP | INFO TYPE: DATE |
| | <0 - 1> | GCSS OPERATING AGREEMENT REFERENCE | INFO TYPE: ALPHANUMERIC15 |
| | <0 - 1> | GCSS AGREEMENT SIGNED DATE | INFO TYPE: DATE |
| | <0 - 1> | ADDRESS | INFO TYPE: COMMENTS 120 |
| | <0 - 1> | CITY | INFO TYPE: ALPHANUMERIC25 |
| | <0 - 1> | STATE | INFO TYPE: ALPHANUMERIC25 |
| | <0 - 1> | COUNTRY | INFO TYPE: ALPHANUMERIC25 |
| | <0 - 1> | POSTAL CODE | INFO TYPE: ALPHANUMERIC15 |
| | <0 - 1> | TELEPHONE NUMBER | INFO TYPE: ALPHANUMERIC20 |
| | <0 - 1> | FAX NUMBER | INFO TYPE: ALPHANUMERIC20 |
| | <0 - 1> | BILLING ADRESS | INFO TYPE: COMMENTS 120 |
| | <0 - 1> | GEOGRAPHIC REGION | INFO TYPE: COUNTRY CODE |
| | <0 - 1> | DEFAULT HOLIDAY CALENDAR | INFO TYPE: HOLIDAY CALENDAR CODE |
| | <1 - 1> | ALLOW AGREEMENTS FLAG | INFO TYPE: INDICATOR |
| | <0 - 1> | ACCOUNT OPENED TIMESTAMP | INFO TYPE: TIMESTAMP HHMMDDMMYY |
| | <0 - 1> | ACCOUNT OPENED BY | INFO TYPE: USER IDENTIFIER |
| | <1 - 1> | PUBLISHED ACCOUNT FLAG | INFO TYPE: INDICATOR |
| | <1 - 1> | NON GCSS CUSTOMER FLAG | INFO TYPE: INDICATOR |

INHERITED ATTRIBUTES:
*NO INHERITED ATTRIBUTES DEFINED*

NATIVE RELATIONSHIPS:
CASH PROCESSED BY <0 - M> CUSTOMER CASH CORRESPONDENT
    [ HANDLES CASH <1 - 1> CUSTOMER ACCOUNT ]
SECURITY DELIVERIES FIXED BY <0 - M> CUSTOMER ORIGINAL ASSET RULES
    [ CONTROL SECURITY MOVEMENT FOR <1 - 1> CUSTOMER ACCOUNT ]
BUSINESS WITH CPTY FIXED BY <0 - M> CUSTOMER CREDIT AGREEMENT
    [ DETERMINES BUSINESS FOR <1 - 1> CUSTOMER ACCOUNT ]
HAS RULES FOR <0 - M> CUSTOMER PREFERENCE
    [ DEFINES RULES FOR <1 - 1> CUSTOMER ACCOUNT ]
IS CONTROLLER OF <0 - M> CUSTOMER ACCOUNT
    [ DEFINES RULES FOR <1 - 1> CUSTOMER ACCOUNT ]
HAS ACCESS VIA <0 - M> ACCESS RIGHTS PROFILE
    [ IS CONTROLLED BY <0 - 1> CUSTOMER ACCOUNT ]
DEFINES <0 - M> CUSTOMER ELIGIBILITY
    [ DEFAULT ACCEPTED ASSETS FOR <1 - 1> CUSTOMER ACCOUNT ]
HAS ASSETS WITHIN <0 - M> ASSET POSITION
    [ CONTROLLED BY <1 - 1> CUSTOMER ACCOUNT ]

INHERITED RELATIONSHIPS:
*NO INHERITED RELATIONSHIPS DEFINED*

FIG. 4A

| ACCESS RIGHT PROFILE | | | |
|---|---|---|---|
| ID | NATIVE ATTRIBUTES: | | |
| | <1 - 1> | IDENTIFIER | CONCATENATION OF: |
| | | CUSTOMER NUMBER | |
| | | USER REFERENCE | |
| | <1 - 1> | USER REFERENCE | INFO TYPE: USER IDENTIFIER |
| | <1 - 1> | CUSTOMER NUMBER | INFO TYPE: ACCOUNT NUMBER GCSS |
| | <0 - 1> | SUPER USER RIGHTS | INFO TYPE: INDICATOR |
| | <0 - 1> | NO ACCESS RIGHTS | INFO TYPE: INDICATOR |
| | <1 - 1> | ABILITY TO AUTHORISE NEW USERS | INFO TYPE: INDICATOR |
| | <0 - 1> | ABILITY TO ADD SUB-ACCOUNTS | INFO TYPE: INDICATOR |
| | <1 - 1> | ABILITY TO VIEW ACCOUNT | INFO TYPE: INDICATOR |
| | <0 - 1> | ABILITY TO VALUE CREDIT SUPPORT | INFO TYPE: INDICATOR |
| | <0 - 1> | ABILITY TO UPGRADE AGREEMENTS | INFO TYPE: INDICATOR |
| | <0 - 1> | ABILITY TO RELEASE COLLATERAL | INFO TYPE: INDICATOR |
| | <1 - 1> | ABILITY SEND DELIVERY INSTRUCT | INFO TYPE: INDICATOR |
| | <1 - 1> | ABILITY SET MASTER CUSTOMER DATA | INFO TYPE: INDICATOR |
| | <1 - 1> | ABILITY TO FREEZE ASSETS | INFO TYPE: INDICATOR |
| | <0 - 1> | ABILITY TO DEFAULT AGREEMENT | INFO TYPE: INDICATOR |
| | <0 - 1> | ID SETUP DATE | INFO TYPE: DATE |
| | <0 - 1> | AUTHORISED BY | INFO TYPE: USER IDENTIFIER |

INHERITED ATTRIBUTES:
\*\*\*NO INHERITED ATTRIBUTES DEFINED\*\*\*

NATIVE RELATIONSHIPS:
  DEFINES THE ACCESS FOR <1 - 1> CONTACT DETAIL
 [ ACCESS TO GCSS CONTROLLED BY < 0 - M> ACCESS RIGHTS PROFILE ]
    CONTROLS ACCESS TO <1 - 1> CUSTOMER ACCOUNT
 [ HAS ACCESS  VIA < 0 - M> ACCESS RIGHTS PROFILE ]

INHERITED RELATIONSHIPS:
  \*\*\*NO INHERITED RELATIONSHIPS DEFINED\*\*\*

FIG. 4B

| CONTACT DETAIL |
|---|

NATIVE ATTRIBUTES:
- ID <1 - 1> IDENTIFIER    CONCATENATION OF:
    USER REFERENCE
- ID <1 - 1> USER REFERENCE    INFO TYPE: USER IDENTIFIER
- ID <1 - 1> USER NAME    INFO TYPE: ALPHANUMERIC35
- <1 - 1> CUSTOMER FLAG    INFO TYPE: INDICATOR
- <1 - 1> TYPE    INFO TYPE: ALPHANUMERIC30
- <0 - 1> FAX    INFO TYPE: ALPHANUMERIC25
- <0 - 1> PHONE    INFO TYPE: ALPHANUMERIC25
- <1 - 1> TITLE    INFO TYPE: ALPHANUMERIC5
- <0 - 1> TELEX    INFO TYPE: ALPHANUMERIC20

INHERITED ATTRIBUTES:
*NO INHERITED ATTRIBUTES DEFINED*

NATIVE RELATIONSHIPS:
ACCESS TO GCSS CONTROLLED BY < 0 - M> ACCESS RIGHTS PROFILE
  [ DEFINES THE ACCESS FOR <1 - 1> CONTACT DETAIL ]

INHERITED RELATIONSHIPS:
*NO INHERITED RELATIONSHIPS DEFINED*

FIG. 4C

| CUSTOMER ORIGINAL ASSET RULES |
|---|

NATIVE ATTRIBUTES:
- ID <1 - 1> IDENTIFIER    CONCATENATION OF:
    CUSTOMER ACCOUNT
    ASSET TYPE
- <1 - 1> CUSTOMER ACCOUNT    INFO TYPE: ACCOUNT NUMBER GCSS
- <1 - 1> ASSET TYPE    INFO TYPE: ASSET TYPE CODE
- <1 - 1> STANDART VALUATION PERCENTAGE    INFO TYPE: NUMERIC 3
- <0 - 1> DELIVERY SYSTEM    INFO TYPE: DELIVERY SYSTEM CODE
- <0 - 1> LCS ACCOUNT NUMBER    INFO TYPE: ACCOUNT NUMBER
- <0 - 1> FOR ACCOUNT OF    INFO TYPE: ALPHANUMERIC25
- <0 - 1> IN FAVOUR OF    INFO TYPE: ALPHANUMERIC25

INHERITED ATTRIBUTES:
*NO INHERITED ATTRIBUTES DEFINED*

NATIVE RELATIONSHIPS:
  CONTROL SECURITY MOVEMENTS FOR <1 - 1>
  CUSTOMER ACCOUNT
  [ SECURITY DELIVERIES FIXED BY <0 - M>
  CUSTOMER ORIGINAL ASSET RULES ]

INHERITED RELATIONSHIPS:
  *NO INHERITED RELATIONSHIPS DEFINED*

FIG. 4D

| CUSTOMER PREFERENCE |
|---|

NATIVE ATTRIBUTES:

ID   <1 - 1>   IDENTIFIER     CONCATENATION OF:
                        CUSTOMER NUMBER
                        ASSET IDENTIFIER
                        ASSET TYPE

<1 - 1>   CUSTOMER NUMBER     INFO TYPE: ACCOUNT NUMBER GCSS
    <0 - 1>   ASSET TYPE             INFO TYPE: ASSET TYPE CODE
    <0 - 1>   ASSET IDENTIFIER       INFO TYPE: ASSET IDENTIFIER
    <0 - 1>   USAGE PRIORITY         INFO TYPE: NUMERIC 1
    <1 - 1>   HOLD ASSET FLAG       INFO TYPE: INDICATOR

INHERITED ATTRIBUTES:
*NO INHERITED ATTRIBUTES DEFINED*
NATIVE RELATIONSHIPS:
    DEFINES RULES FOR < 1 - 1> CUSTOMER ACCOUNT
        [ HAS RULES FOR <0 - M> CUSTOMER PREFERENCE ]
INHERITED RELATIONSHIPS:
*NO INHERITED RELATIONSHIPS DEFINED*

FIG. 4E

| CUSTOMER ELIGIBILITY |
|---|

NATIVE ATTRIBUTES:

ID   <1 - 1>   IDENTIFIER     CONCATENATION OF:
                        CUSTOMER NUMBER
                        ASSET TYPE CODE
                        ASSET IDENTIFIER

<1 - 1>   CUSTOMER NUMBER     INFO TYPE: ACCOUNT NUMBER GCSS
    <0 - 1>   ASSET TYPE CODE       INFO TYPE: ASSET TYPE CODE
    <0 - 1>   ASSET IDENTIFIER       INFO TYPE: ASSET IDENTIFIER
    <1 - 1>   ACCEPT ASSET FLAG     INFO TYPE: INDICATOR
    <1 - 1>   ACCEPT ON-TRANSFER FLAG     INFO TYPE: INDICATOR
    <1 - 1>   ALLOW ON-TRANSFER ORIGINAL ONLY     INFO TYPE: INDICATOR
    <1 - 1>   ALLOW ON-TRANSFER ALL     INFO TYPE: INDICATOR
    <1 - 1>   ALLOW REPO ORIGINAL ONLY     INFO TYPE: INDICATOR
    <1 - 1>   ALLOW REPO ALL FLAG     INFO TYPE: INDICATOR

INHERITED ATTRIBUTES:
*NO INHERITED ATTRIBUTES DEFINED*
NATIVE RELATIONSHIPS:
    DEFAULT ACCEPTED ASSETS FOR <1 - 1> CUSTOMER ACCOUNT
        [ DEFINES < 0 - M> CUSTOMER ELIGIBILITY ]
INHERITED RELATIONSHIPS:
    *NO INHERITED RELATIONSHIPS DEFINED*

FIG. 4F

```
┌─────────────────────────────────────────────────────────────┐
│  CUSTOMER CASH CORRESPONDENT                                │
├──┬──────────────────────────────────────────────────────────┤
│  │ NATIVE ATTRIBUTES:                                       │
│ID│   <1 - 1>   IDENTIFIER      CONCATENATION OF:            │
│  │                CUSTOMER ACCOUNT                          │
│  │                CURRENCY CODE                             │
│  │   <1 - 1>   CUSTOMER ACCOUNT   INFO TYPE: ACCUONT NUMBER GCSS │
│  │   <1 - 1>   CURRENCY CODE      INFO TYPE: CURRENCY CODE  │
│  │   <0 - 1>   PAY TO             INFO TYPE: ALPHANUMERIC25 │
│  │   <0 - 1>   CASH ACCOUNT       INFO TYPE: ALPHANUMERIC25 │
│  │   <0 - 1>   PAYMENT IN FAVOUR  INFO TYPE: ALPHANUMERIC25 │
│  │ INHERITED ATTRIBUTES:                                    │
│  │ *NO INHERITED ATTRIBUTES DEFINED*                    │
│  │ NATIVE RELATIONSHIPS:                                    │
│  │    HANDLES CASH < 1 - 1> CUSTOMER ACCOUNT                │
│  │    [ CASH PROCESSED BY <0 - M> CUSTOMER CASH CORRESPONDENT ] │
│  │ INHERITED RELATIONSHIPS:                                 │
│  │ *NO INHERITED RELATIONSHIPS DEFINED*                 │
└──┴──────────────────────────────────────────────────────────┘
```

FIG. 4G

```
┌─────────────────────────────────────────────────────────────┐
│  MASTER                                                     │
├──┬──────────────────────────────────────────────────────────┤
│  │ NATIVE ATTRIBUTES:                                       │
│ID│   <1 - 1>   IDENTIFIER      CONCATENATION OF:            │
│  │                COMPANY NAME SHORT                        │
│ID│   <1 - 1>   COMPANY NAME FULL       INFO TYPE: ALPHANUMERIC45 │
│ID│   <1 - 1>   COMPANY NAME SHORT      INFO TYPE: ALPHANUMERIC20 │
│ID│   <1 - 1>   SYSTEM DATE             INFO TYPE: DATE      │
│ID│   <1 - 1>   OPTIMISATION RUNNING FLAG  INFO TYPE: INDICATOR │
│ID│   <1 - 1>   TIMEZONE INDICATOR      INFO TYPE: TIMEZONE CODE │
│ID│   <1 - 1>   OPTIMISATION START TIMESTAMP  INFO TYPE: TIMESTAMP HHMMDDMMYY │
│ID│   <1 - 1>   OPTIMISATION END TIMESTAMP    INFO TYPE: TIMESTAMP HHMMDDMMYY │
│ID│   <1 - 1>   CEDEL OMNIBUS ACCOUNT   INFO TYPE: ACCOUNT NUMBER │
│  │ INHERITED ATTRIBUTES:                                    │
│  │ *NO INHERITED ATTRIBUTES DEFINED*                    │
│  │ NATIVE RELATIONSHIPS:                                    │
│  │    *NO NATIVE RELATIONSHIPS DEFINED*                 │
│  │ INHERITED RELATIONSHIPS:                                 │
│  │    *NO INHERITED RELATIONSHIPS DEFINED*              │
└──┴──────────────────────────────────────────────────────────┘
```

FIG. 4H

CUSTOMER GREDIT AGREEMENT

NATIVE ATTRIBUTES:

ID

| | | |
|---|---|---|
| <1 - 1> | IDENTIFIER | CONCATENATION OF: |
| | GCSS AGREEMENT NUMBER | |
| | CUSTOMER NO | |
| | VERSION NUMBER | |
| <1 - 1> | GCSS AGREEEMENT NUMBER | INFO TYPE: CREDIT SUPPORT AGREEMENT NO |
| <1 - 1> | CUSTOMER NO | INFO TYPE: ACCOUNT NUMBER GCSS |
| <1 - 1> | VERSION NUMBER | INFO TYPE: VERSION NO |
| <1 - 1> | CUSTOMER ONE OR TWO | INFO TYPE: NUMERIC 1 |
| <0 - 1> | CUSTOMER INTERNAL AGREEMENT NO | INFO TYPE: ALPHANUMERIC20 |
| <0 - 1> | INDEPENDENT AMOUNT | INFO TYPE: AMOUNT 15 0 |
| <0 - 1> | INDEPENDENT AMOUNT CCY | INFO TYPE: CURRENCY CODE |
| <0 - 1> | THRESHOLD AMOUNT | INFO TYPE: AMOUNT 15 0 |
| <0 - 1> | THRESHOLD CCY | INFO TYPE: CURRENCY CODE |
| <0 - 1> | MINIMUM TRANSFER AMOUNT | INFO TYPE: AMOUNT 15 0 |
| <0 - 1> | MINIMUM TRANSFER CCY | INFO TYPE: CURRENCY CODE |
| <0 - 1> | ROUNDUP VALUE | INFO TYPE: AMOUNT 15 0 |
| <0 - 1> | ROUNDUP VALUE CCY | INFO TYPE: CURRENCY CODE |
| <0 - 1> | ROUNDUP AMOUNT | INFO TYPE: AMOUNT 15 0 |
| <0 - 1> | ROUNDUP AMOUNT CCY | INFO TYPE: CURRENCY CODE |
| <0 - 1> | BASIC AMOUNT | INFO TYPE: AMOUNT 15 0 |
| <0 - 1> | BASIC AMOUNT CCY | INFO TYPE: CURRENCY CODE |
| <1 - 1> | ROUNDUP TYPE | INFO TYPE: ROUNDUP TYPE CODE |
| <0 - 1> | HOLIDAY CALENDAR | INFO TYPE: HOLIDAY CALENDAR CODE |
| <1 - 1> | THRESHOLD CALCULATION METHOD | INFO TYPE: THRESHOLD CALCULATION CODE |
| <1 - 1> | ALLOW REPO FLAG | INFO TYPE: INDICATOR |
| <1 - 1> | ALLOW ON-TRANSFER FLAG | INFO TYPE: INDICATOR |
| <1 - 1> | INDEPENDENT AMOUNT NET FLAG | INFO TYPE: INDICATOR |
| <1 - 1> | SUM INDEP AND BASIC AMOUNT FLAG | INFO TYPE: INDICATOR |
| <0 - 1> | ENTRY DATE | INFO TYPE: DATE |
| <0 - 1> | ENTERED BY | INFO TYPE: USER IDENTIFIER |
| <0 - 1> | LAST MODIFIED DATE | INFO TYPE: DATE |
| <0 - 1> | LAST MODIFIED BY | INFO TYPE: USER IDENTIFIER |
| <0 - 1> | APPROVED TIMESTAMP | INFO TYPE: TIMESTAMP HHMMDDMMYY |
| <0 - 1> | APPROVED BY | INFO TYPE: USER IDENTIFIER |
| <1 - 1> | ONE WAY COVERAGE FLAG | INFO TYPE: INDICATOR |

INHERITED ATTRIBUTES:
*NO INHERITED ATTRIBUTES DEFINED*

NATIVE RELATIONSHIPS:
DETERMINES BUSINESS FOR <1 - 1> CUSTOMER ACCOUNT
    [ BUSINESS WITH CPTY FIXED BY <0 - M> CUSTOMER CREDIT AGREEMENT ]
HAS COMMON IN <1 - 1> COMMON CREDIT AGREEMENT
    [ OVERALL CONDITIONS FOR <0 - 2> CUSTOMER CREDIT AGREEMENT ]

FIG. 5A1

SECURITY USE FIXED BY <0-M> AGREEMENT ELIGIBLE COLLATERAL
  [ CONTROLS SECURITY USE OF <1-1> CUSTOMER CREDIT AGREEMENT ]
MAY HAVE <0-M> AGREEMENT PREFERENCE
  [ WILL CONTROLL <1-1> CUSTOMER CREDIT AGREEMENT ]
IS VALUED BY <0-M> CREDIT EXPOSURE
  [ VALUES <1-1> CUSTOMER CREDIT AGREEMENT ]
EXPOSURE COVERED BY <0-M> ASSET PLEDGE
  [ COVERS B <1-1> CUSTOMER CREDIT AGREEMENT ]
INHERITED RELATIONSHIPS:
*NO INHERITED RELATIONSHIPS DEFINED*

F I G. 5A2

---

AGREEMENT ELIGIBLE COLLATERAL

NATIVE ATTRIBUTES:
ID  <1-1>  IDENTIFIER      CONCATENATION OF:
              VERSION NUMBER
              CUSTOMER CREDIT AGREEMENT NUMBER
              CUSTOMER NUMBER
              ASSET TYPE CODE
              ASSET IDENTIFIER
    <1-1>  CUSTOMER CREDIT AGREEMENT NUMBER   INFO TYPE: CREDIT SUPPORT AGREEMENT NUMBER
    <1-1>  CUSTOMER NUMBER                    INFO TYPE: ACCOUNT NUMBER GCSS
    <1-1>  VERSION NUMBER                     INFO TYPE: VERSION NUMBER
    <0-1>  ASSET TYPE CODE                    INFO TYPE: ASSET TYPE CODE
    <0-1>  ASSET IDENTIFIER                   INFO TYPE: ASSET IDENTIFIER
    <1-1>  VALUATION PERCENTAGE               INFO TYPE: NUMERIC 3
    <1-1>  ACCEPT ASSET FLAG                  INFO TYPE: INDICATOR
    <1-1>  ACCEPT ON-TRANSFER FLAG            INFO TYPE: INDICATOR
    <1-1>  ALLOW ON-TRANSFER ORIGINAL ONLY    INFO TYPE: INDICATOR
    <1-1>  ALLOW ON-TRANSFER ALL              INFO TYPE: INDICATOR
    <1-1>  ALLOW REPO ORIGINAL ONLY           INFO TYPE: INDICATOR
    <1-1>  ALLOW REPO ALL FLAG

INHERITED ATTRIBUTES:
*NO INHERITED ATTRIBUTES DEFINED*

NATIVE RELATIONSHIPS:
  CONTROLS SECURITY USE OF <1-1> CUSTOMER CREDIT AGREEMENT
    [ SECURITY USE FIXED BY <0-M> AGREEMENT ELIGIBLE COLLATERAL ]

INHERITED RELATIONSHIPS:
*NO INHERITED RELATIONSHIPS DEFINED*

F I G. 5B

```
┌─────────────────────────────────────────────────────────────────────┐
│  AGREEMENT PREFERENCE                                               │
│ ┌───────────────────────────────────────────────────────────────────┤
│ │ NATIVE ATTRIBUTES:
│ID│    <1 - 1>   IDENTIFIER
│  │    <1 - 1>   VERSION NUMBER              INFO TYPE: VERSION NO
│  │    <1 - 1>   CUSTOMER CREDIT AGREEMENT NUMBER   INFO TYPE: CREDIT SUPPORT AGREEMENT NO
│  │    <1 - 1>   CUSTOMER NUMBER             INFO TYPE: ACCOUNT NUMBER GCSS
│  │    <0 - 1>   ASSET TYPE                  INFO TYPE: ASSET TYPE CODE
│  │    <0 - 1>   ASSET IDENTIFIER            INFO TYPE: ASSET IDENTIFIER
│  │    <0 - 1>   USAGE PRIORITY              INFO TYPE: NUMERIC 1
│  │ INHERITED ATTRIBUTES:
│  │ *NO INHERITED ATTRIBUTES DEFINED*
│  │
│  │ NATIVE RELATIONSHIPS:
│  │    WILL CONTROL < 1 - 1> CUSTOMER CREDIT AGREEMENT
│  │        [ MAY HAVE <0 - M> AGREEMENT PREFERENCE ]
│  │
│  │ INHERITED RELATIONSHIPS:
└──┤ *NO INHERITED RELATIONSHIPS DEFINED*
   └───────────────────────────────────────────────────────────────────
```

FIG. 5C

```
┌─────────────────────────────────────────────────────────────────────┐
│  OMNIBUS POSITION                                                   │
│ ┌───────────────────────────────────────────────────────────────────┤
│ │ NATIVE ATTRIBUTES:
│ID│    <1 - 1>   IDENTIFIER      CONCATENATION OF:
│  │                  ASSET IDENTIFIER
│  │                  DATE OF BALANCE
│  │    <1 - 1>   DATE OF BALANCE             INFO TYPE: DATE
│  │    <1 - 1>   ASSET IDENTIFIER            INFO TYPE: ASSET IDENTIFIER
│  │    <1 - 1>   NOMINAL AMOUNT              INFO TYPE: AMOUNT 15 2
│  │    <0 - 1>   BALANCE RECONCILED FLAG     INFO TYPE: INDICATOR
│  │
│  │ INHERITED ATTRIBUTES:
│  │ *NO INHERITED ATTRIBUTES DEFINED*
│  │ NATIVE RELATIONSHIPS:
│  │    RECONCILED WITH <0 - M> EXTERNAL MOVEMENT INSTRUCTION
│  │        [ RECONCILES WITH < 1 - 1> OMNIBUS POSITION ]
│  │ INHERITED RELATIONSHIPS:
└──┤    *NO INHERITED RELATIONSHIPS DEFINED*
   └───────────────────────────────────────────────────────────────────
```

FIG. 6A

COMMON CREDIT AGREEMENT

NATIVE ATTRIBUTES:

ID     <1 - 1>    IDENTIFIER     CONCATENATION OF:
                    GCSS CREDIT AGREEMENT REFERENCE NO
                    VERSION NUMBER

| | | |
|---|---|---|
| <1 - 1> | GCSS CREDIT AGREEMENT REFERENCE NO | INFO TYPE: CREDIT SUPPORT AGREEMENT NUMBER |
| <1 - 1> | VERSION NUMBER | INFO TYPE: VERSION NUMBER |
| <1 - 1> | AGREEMENT STATUS CODE | INFO TYPE: AGREEMENT STATUS CODE |
| <1 - 1> | COUNTERPARTY 1 | INFO TYPE: ACCOUNT NUMBER GCSS |
| <1 - 1> | COUNTERPARTY 2 | INFO TYPE: ACCOUNT NUMBER GCSS |
| <1 - 1> | CREDIT AGREEMENT DATE | INFO TYPE: DATE |
| <1 - 1> | REVIEW DATE | INFO TYPE: DATE |
| <1 - 1> | CALCULATION AGENT | INFO TYPE: ACCOUNT NUMBER GCSS |
| <1 - 1> | FREQUENCY CREDIT EXPOSURE | INFO TYPE: FREQUENCY CODE |
| <1 - 1> | DATE OF NEXT CREDIT EXPOSURE | INFO TYPE: DATE |
| <1 - 1> | CURRENCY CREDIT EXPOSURE | INFO TYPE: CURRENCY CODE |
| <0 - 1> | VALUE BY AGREED AMOUNT FLAG | INFO TYPE: INDICATOR |
| <1 - 1> | OPTIMIZATION TIME PERIOD | INFO TYPE: TIMEZONE CODE |
| <0 - 1> | UNDERLYING PORTFOLIO | INFO TYPE: UNDERLINING PORTFOLIO CODE |
| <1 - 1> | DELIVERY TIME DAYS | INFO TYPE: NUMERIC 1 |
| <1 - 1> | RETURN TIME DAYS | INFO TYPE: NUMERIC 1 |
| <0 - 1> | EFFECTIVE DATE VERSION START | INFO TYPE: DATE |

INHERITED ATTRIBUTES:
\*\*\*NO INHERITED ATTRIBUTES DEFINED\*\*\*

NATIVE RELATIONSHIPS:
    OVERALL CONDITIONS FOR   <0 - 2>   CUSTOMER CREDIT AGREEMENT
       [ HAS COMMON IN   <1 - 1>   COMMON CREDIT AGREEMENT ]

INHERITED RELATIONSHIPS:
\*\*\*NO INHERITED RELATIONSHIPS DEFINED\*\*\*

FIG. 5D

```
┌─────────────────────────────────────────────────────────────────┐
│ ASSET                                                           │
│  ┌──────────────────────────────────────────────────────────────┤
│ID│  NATIVE ATTRIBUTES:                                          │
│  │    <1 - 1>   IDENTIFIER       CONCATENATION OF:              │
│ID│                ASSET IDENTIFIER                              │
│  │    <1 - 1>   ASSET IDENTIFIER   INFO TYPE: ASSET IDENTIFIER  │
│  │    <1 - 1>   ASSET TYPE         INFO TYPE: ASSET TYPE CODE   │
│  │  INHERITED ATTRIBUTES:                                       │
│  │  *NO INHERITED ATTRIBUTES DEFINED*                       │
│  │  NATIVE RELATIONSHIPS:                                       │
│  │    DESCRIBES < 0 - M> EXTERNAL MOVEMENT INSTRUCTION          │
│  │       [ DESCRIBED  BY <1 - 1> ASSET ]                        │
│  │    DESCRIBES < 0 - M> CUSTOMER ASSET POSITION                │
│  │       [ DESCRIBED  BY <1 - 1> ASSET ]                        │
│  │    DESCRIBES < 0 - M> INTERNAL GCSS MOVEMENT                 │
│  │       [ DESCRIBED  BY <1 - 1> ASSET ]                        │
│  │    DESCRIBES < 0 - M> ASSET PLEDGE                           │
│  │       [ DESCRIBED  BY <1 - 1> ASSET ]                        │
│  │  INHERITED RELATIONSHIPS:                                    │
│  │  *NO INHERITED RELATIONSHIPS DEFINED*                    │
└──┴──────────────────────────────────────────────────────────────┘
```

FIG. 6B

```
┌─────────────────────────────────────────────────────────────────┐
│ ASSET TYPE                                                      │
│  ┌──────────────────────────────────────────────────────────────┤
│ID│  NATIVE ATTRIBUTES:                                          │
│  │    <1 - 1>   IDENTIFIER       CONCATENATION OF:              │
│  │                ASSET TYPE CODE                               │
│ID│    <1 - 1>   ASSET TYPE CODE      INFO TYPE: ASSET TYPE CODE │
│ID│    <1 - 1>   SHORT NAME           INFO TYPE: ALPHANUMERIC15  │
│ID│    <1 - 1>   LONG NAME            INFO TYPE: ALPHANUMERIC35  │
│  │    <0 - 1>   PARENT ASSET TYPE CODE  INFO TYPE: ASSET TYPE CODE │
│  │                                                              │
│  │  INHERITED ATTRIBUTES:                                       │
│  │  *NO INHERITED ATTRIBUTES DEFINED*                       │
│  │                                                              │
│  │  NATIVE RELATIONSHIPS:                                       │
│  │    CLASSIFIES <0 - M> ASSET                                  │
│  │       [ CLASIFIED BY <0 - 1> ASSET TYPE ]                    │
│  │    IS CLASSIFIED BY <0 - 1> ASSET TYPE                       │
│  │       [ CLASIFIES  <0 - M> ASSET TYPE ]                      │
│  │                                                              │
│  │  INHERITED RELATIONSHIPS:                                    │
│  │    *NO INHERITED RELATIONSHIPS DEFINED*                  │
└──┴──────────────────────────────────────────────────────────────┘
```

FIG. 6C

| SECURITY | | | |
|---|---|---|---|
| | NATIVE ATTRIBUTES: | | |
| ID | <1 - 1> | IDENTIFIER | CONCATENATION OF: |
| ID | | SECURITY CODE | |
| ID | <1 - 1> | SECURITY CODE | INFO TYPE: SECURITY CODE |
| ID | <1 - 1> | ISIN CODE | INFO TYPE: ISIN SECURITY CODE |
| | <0 - 1> | DOMESTIC SECURITY CODE | INFO TYPE: ISIN SECURITY CODE |
| | <0 - 1> | SHORT DESCRIPTION | INFO TYPE: ALPHANUMERIC20 |
| ID | <1 - 1> | LONG DESCRIPTION | INFO TYPE: SECURITY NAME 45 |
| | <1 - 1> | NOMINAL CURRENCY | INFO TYPE: CURRENCY CODE |
| | <0 - 1> | MINIMUM DENOMINATION | INFO TYPE: AMOUNT 15 2 |
| | <0 - 1> | COUPON RATE | INFO TYPE: DECIMAL9 6 |
| | <0 - 1> | COUPON CURRENCY CODE | INFO TYPE: CURRENCY CODE |
| | <0 - 1> | MATURITY DATE | INFO TYPE: DATE |
| | <0 - 1> | MATURITY CURRENCY CODE | INFO TYPE: CURRENCY CODE |
| | <0 - 1> | CEDEL DEPOSITORY | INFO TYPE: DEPOSITORY CODE |
| | <0 - 1> | SECURITY CONVERTABILITY CODE | INFO TYPE: INSTRUMENT TYPE CODE |
| | <0 - 1> | CLOSING DATE | INFO TYPE: DATE |
| | <0 - 1> | DISTRIBUTION DATE | INFO TYPE: DATE |
| | <0 - 1> | DELIVERY CODE | INFO TYPE: ALPHANUMERIC1 |
| | <0 - 1> | BRIDGE ELIGIBLE FLAG | INFO TYPE: INDICATOR |
| | <1 - 1> | SECURITY ACTIVE FLAG | INFO TYPE: INDICATOR |
| | <0 - 1> | GCSS ASSET TYPE CODE | INFO TYPE: ASSET TYPE CODE |
| | <0 - 1> | GEOGRAPHICAL SECTOR | INFO TYPE: ALPHANUMERIC3 |
| | <0 - 1> | INDUSTRY CODE ISSUER | INFO TYPE: ALPHANUMERIC2 |
| | <0 - 1> | RATING SP | INFO TYPE: ALPHANUMERIC5 |
| | <0 - 1> | RATING MOODY | INFO TYPE: ALPHANUMERIC5 |
| | <0 - 1> | RATING MIKUNI | INFO TYPE: ALPHANUMERIC5 |
| | <0 - 1> | RATING CEDEL | INFO TYPE: ALPHANUMERIC5 |
| | <0 - 1> | GCSS ASSET RATING | INFO TYPE: ASSET RATING CODE |
| | <1 - 1> | GCSS ASSET FLAG | INFO TYPE: INDICATOR |
| | <1 - 1> | LAST UPDATED TIMESTAMP | INFO TYPE: TIMESTAMP HHMMDDHHYY |
| | INHERITED ATTRIBUTES: | | |
| ID | <1 - 1> | ASSET. IDENTIFIER | CONCATENATION OF: |
| | | ASSET IDENTIFIER | |
| | <1 - 1> | ASSET. ASSET IDENTIFIER | INFO TYPE: ASSET IDENTIFIER |
| | <1 - 1> | ASSET. ASSET TYPE | INFO TYPE: ASSET TYPE CODE |

NATIVE RELATIONSHIPS:
　　IS VALUED BY <0 - M> SECURITY PRICE
　　　　[ VALUES <1 - 1> SECURITY ]
　　OVER ITS LIFE HAS <0 - M> CORPORATE ACTION
　　　　[ EFFECTS <1 - 1> SECURITY ]
INHERITED RELATIONSHIPS:
　　ASSET. DESCRIBES <0 - M> EXTERNAL MOVEMENT INSTRUCTION
　　　　[ DESCRIBED BY <1 - 1> ASSET ]
　　ASSET. DESCRIBES <0 - M> CUSTOMER ASSET POSITION
　　　　[ DESCRIBED BY <1 - 1> ASSET ]
　　ASSET. DESCRIBES <0 - M> INTERNAL GCSS MOVEMENT
　　　　[ DESCRIBED BY <1 - 1> ASSET ]
　　ASSET. DESCRIBES <0 - M> ASSET PLEDGE
　　　　[ DESCRIBED BY <1 - 1> ASSET ]

FIG. 6D

| | CURRENCY |
|---|---|
| | NATIVE ATTRIBUTES: |
| ID | <1 - 1>  IDENTIFIER           CONCATENATION OF:  
              ISO CURRENCY CODE |
| ID | <1 - 1>  ISO CURRENCY CODE    INFO TYPE: CURRENCY CODE |
| ID | <1 - 1>  DESCRIPTION          INFO TYPE: ALPHANUMERIC20 |
| | <0 - 1>  HOME COUNTRY CODE    INFO TYPE: COUNTRY CODE |
| | INHERITED ATTRIBUTES: |
| ID | <1 - 1>  ASSET. IDENTIFIER    CONCATENATION OF:  
              ASSET IDENTIFIER      INFO TYPE: ASSET IDENTIFIER |
| ID | <1 - 1>  ASSET. ASSET IDENTIFIER  INFO TYPE: ASSET TYPE CODE |
| | <1 - 1>  ASSET. ASSET TYPE |
| | NATIVE RELATIONSHIPS:  
CAN HAVE < 0 - M> CASH INTEREST BALANCE  
    [ IS APPLIED TO <1 - 1> CURRENCY ]  
RELATIVE VALUE DETERMINED BY < 0 - M> FX RATE  
    [ VALUES <1 - 1> CURRENCY ]  
INHERITED RELATIONSHIPS:  
    ASSET.DESCRIBES <0 - M> EXTERNAL MOVEMENT INSTRUCTION  
        [ DESCRIBED BY <1 - 1> ASSET ]  
    ASSET.DESCRIBES <0 - M> CUSTOMER ASSET POSITION  
        [ DESCRIBED BY <1 - 1> ASSET ]  
    ASSET.DESCRIBES <0 - M> INTERNAL GCSS MOVEMENT  
        [ DESCRIBED BY <1 - 1> ASSET ]  
    ASSET.DESCRIBES <0 - M> ASSET PLEDGE  
        [ DESCRIBED BY <1 - 1> ASSET ] |

F I G. 6E

| | SECURITY PRICE |
|---|---|
| | NATIVE ATTRIBUTES: |
| ID | <1 - 1>  IDENTIFIER       CONCATENATION OF:  
              SECURITY CODE  
              VALUATION DATE |
| | <1 - 1>  SECURITY CODE      INFO TYPE: SECURITY CODE |
| | <1 - 1>  VALUATION DATE     INFO TYPE: DATE |
| | <1 - 1>  PRICE              INFO TYPE: DECIMAL9 6 |
| | <1 - 1>  PRICE TYPE CODE    INFO TYPE: PRICE TYPE CODE |
| | <1 - 1>  CURRENCY           INFO TYPE: CURRENCY CODE |
| | <1 - 1>  SOURCE USER ID     INFO TYPE: USER IDENTIFIER |
| | INHERITED ATTRIBUTES:  
*NO INHERITED ATTRIBUTES DEFINED*  
NATIVE RELATIONSHIPS:  
    VALUES <1 - 1> SECURITY  
        [ IS VALUED BY < 0 - M> SECURITY PRICE ]  
INHERITED RELATIONSHIPS:  
    *NO INHERITED RELATIONSHIPS DEFINED* |

F I G. 6F

```
┌─────────────────────────────────────────────────────────────┐
│ FX RATE                                                     │
│  ┌──────────────────────────────────────────────────────────┤
│  │ NATIVE ATTRIBUTES:                                       │
│ID│   <1 - 1>   IDENTIFIER      CONCATENATION OF:            │
│  │                 CURRENCY CODE                            │
│  │                 DATE                                     │
│  │   <1 - 1>   CURRENCY CODE        INFO TYPE: CURRENCY CODE│
│  │   <1 - 1>   DATE                 INFO TYPE: DATE         │
│  │   <1 - 1>   EXCHANGE RATE TO USD INFO TYPE: DECIMAL9 6   │
│  │                                                          │
│  │ INHERITED ATTRIBUTES:                                    │
│  │ *NO INHERITED ATTRIBUTES DEFINED*                    │
│  │ NATIVE RELATIONSHIPS:                                    │
│  │    VALUES < 1 - 1> CURRENCY                              │
│  │        [ RELATIVE VALUE DETERMINED <0 - M> FX RATE ]     │
│  │ INHERITED RELATIONSHIPS:                                 │
│  │ *NO INHERITED RELATIONSHIPS DEFINED*                 │
└──┴──────────────────────────────────────────────────────────┘
```

F I G. 6G

```
┌─────────────────────────────────────────────────────────────┐
│ CASH INTEREST BALANCE                                       │
│ ┌───────────────────────────────────────────────────────────┤
│ │ NATIVE ATTRIBUTES:                                        │
│ │    <0 - 1>  IDENTIFIER       CONCATENATION OF:            │
│ │                 BALANCE DATE                              │
│ │                 CURRENCY CODE                             │
│ │    <1 - 1>  CURRENCY CODE         INFO TYPE: CURRENCY CODE│
│ │    <0 - 1>  BALANCE DATE          INFO TYPE: DATE         │
│ │    <0 - 1>  BALANCE AMOUNT        INFO TYPE: AMOUNT 15 2  │
│ │    <0 - 1>  CREDIT INTEREST RATE  INFO TYPE: DECIMAL9 6   │
│ │    <0 - 1>  CREDIT INTEREST PAID  INFO TYPE: AMOUNT 15 2  │
│ │    <0 - 1>  DEBIT INTEREST RATE   INFO TYPE: DECIMAL9 6   │
│ │    <0 - 1>  DEBIT INTEREST PAID   INFO TYPE: AMOUNT 15 2  │
│ │    <0 - 1>  INTEREST DISTRIBUTED IN GCSS  INFO TYPE: AMOUNT 15 2 │
│ │ INHERITED ATTRIBUTES:                                     │
│ │ *NO INHERITED ATTRIBUTES DEFINED*                     │
│ │                                                           │
│ │ NATIVE RELATIONSHIPS:                                     │
│ │     IS APPLIED TO <1 - 1> CURRENCY                        │
│ │        [ CAN HAVE <0 - M> CASH INTEREST BALANCE]          │
│ │                                                           │
│ │ INHERITED RELATIONSHIPS:                                  │
│ │    *NO INHERITED RELATIONSHIPS DEFINED*               │
└─┴───────────────────────────────────────────────────────────┘
```

F I G. 6I

| CORPORATE ACTION |
|---|

NATIVE ATTRIBUTES:

| | | | |
|---|---|---|---|
| ID | <1 - 1> | IDENTIFIER | CONCATENATION OF: |
| | | CORPORATE ACTION ID | |
| ID | <1 - 1> | CORPORATE ACTION ID | INFO TYPE: TOKEN IDENTIFIER 8 |
| | <1 - 1> | SECURITY CODE | INFO TYPE: SECURITY CODE |
| | <1 - 1> | EVENT TYPE CODE | INFO TYPE: CA EVENT TYPE CODE |
| | <1 - 1> | EVENT STATUS CODE | INFO TYPE: CA EVENT STATUS CODE |
| | <0 - 1> | RECORD DATE | INFO TYPE: DATE |
| | <0 - 1> | PAYMENT DATE | INFO TYPE: DATE |
| | <0 - 1> | NOMINAL BASIS | INFO TYPE: NUMERIC 7 |
| | <0 - 1> | AMOUNT PAID PER NOMINAL BASIS | INFO TYPE: AMOUNT 13 2 |
| | <0 - 1> | CURRENCY OF PAYMENT | INFO TYPE: CURRENCY CODE |
| | <0 - 1> | TOTAL AMOUNT PAID TO GCSS | INFO TYPE: AMOUNT 15 2 |
| | <0 - 1> | TOTAL AMOUNT DISTRIB. BY GCSS | INFO TYPE: AMOUNT 15 2 |
| | <0 - 1> | INTERNAL COMMENTS | INFO TYPE: COMMENTS 120 |
| | <0 - 1> | CUSTOMER COMMENTS | INFO TYPE: COMMENTS 120 |

INHERITED ATTRIBUTES:
*NO INHERITED ATTRIBUTES DEFINED*

NATIVE RELATIONSHIPS:
　　　EFFECTS <1 - 1>  SECURITY
　　　　[ OVER ITS LIFE HAS <0 - M> CORPORATE ACTION ]

INHERITED RELATIONSHIPS:
*NO INHERITED RELATIONSHIPS DEFINED*

FIG. 6H

| ASSET PIECE | | | |
|---|---|---|---|
| | NATIVE ATTRIBUTES: | | |
| ID | <1-1> | IDENTIFIER | CONCATENATION OF: |
| | | PIECE ID | |
| ID | <1-1> | PIECE ID | INFO TYPE: TOKEN IDENTIFIER 8 |
| | <1-1> | ASSET IDENTIFIER | INFO TYPE: ASSET IDENTIFIER |
| | <1-1> | BALANCE CODE | INFO TYPE: BALANCE TYPE CODE |
| | <1-1> | CONTROLLED NOMINAL AMOUNT | INFO TYPE: AMOUNT 15 2 |
| | <1-1> | CURRENT NOMINAL AMOUNT | INFO TYPE: AMOUNT 15 2 |
| | <1-1> | AGREEMENT REF | INFO TYPE: CREDIT SUPPORT AGREEMENT NO. |
| | <1-1> | CONTROL GOES ACCOUNT | INFO TYPE: ACCOUNT NUMBER GCSS |
| | <0-1> | PRIVIOUS GOES ACCOUNT | INFO TYPE: ACCOUNT NUMBER GCSS |
| | <1-1> | START DATE | INFO TYPE: DATE |
| | <1-1> | RETURN DATE | INFO TYPE: DATE |
| | <1-1> | ACTUAL END DATE | INFO TYPE: DATE |
| | <1-1> | ON-TRANS FLAG | INFO TYPE: INDICATOR |
| | <1-1> | REPO FLAG | INFO TYPE: INDICATOR |

INHERITED ATTRIBUTES:
*NO INHERITED ATTRIBUTES DEFINED*

NATIVE RELATIONSHIPS:
DESCRIBED BY <1-1> ASSET
 [ DESCRIBES <0-M> ASSET PIECE ]
ASSETS MOVED BY <0-M> INTERNAL GCSS MOVEMENT
 [ MOVED ASSETS FROM <0-1> ASSET PIECE ]
REALLOCATED BY <0-M> EXTERNAL MOVEMENT INSTRUCTION
 [ REALLOCATES CONTROL <1-1> ASSET PIECE ]
CONTROLLED BY <1-1> CUSTOMER ACCOUNT
 [ HAS CONTROL OF <0-M> ASSET PIECE ]
RETURN REQUSTED BY <0-1> SUBSTITUTION REQUEST
 [ REQUEST RETURN <0-M> ASSET PIECE ]
SUMMARISED BY <1-1> CUSTOMER ASSET POSITION
 [ SUMMARISES <0-M> ASSET PIECE ]
PLEDGED TO SUPPORT <0-1> COMMON CREDIT AGREEMENT
 [ SUPPORTED BY <0-M> ASSET PIECE ]
PLEDGED BY <0-1> CUSTOMER ACCOUNT
 [ MAY PLEDGE <0-M> ASSET PIECE ]

INHERITED RELATIONSHIPS:
*NO INHERITED RELATIONSHIPS DEFINED*

FIG. 7A

INTERENAL GCSS MOVEMENT

NATIVE ATTRIBUTES:

| ID | <1 - 1> | IDENTIFIER | CONCATENATION OF: |
|---|---|---|---|
|    |         | MOVEMENT ID |  |
| ID | <1 - 1> | MOVEMENT ID | INFO TYPE: TOKEN IDENTIFIER 6 |
|    | <1 - 1> | PRICE ID | INFO TYPE: TOKEN IDENTIFIER 8 |
|    | <1 - 1> | NOMINAL AMOUNT | INFO TYPE: AMOUNT 15 2 |
|    | <1 - 1> | TIMESTAMP | INFO TYPE: TIMESTAMP HHMMDDMMYY |
|    | <1 - 1> | MOVEMENT PURPOSE CODE | INFO TYPE: MOVEMENT PURPOSE CODE |
|    | <1 - 1> | MODIFIER USER ID | INFO TYPE: USER IDENTIFIER |

INHERITED ATTRIBUTES:
\*\*\*NO INHERITED ATTRIBUTES DEFINED\*\*\*

NATIVE RELATIONSHIPS:
    DESCRIBED BY <1 - 1> ASSET
        [DESCRIBES <0 - M> INTERNAL GCSS MOVEMENT]
    MOVED ASSETS FROM <0 - 1> ASSET PIECE
        [ ASSETS MOVED BY <0 -M> INTERNAL GCSS MOVEMENT]

INHERITED RELATIONSHIPS:
\*\*\*NO INHERITED RELATIONSHIPS DEFINED\*\*\*

F I G. 7B

CUSTOMER ASSET POSITION

NATIVE ATTRIBUTES:

| ID | <1 - 1> | IDENTIFIER | CONCATENATION OF: |
|---|---|---|---|
|    |         |            | CUSTOMER ACCOUNT |
|    |         |            | ASSET IDENTIFIER |
|    |         |            | DATE |
|    | <1 - 1> | CUSTOMER ACCOUNT | INFO TYPE: ACCOUNT NUMBER GCSS |
|    | <1 - 1> | ASSET IDENTIFIER | INFO TYPE: ASSET IDENTIFIER |
|    | <0 - 1> | DATE | INFO TYPE: DATE |
|    | <0 - 1> | ORIGINAL BALANCE | INFO TYPE: AMOUNT 15 2 |
|    | <0 - 1> | IN ONTRANS BALANCE | INFO TYPE: AMOUNT 15 2 |
|    | <0 - 1> | OUT ONTRANS BALANCE | INFO TYPE: AMOUNT 15 2 |

INHERITED ATTRIBUTES:
\*\*\*NO INHERITED ATTRIBUTES DEFINED\*\*\*

NATIVE RELATIONSHIPS:
    DESCRIBED BY <1 - 1> ASSET
        [DESCRIBES <0 - M> CUSTOMER ASSET POSITION]
    SUMMARISES <0 - M> ASSET PIECE
        [ SUMMARISED BY <1 -1> CUSTOMER ASSET POSITION]

INHERITED RELATIONSHIPS:
\*\*\*NO INHERITED RELATIONSHIPS DEFINED\*\*\*

F I G. 7C

CREDIT EXPOSURE

NATIVE ATTRIBUTES:

| ID | | | | |
|---|---|---|---|---|
| | <1 - 1> | IDENTIFIER | CONCATENATION OF: | |
| | | | CUSTOMER NUMBER | |
| | | | GCSS CREDIT AGREEMENT REF. NO. | |
| | | | DUE DATE | |
| | <1 - 1> | GCSS CREDIT AGREEMENT REF. NO. | INFO TYPE: | CREDIT SUPPORT AGREEMENT NO. |
| | <1 - 1> | CUSTOMER NUMBER | INFO TYPE: | ACCOUNT NUMBER GCSS |
| | <1 - 1> | DUE DATE | INFO TYPE: | DATE |
| | <1 - 1> | VALUE DATE | INFO TYPE: | DATE |
| | <1 - 1> | COVER DATE | INFO TYPE: | DATE |
| | <0 - 1> | TIMESTAMP ENTERED | INFO TYPE: | TIMESTAMP HHMMDDMMYY |
| | <0 - 1> | SENDER ID | INFO TYPE: | USER IDENTIFIER |
| | <1 - 1> | EXPOSURE CURRENCY | INFO TYPE: | CURRENCY CODE |
| | <0 - 1> | CREDIT EXPOSURE AMOUNT | INFO TYPE: | AMOUNT 15 0 |
| | <0 - 1> | AGREED AMOUNT | INFO TYPE: | AMOUNT 15 0 |
| | <0 - 1> | AMOUNT TO MOVE | INFO TYPE: | AMOUNT 15 0 |
| | <0 - 1> | DIFFERENCE IN CREDIT EXPOSURE | INFO TYPE: | AMOUNT 15 0 |
| | <0 - 1> | BASIS | INFO TYPE: | AMOUNT 15 0 |
| | <0 - 1> | CREDIT SUPPORT AMOUNT | INFO TYPE: | AMOUNT 15 0 |
| | <0 - 1> | REFUSE TO DELIVER FLAG | INFO TYPE: | INDICATOR |
| | <0 - 1> | DECLINE RECEIPT FLAG | INFO TYPE: | INDICATOR |
| | <1 - 1> | QUALITY MATCH STATUS | INFO TYPE: | EXPOSURE MATCH CODE |
| | <1 - 1> | COVERAGE STATUS | INFO TYPE: | EXPOSURE COVERAGE CODE |
| | <0 - 1> | INITIAL VALUATION COVERAGE | INFO TYPE: | AMOUNT 15 2 |
| | <0 - 1> | CURRENT VALUATION COVERAGE | INFO TYPE: | AMOUNT 15 2 |

INHERITED ATTRIBUTES:
\*\*\*NO INHERITED ATTRIBUTES DEFINED\*\*\*

NATIVE RELATIONSHIPS:
VALUES <1 - 1> CUSTOMER CREDIT AGREEMENT
[ IS VALUED BY <0 - M> CREDIT EXPOSURE ]

INHERITED RELATIONSHIPS:
\*\*\*NO INHERITED RELATIONSHIPS DEFINED\*\*\*

FIG. 7D

SUBSTITUTION REQUEST

NATIVE ATTRIBUTES:

| | | |
|---|---|---|
| <1 - 1> | SUBSTITUTION ID | INFO TYPE: TOKEN IDENTIFIER 8 |
| <0 - 1> | PREV. SUBSTITUTION ID | INFO TYPE: TOKEN IDENTIFIER 8 |
| <1 - 1> | PIECE ID | INFO TYPE: TOKEN IDENTIFIER 8 |
| <0 - 1> | NOMINAL AMOUNT REQUESTED | INFO TYPE: AMOUNT 15 2 |
| <0 - 1> | VALUATION AMOUNT | INFO TYPE: AMOUNT 15 2 |
| <0 - 1> | VALUATION CURRENCY CODE | INFO TYPE: CURRENCY CODE |
| <0 - 1> | AGREED FLAG | INFO TYPE: INDICATOR |
| <0 - 1> | PARTIAL FLAG | INFO TYPE: IND |
| <0 - 1> | SUBSTITUTION STATUS | INFO TYPE: SUBSTITUTION STATUS |
| <0 - 1> | REQUEST CREATED USER ID | INFO TYPE: USER IDENTIFIER |
| <0 - 1> | REQUEST CREATED TIMESTAMP | INFO TYPE: TIMESTAMP HHMMDDMMYY |
| <0 - 1> | EXECUTED TIMESTAMP | INFO TYPE: TIMESTAMP HHMMDDMMYY |

INHERITED ATTRIBUTES:
*NO INHERITED ATTRIBUTES DEFINED*

NATIVE RELATIONSHIPS:
　　　REQUEST RETURN <0 - M>　ASSET PIECE
　　　　　[ RETURN REQUESTED BY <0 - 1> SUBSTITUTION REQUEST ]

INHERITED RELATIONSHIPS:
*NO INHERITED RELATIONSHIPS DEFINED*

FIG. 7E

EXTERNAL MOVEMENT INSTRUCTION

NATIVE ATTRIBUTES:

| | | | |
|---|---|---|---|
| ID | <1 - 1> | IDENTIFIER | CONCATENATION OF: GCSS TRANSACTION REF. |
| ID | <1 - 1> | GCSS TRANSACTION REF. | INFO TYPE: TOKEN IDENTIFIER 8 |
| | <1 - 1> | RECEIPT FLAG | INFO TYPE: INDICATOR |
| | <1 - 1> | ASSET IDENTIFIER | INFO TYPE: ASSET IDENTIFIER |
| | <1 - 1> | RECONCILED FLAG | INFO TYPE: INDICATOR |
| | <1 - 1> | GCSS ACCOUNT UPDATED FLAG | INFO TYPE: INDICATOR |
| | <0 - 1> | INPUT USER ID | INFO TYPE: USER IDENTIFIER |
| | <0 - 1> | AUTHORISED USER ID | INFO TYPE: USER IDENTIFIER |
| | <0 - 1> | AUTHORISED TIMESTAMP | INFO TYPE: TIMESTAMP HHMMDDMMYY |
| | <1 - 1> | CREATED TIMESTAMP | INFO TYPE: TIMESTAMP HHMMDDMMYY |
| | <0 - 1> | TRANSMITTED LCS TIMESTAMP | INFO TYPE: TIMESTAMP HHMMDDMMYY |

INHERITED ATTRIBUTES:
\*\*\*NO INHERITED ATTRIBUTES DEFINED\*\*\*

NATIVE RELATIONSHIPS:
   RECONCILES WITH <1-1> GCSS ASSETS
     [ RECONCILED WITH BY <0-M> EXTERNAL MOVEMENT INITRUCTION ]
   DESCRIBED BY <1-1> ASSETS
     [ DESCRIBES <0-M> EXTERNAL MOVEMENT INITRUCTION ]
   CREATES <0-1> INTERNAL GCSS MOVEMENT
     [ CREATED BY <0-1> EXTERNAL MOVEMENT INITRUCTION ]

INHERITED RELATIONSHIPS:
\*\*\*NO INHERITED RELATIONSHIPS DEFINED\*\*\*

FIG. 8A

EXTERNAL MOVEMENT INSTRUCTION

NATIVE ATTRIBUTES:

| | | | |
|---|---|---|---|
| ID | <1 - 1> | IDENTIFIER | CONCATENATION OF: |
| | | GCSS TRANSACTION NUMBER | |
| ID | <1 - 1> | GCSS TRANSACTION NUMBER | INFO TYPE: INSTRUCTION IDENTIFIER |
| | <1 - 1> | LCS TRANSACTION NUMBER | INFO TYPE: INSTRUCTION IDENTIFIER |
| | <1 - 1> | INSTRUCTION TYPE | INFO TYPE: INSTRUCTION TYPE CODE |
| | <0 - 1> | ACCOUNT NO. COUNTERPARTY | INFO TYPE: ACCOUNT NUMBER |
| | <0 - 1> | SECURITY CODE | INFO TYPE: SECURITY CODE |
| | <0 - 1> | CURRENCY CODE | INFO TYPE: CURRENCY CODE |
| | <0 - 1> | NOMINAL AMOUNT | INFO TYPE: AMOUNT 15 0 |
| | <0 - 1> | CASH AMOUNT | INFO TYPE: AMOUNT 15 2 |
| | <0 - 1> | REQUESTED SATTLEMENT DATE | INFO TYPE: DATE |
| | <0 - 1> | EXECUTED DATE | INFO TYPE: DATE |
| | <0 - 1> | VALUE DATE | INFO TYPE: DATE |
| | <1 - 1> | TIMESTAMP CAPTURED IN GCSS | INFO TYPE: TIMESTAMP HHMMDDMMYY |
| | <0 - 1> | LCS STATUS | INFO TYPE: LCS INST. STATUS CODE |
| | <0 - 1> | GCSS ACCOUNT | INFO TYPE: ACCOUNT NUMBER GCSS |
| | <1 - 1> | WORDING INFORMATION | INFO TYPE: COMMENTS 120 |

INHERITED ATTRIBUTES:

| | | | |
|---|---|---|---|
| ID | <1 - 1> | EXTERNAL MOVEMENT INSTRUCTION. IDENTIFIER | CONCATENATION OF: |
| | | GCSS TRANSACTION REF. | |
| ID | <1 - 1> | EXTERNAL MOVEMENT INSTRUCTION. GCSS TRANSACTION REF. | INFO TYPE: TOKEN IDENTIFIER 8 |
| | <1 - 1> | EXTERNAL MOVEMENT INSTRUCTION. RECEIPT FLAG | INFO TYPE: INDICATOR |
| | <1 - 1> | EXTERNAL MOVEMENT INSTRUCTION. ASSET IDENTIFIER | INFO TYPE: ASSET IDENTIFIER |
| | <1 - 1> | EXTERNAL MOVEMENT INSTRUCTION. RECONCILED FLAG | INFO TYPE: INDICATOR |
| | <1 - 1> | EXTERNAL MOVEMENT INSTRUCTION. GCSS ACCOUNT UPDATED FLAG | INFO TYPE: INDICATOR |
| | <0 - 1> | EXTERNAL MOVEMENT INSTRUCTION. INPUT USER ID | INFO TYPE: USER IDENTIFIER |
| | <0 - 1> | EXTERNAL MOVEMENT INSTRUCTION. AUTHORISED USER ID | INFO TYPE: USER IDENTIFIER |
| | <0 - 1> | EXTERNAL MOVEMENT INSTRUCTION. AUTHORISED TIMESTAMP | INFO TYPE: TIMESTAMP HHMMDDMMYY |
| | <1 - 1> | EXTERNAL MOVEMENT INSTRUCTION. CREATED TIMESTAMP | INFO TYPE: TIMESTAMP HHMMDDMMYY |
| | <0 - 1> | EXTERNAL MOVEMENT INSTRUCTION. TRANSMITTED LCS TIMESTAMP | INFO TYPE: TIMESTAMP HHMMDDMMYY |

NATIVE RELATIONSHIPS:
\*\*\*NO NATIVE RELATIONSHIPS DEFINED\*\*\*

INHERITED RELATIONSHIPS:

EXTERNAL MOVEMENT INSTRUCTION. RECONCILES WITH <1 - 1>   GCSS ASSETS
   [ RECONCILED WITH <0 - M> EXTERNAL MOVEMENT INITRUCTION ]
EXTERNAL MOVEMENT INSTRUCTION. DESCRIBED BY <1 - 1>   ASSETS
   [ DESCRIBES <0 - M> EXTERNAL MOVEMENT INITRUCTION ]
EXTERNAL MOVEMENT INSTRUCTION. CREATES <0 - 1>   INTERNAL GCSS MOVEMENT
   [ CREATED BY <0 - 1> EXTERNAL MOVEMENT INITRUCTION ]

FIG. 8B

FED MOVEMENT INSTRUCTION

NATIVE ATTRIBUTES:

| | | | |
|---|---|---|---|
| ID | <1 - 1> | IDENTIFIER | CONCATENATION OF: GCSS TRANSACTION REF. |
| ID | <1 - 1> | GCSS TRANSACTION REF. | INFO TYPE: TOKEN IDENTIFIER 8 |
| | <0 - 1> | SPEED TRANSACTION ID | INFO TYPE: FED INSTRUCTION ID |
| | <1 - 1> | SECURITY CODE | INFO TYPE: SECURITY CODE |
| | <1 - 1> | NOMINAL QUANTITY | INFO TYPE: AMOUNT 13 0 |
| | <0 - 1> | NOMINAL CCY | INFO TYPE: CURRENCY CODE |
| | <0 - 1> | CASH AMOUNT | INFO TYPE: AMOUNT 15 2 |
| | <1 - 1> | REQUESTED SETTLEMENT DATE | |
| | <0 - 1> | EXECUTION DATE | INFO TYPE: DATE |
| | <0 - 1> | MEMO FIELD | INFO TYPE: COMMENTS 120 |
| | <0 - 1> | GCSS ACCOUNT | INFO TYPE: ACCOUNT NUMBER GCSS |
| | <0 - 1> | EXTERNAL CLEARING BANK | INFO TYPE: FED CLEARING BANK |
| | <0 - 1> | EXTERNAL BANK ACCOUNT | INFO TYPE: FED BANK ACCOUNT |
| | <1 - 1> | CAPTURED GCSS TIMESTAMP | INFO TYPE: TIMESTAMP HHMMDDMMYY |
| | <0 - 1> | CONFIRMED REC. FED TIMESTAMP | INFO TYPE: TIMESTAMP HHMMDDMMYY |
| | <0 - 1> | CONFIRMED EXEC. FED TIMESTAMP | INFO TYPE: TIMESTAMP HHMMDDMMYY |

INHERITED ATTRIBUTES:

| | | | |
|---|---|---|---|
| ID | <1 - 1> | EXTERNAL MOVEMENT INSTRUCTION. IDENTIFIER | CONCATENATION OF: GCSS TRANSACTION REF. |
| ID | <1 - 1> | EXTERNAL MOVEMENT INSTRUCTION. GCSS TRANSACTION REF. | INFO TYPE: TOKEN IDENTIFIER 8 |
| | <1 - 1> | EXTERNAL MOVEMENT INSTRUCTION. RECEIPT FLAG | INFO TYPE: INDICATOR |
| | <1 - 1> | EXTERNAL MOVEMENT INSTRUCTION. ASSET IDENTIFIER | INFO TYPE: ASSET IDENTIFIER |
| | <1 - 1> | EXTERNAL MOVEMENT INSTRUCTION. RECONCILED FLAG | INFO TYPE: INDICATOR |
| | <1 - 1> | EXTERNAL MOVEMENT INSTRUCTION. GCSS ACCOUNT UPDATED FLAG | INFO TYPE: INDICATOR |
| | <0 - 1> | EXTERNAL MOVEMENT INSTRUCTION. INPUT USER ID | INFO TYPE: USER IDENTIFIER |
| | <0 - 1> | EXTERNAL MOVEMENT INSTRUCTION. AUTHORISED USER ID | INFO TYPE: USER IDENTIFIER |
| | <0 - 1> | EXTERNAL MOVEMENT INSTRUCTION. AUTHORISED TIMESTAMP | INFO TYPE: TIMESTAMP HHMMDDMMYY |
| | <1 - 1> | EXTERNAL MOVEMENT INSTRUCTION. CREATED TIMESTAMP | INFO TYPE: TIMESTAMP HHMMDDMMYY |
| | <0 - 1> | EXTERNAL MOVEMENT INSTRUCTION. TRANSMITTED LCS TIMESTAMP | INFO TYPE: TIMESTAMP HHMMDDMMYY |

NATIVE RELATIONSHIPS:
\*\*\*NO NATIVE RELATIONSHIPS DEFINED\*\*\*

INHERITED RELATIONSHIPS:
EXTERNAL MOVEMENT INSTRUCTION. RECONCILES WITH < 1 - 1 >  GCSS ASSETS
   [ RECONCILED WITH  < 0 - M > EXTERNAL MOVEMENT INITRUCTION ]
EXTERNAL MOVEMENT INSTRUCTION. DESCRIBED BY < 1 - 1 >  ASSETS
   [ DESCRIBES < 0 - M > EXTERNAL MOVEMENT INITRUCTION ]
EXTERNAL MOVEMENT INSTRUCTION. CREATES < 0 - 1 > ¯ INTERNAL GCSS MOVEMENT
   [ CREATED BY < 0 - 1 > EXTERNAL MOVEMENT INITRUCTION ]

F I G. 8C

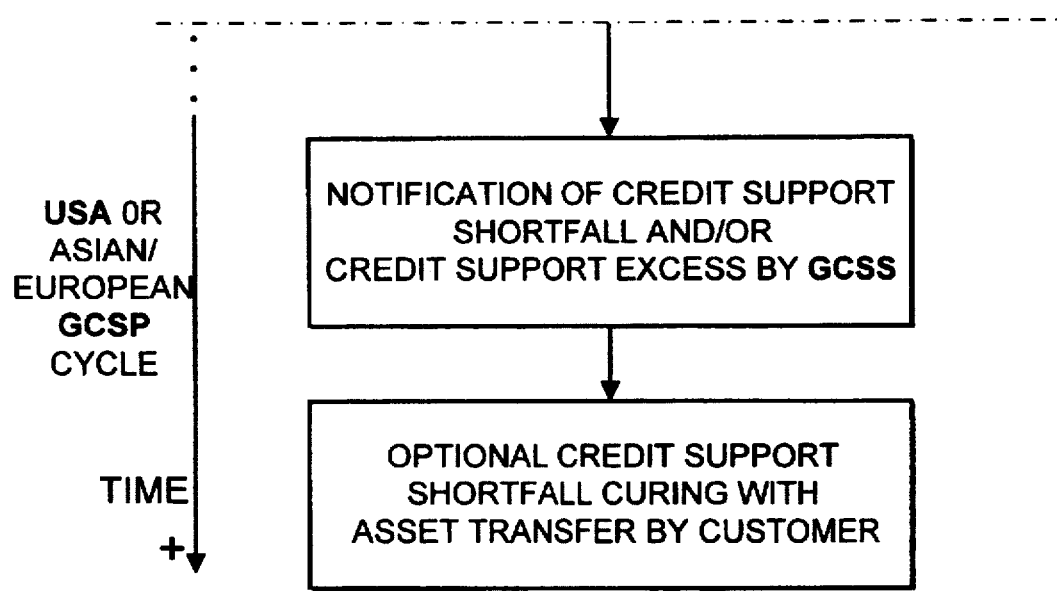
F I G. 14B

USER MANAGEMENT

FILE  HELP

USER PROFILE INFORMATION

| | |
|---|---|
| GCSS CUSTOMER NUMBER: | 12345678 |
| CUSTOMER NAME: | BARINGS SECURITIES |
| USER NAME: | NICK LEESON |
| USER ID: | NLEESON |
| PASSWORD: | ROSEBUD45 |

[CREATE NEW USER]

[CONTACT DETAIL]

USER PERMISSIONS

| ACCOUNT | LOCATION | CREDIT SUPPORT | INSTRUCT DELIVERY | INSTRUCT RECEIPT | VIEW ASSETS |
|---|---|---|---|---|---|
| 130-1 | LONDON | VIEW | NO | NO | YES |
| 130-2 | NEW YORK | VIEW | NO | NO | YES |
| 130-3 | SINGAPORE | ENTRY | YES | YES | YES |

[FIND] [INSERT] [UPDATE] [DELETE] [CLOSE]

F I G. 15A

CREDIT SUPPORT AGREEMENT

CMS CREDIT SUPPORT AGREEMENT NUMBER: 123456789  
VERSION NUMBER: 6.0

AGREEMENT DATE: 10-OCT-96

CREDIT EXPOSURE

FREQUENCY: WEEKLY  
DAY OF WEEK: MONDAY  
CURRENCY: GBP

NAME: EUROPEAN BANK OF RECONSTRUCTION AND DEVELOPMENT  
NUMBER: 123456789

OPTIMISATION CYCLE: USA

COUNTERPARTY

NAME: MORGAN STANLEY  
NUMBER: 123456789

DELIVERY TIME: 1 DAYS  
RETURN TIME: 0 DAYS

VERSION TIMESTAMP: 18-SEP-99 0930

MODIFICATION EFFECTIVE DATE: 9-DEC

EFFECTIVE DATE OF VERSION CURRENCY IN EFFECT: 1-OCT-99

APPROVED ☐  
APPROVED BY COUNTERPARTY ☐  
UPDATED ☐ UPDATED BY COUNTERPARTY NOT YET APPROVED ☐

[ CLONE ] [ TERMINATE ] [ APPROVE/SEND ] [ SIEZE/DEFAULT ] [ AMENDMENT HISTORY ]  
[ CREATE NEW ] [ UPDATE ] [ CANCEL ] [ COUNTERPARTY INFORMATION... ]  
[ PRINT ] [ ELIGIBLE ASSET TYPES... ] [ CLOSE ]

F I G. 15B

| COUNTERPARTY INFORMATION | | | | |
|---|---|---|---|---|
| GCSS ACCUONT NAME: | | BANK OF AMERICA | | EBRD |
| INTERNAL AGREEMENT NUMBER: | | MA0052 | | 20078 |
| GCSS AGREEMENT NUMBER: | | 87654321 | | 87654321 |
| INDEPENDENT AMOUNT: | DEM | 1,000,000 | FRF | 0 |
| THRESHOLD: | DEM | 1,000,000 | FRF | 2,000,000 |
| MINIMUM TRANSFER AMOUNT: | DEM | 200,000 | FRF | 100,000 |
| ROUNDUP VALUE: | DEM | 200,000 | FRF | 100,000 |
| ROUNDUP AMOUNT: | DEM | 100,000 | FRF | 50,000 |
| BASIC AMOUNT: | DEM | 100,000 | FRF | 50,000 |
| RUONDUP TYPE: | | HOLIDAY CALENDAR | | HOLIDAY CALENDAR |
| THRESHOLD CALCULATION METHOD: | | | | |
| OUTGOING PREFERENCE: | 100,000 | | | |
| REPO: | | | | |
| ON-TRANSFE: | | | | |
| INDEPENDENT AMOUNT NET: | | | | |
| SUM INDEPENDENT AMOUNT AND BASIC AMOUNT NET: | | | | |
| CREDIT SUPPORT AGREEMENT: | | | | |
| ENTERED DATE: | | 10-OCT-94 | | 12-NOV-94 |
| ENTERED BY: | | G.SAMPSON | | JP.BELLAV |
| LAST MODIFIED DATE: | | 6-DEC-95 | | 18-DEC-95 |
| LAST MODIFIED BY: | | G.SAMPSON | | JP.BELLAV |
| ACCEPTED BY: | | G.SAMPSON | | JP.BELLAV |

EFFECTIVE DATE: 16-MAR-96  DATE ACCEPTED: 6-FEB-96

DATE (LAST MODIFIED) ACCEPTED: 18-FEB-96

CREDIT EXPOSURE ENTRY

| AGREEMENT NUMBER | 123456 | COUNTERPARTY | CAISSE DE DEPOT |

CREDIT EXPOSURE: 1,250,000

BRING PREVIOUS VALUE FORWARD

☐ CHECK TO BLOCK ON-TRANSFER

☐ CHECK TO DECLINE DELIVERY

DISPLAY ALL VALUES IN CURRENCY: DEM ⇨

| SEND NOW | CANCEL | CLOSE (SEND LATER) |

FIG. 15F

ELIGIBLE ASSET TYPES

| ASSET TYPE | VALUATION PERSENTAGE | ACCEPT/ EXCLUDE | RATING | MATURITY BAND | GEOGRAPHY | CURRENCY |
|---|---|---|---|---|---|---|
| US TSY | 98% | ACCEPT | Y | Y | | |
| US TSY | 98% | ACCEPT | Y | Y | | |
| US TSY | 98% | ACCEPT | Y | Y | | |

| ELIGIBLE SPECIFIC ASSETS | | | | | CLOSE |

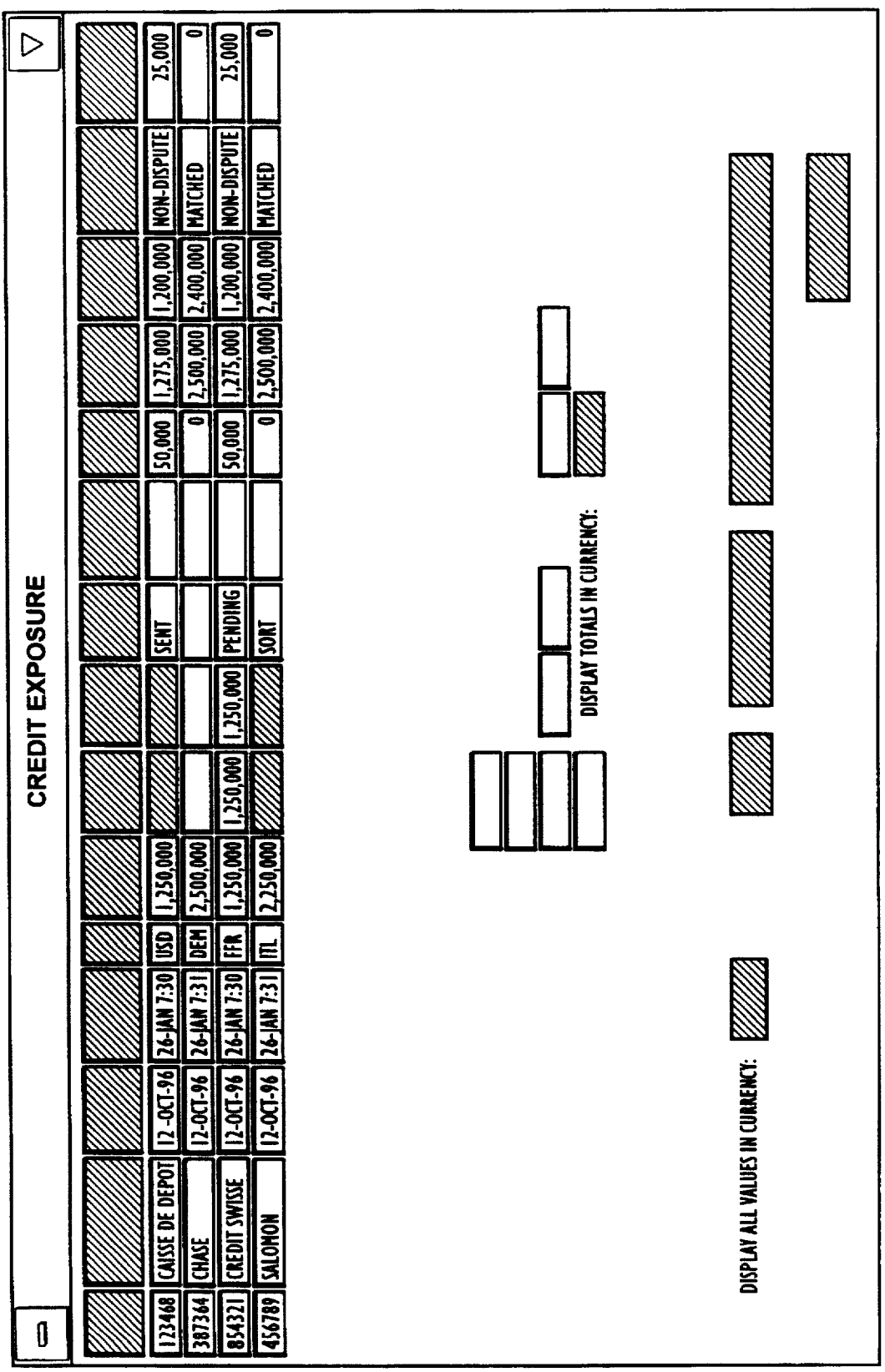
F I G. 15E

FIG. 15G

ELIGIBLE SPECIFIC ASSETS

| ISIN | SECURITY DESCRIPTION | VALUATION PERCENTAGE | ACCEPT/ EXCLUDE | PREFERENCE |
|---|---|---|---|---|
| 123456AB7 | US 6.75 2/97 | 98% | ACCEPT | FEDWIRE A/C |
| 123678CD9 | GM 8.375 01/00 | 80% | EXCLUDE | DTC A/C # |

DELETE  CLOSE

FIG. 15H

ORIGINAL ASSET MANAGEMENT

| ASSET TYPE | VALUATION PERCENTAGE | DELIVERY INSTRUCTION |
|---|---|---|
| US TSY | 98% | |
| EUROBOND | 90% | |
| FRF CASH | 100% | |

CLOSE

FIG. 15I

OPTIMIZATION RESULTS REPORT

| CONTERPARTY | AGREEMENT NUMBER | BASIS | VALUETION | EXCESS/SHORTFALL |
|---|---|---|---|---|
|  |  |  |  |  |
|  |  |  |  |  |
|  |  |  |  |  |

12 DEC 96

[SORT...] [DETAIL...] [CLOSE]

FIG. 15J

OPTIMIZATION RESULTS REPORT DETAIL

COUNTERPARTY: _____  STATUS: _____
BASIS: _____  VALUE: _____
EXCESS/SHORTFALL: _____  CURRENCY: _____
ISIN: _____  SECURITY TYPE: _____
QUANTITY: _____  PRICE: _____
SECURITY DESCRIPTION: _____

[CLOSE]

METHOD AND SYSTEM FOR PROVIDING CREDIT SUPPORT TO PARTIES ASSOCIATED WITH DERIVATIVE AND OTHER FINANCIAL TRANSACTIONS

FIELD OF INVENTION

The present invention relates to a Global Credit Support (GCSS) system and method for facilitating and managing the movement of assets (i.e., securities and cash) between counterparties for collateralization of derivative and other financial market exposures.

BRIEF DESCRIPTION OF THE PRIOR ART

Market studies have determined that there has been a growing trend toward bilateral collateralization between major over-the-counter derivatives market participants. The reason for this trend is quite clear. Bilateral collateralization provides a means of reducing the risks associated with the credit exposure between counterparties. As credit support agreements are the means used to realize bilateral collateralization, an overview of such agreements, including their terms and considerations regarding their execution is in order.

The credit support agreements are governed by the jurisdiction of the country in which the agreements are situated. Unfortunately, however, there is little compatibility between countries, an array of security transfer mechanisms are used, seamless cross-border asset substitutions are extremely difficult, and most credit support agreements are based on U.S. assets. In general, most bilateral credit support agreements between major derivatives dealer-broker and banks are managed internally.

Credit support agreements in the derivatives industry are being standardized by the International Swaps and Derivatives Association (ISDA). However, because national laws provide which security arrangements will be respected in insolvency, there are presently three different standard credit support agreement types for ISDA. Parties choose the agreement which provides the greatest legal comfort according to the law likely to construe enforceability in an insolvency.

Under a typical credit support arrangement, a customer calculates periodically (e.g. daily) its credit exposure with the counterparty. The frequency of credit support asset valuation varies and is agreed between the counterparties. In the prior art systems, an individual must telephone each counterparty and negotiate a mutually agreed upon valuation for the asset portfolio. Depending upon the agreed mark-to-market value (MTM), a credit exposure is determined according to a series of calculations. Assets, in the form of securities and/or cash, are transferred to cover credit exposures. A typical large financial institution may have more than seventy-five counterparties and hundreds of underlying deals with each of those counterparties. As many as ten or more different computer-based systems may be required to calculate mark to market values (MTM) and a large staff to agree on MTMs and make deliveries of credit support assets. If an asset transfer is required, it must be accomplished manually via previously agreed upon mechanisms.

A credit support agreement between the counterparties typically stipulates terms under which credit exposures are calculated and assets transferred. Typically, a credit support agreement includes a minimum transfer amount, a tranche or minimum block size, eligible securities, valuation percentages (i.e., haircuts) for each class of securities, and conditions under which assets shall move, and in what direction among the parties. When negotiating cover for their credit exposures, each counterparty must take all these criteria into consideration.

As changes are negotiated outside the system, personnel must also handle renegotiation of credit support agreements and the negotiation of new agreements. This means tracking the various versions of credit support agreements for each pair of counterparties. This becomes a major task in situations where there may be a number of versions of an agreement, each having a different initiation date.

In short, prior art credit support systems are error prone and time-consuming in the negotiation and implementation of credit support arrangements, resulting in incremental costs to both counterparties.

Furthermore, as markets move towards collateralization deals as credit lines fill up, dealer-broker-dealers and banks must provide more efficient means of conducting their current business in order to maintain competitiveness, increase margins, and be able to effect additional business in the derivatives market.

Consequently, there is a great need in the art to provide an improved system and method of supporting bilateral collateralization between parties in a way that reduces the cost of implementing their bilateral credit support agreements, while reducing the amount of assets required to support their financial dealings.

OBJECTS AND SUMMARY OF THE PRESENT INVENTION

Accordingly, a primary object of the present invention is to provide a novel computer-based system and method of efficiently managing bilateral credit support agreements between parties engaged in derivatives and other financial markets, while avoiding the shortcomings and drawbacks of prior art methodologies.

Another object of the present invention is to provide such a system, which allows parties using the system to more efficiently manage their current business, reduce overhead, and support new business using the same system.

Another object of the present invention is to provide such a computer-based system that can be readily used by primary and secondary tier derivatives dealers and derivatives end-user banks that wish to reduce overhead costs involved in managing their credit exposures and assets used to collateralize their bilateral credit support agreements.

A further object of the present invention is to provide a computer-based credit support system which does not require information details regarding the underlying transactions for which the system provides credit support.

A further object of the present invention is to provide such a system in which credit support assets can be efficiently and inexpensively managed (e.g., moved) in an automated manner, while simultaneously providing a quicker and easier means for credit support asset valuation, position, administration, and more efficient use of eligible assets.

A further object of the present invention is to provide such a system which can be readily adapted to provide computer-based bilateral collateralization support for transactions involving FX and equity derivatives.

A further object of the present invention is to provide a computer-based credit support system in which the parties can record credit support agreements of various legal effect which will each be implemented by the system with regard to the legal requirements pertaining thereto.

A further object of the present invention is to provide a computer-based credit support system in which the parties to credit support agreements can provide internationally traded securities as credit support with less legal and operational risk.

A further object of the present invention is to provide such a system, in which all information concerning such assets is maintained in a self-standing system, while the actual custody of such assets is maintained by an independent asset custody system, such as a conventional lending, settlement and clearing system.

A further object of the present invention is to provide such a system in which registered users (i.e., customers) enter and view their computed credit exposures (CES) and credit support assets on a real-time basis using personal computer workstations supporting a graphical use interface.(GUI).

A further object of the present invention is to provide such a system, in which credit support assets of counterparties to credit support agreement are optimally used (i.e., moved) to cover their credit exposures in an automated manner.

A further object of the present invention is to provide such a system, in which credit exposure requirements of counterparties to a credit support agreement can be processed on the same day or next day basis, by choosing a prescheduled Global Credit Support Processing Cycle carried out within the system.

A further object of the present invention is to provide such a system, in which system users are permitted to flexibility specify asset eligibility criteria, designate credit support assets, asset substitutions, asset repurchases, asset rehypothocations, and asset freezes, while maintaining responsibility for their bilateral credit support agreements.

A further object of the present invention is to provide such a system, in which users are provided a maximum amount of flexibility which cut overhead costs and improve margins through more efficient management of the assets used to support their bilateral credit support agreements.

A further object of the present invention is to provide such a system in which multiple information processing cycles are employed so that the system can be used simultaneously by hundreds of parties to credit support agreements who may be physically located anywhere around the globe (i.e., in Europe, America, and Asia alike) without being subject to prejudices or disadvantages.

A further object of the present invention is to provide such a system, in which the credit exposure (mark to market (MTM) positions) of parties can be entered into the database of the System by screen-entry or batch-entry processes.

A further object of the present invention is to provide such a system in which credit exposures entered into the system by the parties are automatically interpreted by rule-based interpretation procedures.

A further object of the present invention is to provide such a system, in which credit support assets are managed on a database having a hierarchical account structure.

A further object of the present invention is to provide a computer-based credit support system, in which party to a credit support agreement is not permitted to view the MTM value entered into the system by its counterparty until the party enters its MTM value.

A further object of the present invention is to provide a computer-based credit support system, in which the parties of credit support agreements recorded therein are provided with an optimal level of manual control with regard to the movement of the credit support assets they hold, up until a predetermined time at which its automated asset movement mode is automatically entered and assets are moved in an optimal manner using linear programming methods.

A further object of the present invention is to provide such a system, wherein customers, using a hierarchical account structure can act, optimally, as a custodian for some of their counterparties.

A further object of the present invention is to provide such a system, in which a wide range of currencies can be used in book-entry type systems.

These and other objects of the present invention will become apparent hereinafter and in the Claims to Invention.

SUMMARY OF INVENTION

According to one aspect of the present invention, a global credit support system (GCSS) is provided for the purpose of tying together customer sites (in the U.S., Europe, and elsewhere throughout the world) via a global communication network (WAN). In order to support customers located in different time zones, the GCSS of the illustrated embodiment provides at least two major information processing cycles which allows Europeans, Americans, and Asians alike to participate in the system in a substantially equal (i.e., fair) manner. The system can be used by primary and secondary tier derivatives dealers and derivatives end users who wish to reduce the overhead of managing their credit exposures and the assets used to collateralize their bilateral credit support agreements.

The GCSS of the illustrative embodiment supports the following functionalities: Screen and batch entry of credit exposures (MTMs); Daily valuation of assets; Automatic rule-based interpretation of credit exposures; Optimalization of asset movement among counterparties to optimally cover credit exposure; Re-use (i.e., rehypothocation) of assets; Automated transfer to/from clearing and settlement accounts; Manual asset movement among counterparties; Ability to remove assets for repo; Ability to re-use and/or block the re-use of assets; Ability to designate assets to counterparties; Ability to cover many counterparties with a single asset delivery instruction; Repo in cooperation with the Cedel Tripartite Repo Service; Secure, reliable, guaranteed, and encrypted communications; Uptime/Availability; Individual holiday calendars; Counterparty specific asset eligibility and haircuts; Multiple users and/or multiple locations; Hierarchical account structure; Automated processing of non-GCSS customers exposures for GCSS users' support; and Periodic (e.g., daily, weekly, monthly, quarterly) entry and coverage of credit exposures.

GCSS customers calculate their exposure to each of their counterparties using their current methods. At GCSS customer workstations, each customer then inputs its credit exposures (i.e., the MTM of all underlying deals) either in bulk or individually using GCSS input screens and/or GCSS file reading mechanisms. Bulk input of credit exposures is accomplished through the creation of a fixed format file by the user. Such a file can be created in most commercial spreadsheets. The customer then indicates to GCSS that the file is available by using a pop-up screen support on its workstation. Once GCSS has received an MTM value from each party, the GCSS publishes both values to each party. GCSS does not allow either party to view the other's credit exposure on its customer workstation until they have both been submitted. The values are accepted from GCSS customers only. GCSS customers may also enter values for their non-GCSS counterparties. However, non-GCSS counterparties are not allowed access to the system.

In the normal course of business, credit exposures may be input on any day that GCSS is operational (up to a defined cut-off time). Updates are sent at regular intervals as defined in the Credit Support Agreement (e.g., daily, weekly, monthly) and may be supplied in advance of a date. GCSS customers may block transfers of assets to a particular counterparty and decline transfers from a particular counterparty.

Based on the size of the exposure, the collateral previously transferred and the terms of the credit support agreement, and any asset-specific or counterparty specific instructions, the GCSS automatically calculates the Amount to Move, the difference between yesterdays and today's Basis, Gross Out, Gross In, Net Totals, Blocked Totals, and Total Exposure.

Assets are moved between the GCSS customer account and that of their counterparty in the direction indicated by the calculations (i.e., amount to move figures). GCSS may notify a customer of the need to bring more assets into the system to meet new, higher credit support requirements or to cover an adverse movement in the value of credit support assets. Customers may move assets to their GCSS account in several ways:

1. Transfers of eligible assets from a clearing and settlement account; these transfers are effected by book entry via the next available processing cycle (daytime or nighttime).

2. Provide GCSS with a power of attorney to draw assets from a clearing and settlement account and transfer them to the GCSS account.

3. Enter into a securities borrowing arrangement within a clearing and settlement account to obtain a loan of the required securities.

4. Move eligible securities over a cross border link into the system.

A customer may remove from GCSS securities not allocated as credit support if the customer deposited the assets to GCSS or received them from a counterparty with rights to re-use the assets. A customer is always able to remove cash balances from GCSS.

GCSS system will credit income from GCSS securities directly to the originator as long as the security remains in GCSS. This is achieved by maintaining for every security position a notation of its originator, regardless of actual position in the system as a result of transfers and on-transfers. This functionality makes it easier to satisfy the general requirement in credit support agreements that the secured party or transferee make payment to the pledgor, chargor, or transferor in amounts equal to any income received on securities.

Other advantages of the present invention will become apparent hereinafter.

BRIEF DESCRIPTION OF THE DRAWINGS

For a more complete understanding of the objects of the Invention, the following Detailed Description of the Illustrative Embodiments should be read in conjunction with the accompanying Drawings, in which:

FIG. 4A is a schematic representation of the information structure entitled CUSTOMER ACCOUNT specifying the various information fields thereof and the type of information contained therein;

FIG. 4B is a schematic representation of the information structure entitled ACCESS RIGHTS PROFILE, specifying the various information fields thereof and the type of information contained therein;

FIG. 4C is a schematic representation of the information structure entitled CONTACT DETAIL, specifying the various information fields thereof and the type of information contained therein;

FIG. 4D is a schematic representation of the information structure entitled CUSTOMER ORIGINAL ASSET RULES, specifying the various information fields thereof and the type of information contained therein;

FIG. 4E is a schematic representation of the information structure entitled CUSTOMER PREFERENCE, specifying the various information fields thereof and the type of information contained therein;

FIG. 4F is a schematic representation of the information structure entitled CUSTOMER ELIGIBILITY, specifying the various information fields thereof and the type of information contained therein;

FIG. 4G is a schematic representation of the information structure entitled CUSTOMER CASH CORRESPONDENT, specifying the various information fields thereof and the type of information contained therein;

FIG. 4H is a schematic representation of the information structure entitled MASTER, specifying the various information fields thereof and the type of information contained therein;

FIG. 5A is a schematic representation of the information structure entitled CUSTOMER CREDIT AGREEMENT, specifying the various information fields thereof and the type of information contained therein;

FIG. 5B is a schematic representation of the information structure entitled AGREEMENT ELIGIBLE COLLATERAL, specifying the various information fields thereof and the type of information contained therein;

FIG. 5C is a schematic representation of the information structure entitled AGREEMENT PREFERENCE specifying the various information fields thereof and the type of information contained therein;

FIG. 5D is a schematic representation of the information structure entitled COMMON CREDIT AGREEMENT specifying the various information fields thereof and the type of information contained therein;

FIG. 6A is a schematic representation of the information structure entitled OMNIBUS POSITION, specifying the various information fields thereof and the type of information contained therein;

FIG. 6B is a schematic representation of the information structure entitled ASSET, specifying the various information fields thereof and the type of information contained therein;

FIG. 6C is a schematic representation of the information structure entitled ASSET, TYPE, specifying the various information fields thereof and the type of information contained therein;

FIG. 6D is a schematic representation of the information structure entitled SECURITY, specifying the various information fields thereof and the type of information contained therein;

FIG. 6E is a schematic representation of the information structure entitled CURRENCY, specifying the various information fields thereof and the type of information contained therein;

FIG. 6F is a schematic representation of the information structure entitled SECURITY PRICE, specifying the various information fields thereof and the type of information contained therein;

FIG. 6G is a schematic representation of the information structure entitled FX RATE, specifying the various information fields thereof and the type of information contained therein;

FIG. 6H is a schematic representation of the information structure entitled CORPORATE ACTION, specifying the various information fields thereof and the type of information contained therein;

FIG. 6I is a schematic representation of the information structure entitled CASH INTEREST BALANCE, specifying the various information fields thereof and the type of information contained therein;

FIG. 7A is a schematic representation of the information structure entitled ASSET PIECE, specifying the various information fields thereof and the type of information contained therein;

FIG. 7B is a schematic representation of the information structure entitled INTERNAL GCSS MOVEMENT, specifying the various information fields thereof and the type of information contained therein;

FIG. 7C is a schematic representation of the information structure entitled CUSTOMER ASSET POSITION, specifying the various information fields thereof and the type of information contained therein;

FIG. 7D is a schematic representation of the information structure entitled CREDIT EXPOSURE, specifying the various information fields thereof and the type of information contained therein;

FIG. 7E is a schematic representation of the information structure entitled SUBSTITUTION REQUEST, specifying the various information fields thereof and the type of information contained therein;

FIG. 8A is a schematic representation of the information structure entitled EXTERNAL MOVEMENT INSTRUCTION, specifying the various information fields thereof and the type of information contained therein;

FIG. 8B is a schematic representation of the information structure entitled CEDCOM MOVEMENT INSTRUCTION, specifying the various information fields thereof and the type of information contained therein;

FIG. 8C is a schematic representation of the information structure entitled FED MOVEMENT INSTRUCTION, specifying the various information fields thereof and the type of information contained therein;

FIGS. 14A and 14B are high-level process diagrams indicating the various processes that are carried out with the GCSS during a credit support processing cycle in the GCSS;

FIG. 15A is a graphical representation of a graphical display screen which is used by the administrators of the GCSS in order to enter new customers in the system, open customer accounts, and perform other administrative and custodial functions;

FIGS. 15B and 15C are graphical representations of two exemplary graphical display screens which are used by customers of the GCSS in order to create, modify, terminate and review Credit Support Agreements management within the GCSS of the present invention;

FIGS. 15D and 15E are graphical representations of two exemplary graphical display screens which are used by customers of the GCSS in order to enter credit exposures and instructions into the GCSS, as well as resolve issues regarding credit exposure between counter-parties (i.e., customers) and eligible credit support assets thereof;

FIGS. 15F and 15G are graphical representations of two exemplary graphical display screens which are used by the customers the GCSS in order to optionally transfer credit support assets to its counter-parties, by customer-designated (i.e., manual) movement operations, after notification of credit asset delivery and/or credit asset return instructions by the GCSS;

FIG. 15H is a graphical representations of a graphical display screen which is used by the GCSS in order to notify its customers of the results (i.e., asset movements effected) performed by the automated asset movement process of the GCSS; and FIGS. 15I and 15J are graphical representations of a display screen used to notify GCSS customers of the results of the Asset Movement Optimization Process.

DETAILED DESCRIPTION OF THE BEST MODE EMBODIMENT OF THE PRESENT INVENTION

Referring to the figures of FIGS. 1 through 15J, the best mode embodiment of the present invention will be described in detail below.

In general, the global credit support system of the present invention (hereinafter GCSS ) may be realized in a variety of ways depending on the enabling technology available at the time of realization, and particular application requirements at hand. In the illustrative embodiment, the GCSS is realized as network of client-server workstations spatially distributed about the planet Earth in order to provide service to the multitude of users that the system is designed to serve. It is understood, however, that the system can be realized in other ways using, for example, a main-frame computing platform with spatially distributed user-interface terminals, and the like.

Figure 1:
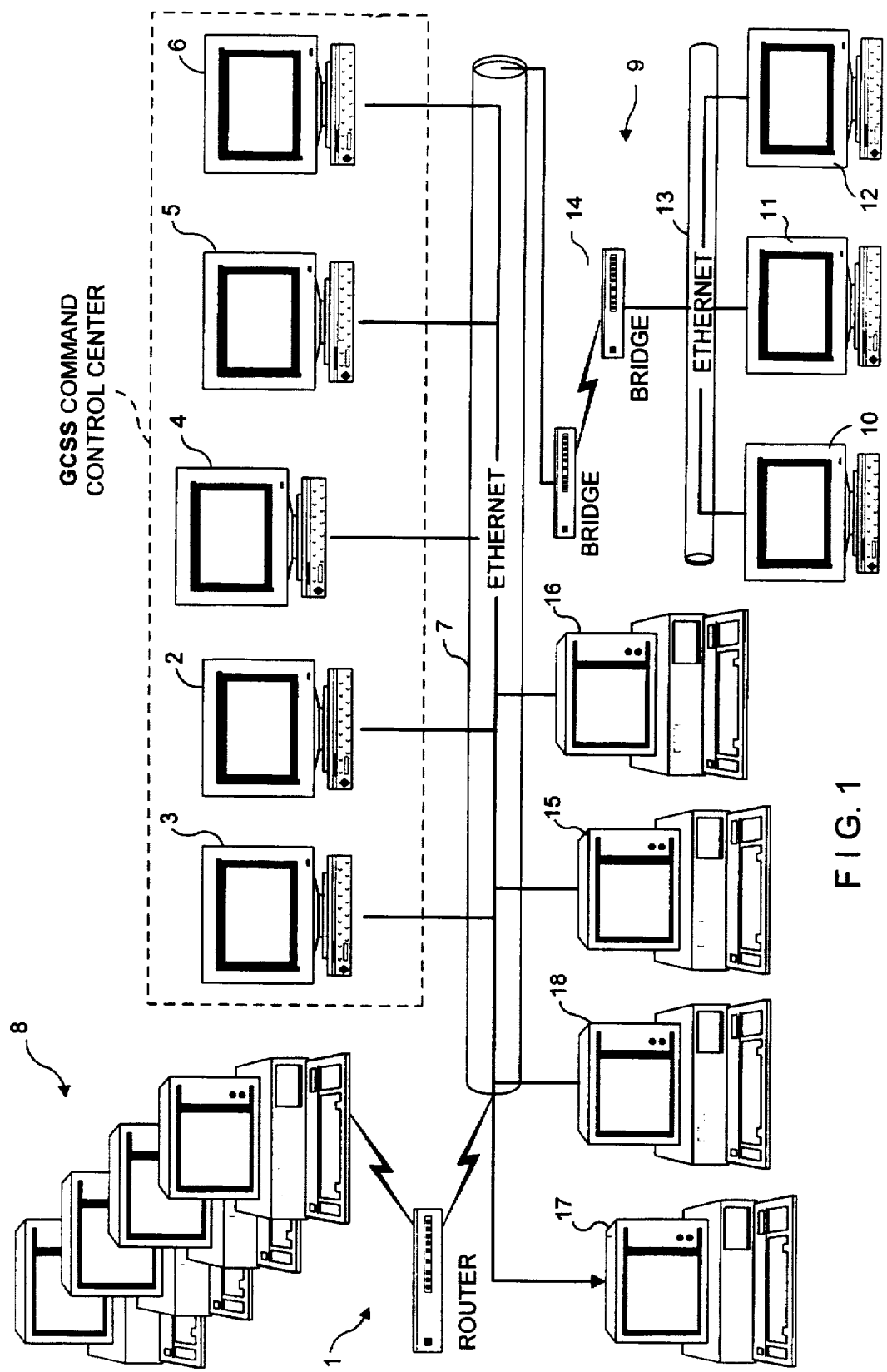
FIG. 1 is a schematic hardware diagram of the global credit support system of the present invention, shown realized as a plurality of client-server workstations in operable communication with each other through a wide area networks (WAN)

As shown in FIG. 1, the GCSS of the illustrative embodiment comprises: a plurality of personal computers (e.g., realized as Sun Microsystems® computing platforms) providing an Database Server 2, an Optimization Server 3, an Authentication Server 4, a first GCSS Process Server (1) 5 and a second GCSS Process Server (2) 6, each interconnected to a Local Area Network (LAN) 7; a plurality of group of GCSS Customer Workstations (e.g., groups of desktop computer systems) 8 interconnected to the GCSS Servers by way of routers and communication support equipment of a Wide Area Network (WAN) 9; a Backup/Mirrored Database Server 10, a Backup Optimization Server 11, and a Backup GCSS Process Server 12 each interconnected to a Local Area Network (LAN) 13 and interconnected to LAN 7 site by bridges 14, in a conventional manner; a Pricing Workstation (e.g., realized as desktop computing system) 15 for providing asset valuation information, and connected to the LAN 7; a GCSS Operations Workstation 16 connected to LAN 7, for performing management operations pertaining to the GCSS; a custody clearing and settlement system (e.g., such as the LCS system operated by Cedel of Luxembourg) 17 for maintaining an Omnibus Account, in which all cash and securities in the GCSS are held and managed on behalf of GCSS customers by the GCSS Operator which, preferably functions legally as a fiduciare to each and every GCSS customer; and a SPEED Link Fedwire Terminal 18 connected to LAN 7, for transferring to the GCSS Server Workstations, information representative of U.S. federal electronic funds and securities transfer. Preferably, although not essential to the present invention, each GCSS Server described above is located at a central site where system managers are physically located. Also, each GCSS Customer Workstation is typically located at the customer site, although it is understood that each such Workstation within its customer group need not be physically located with all Workstations within the group, but may be networked together using conventional communication networking technology well known in the art.

In the illustrative embodiment, each GCSS Workstation 8 at the customer site supports a graphical user interface (GUI) using a GUI generator, such as PowerSoft's PowerBuilder. The particular character of the GUI may vary from embodiment to embodiment of the invention. However, it is preferred that each such GUI provides an array of display screens which facilities easy entry of information by the GCSS customer during the day, as well as display various types of reports and notifications produced by the GCSS. The personal computers used to realize each GCSS Customer Workstation can run virtually any type of operating system, such as the Microsoft Windows NT operating system, Microsoft Windows 3.1 operating system, Unix operating system, or the Macintosh® operating system. Each GCSS Server 2, 3, 4, 5, 6, 10, 11, and 12 is preferably realized as one or more Sun Microsystem SPARC computing platform running the Solaris operating system. As will described in greater detail hereinafter, the GUI process running on each GCSS Customer Workstation cooperates with central server processes operating on the GCSS Servers at the central site by way of a data-packet network communication protocol supported over WAN 9.

In the illustrative embodiment, the processes of the present invention are realized as client-server based processes, wherein a GCSS Server 5 or 6 supports the server portion of the process, while a GCSS Customer Workstation 8 supports the client portion thereof In order realize such client-server processes upon the GCSS, a data-packet network communication protocol is employed by the GCSS Customer Workstations and the GCSS Server Workstations thereof. A suitable network communication product for this system implementation is a Teknekron Information Bus (TIB) based communication product commercially available from Teknekron Software Systems, Inc. of Palo Alto, Calif. Notably, to ensure secure communications throughout the GCSS, all data transmissions between the GCSS Customer Workstations and central GCSS Server Workstations are encrypted using conventional data encryption technology.

The benefits of using the TIB-based architecture described above are numerous. Primarily, it provides flexibility in being able to change one process within the GCSS, without effecting other processes. Also, it provides for easier system maintenance and improved security. Moreover, the TIB architecture reinforces the design goals of GCSS, namely: modularity, abstraction, and encapsulation. These design features of the GCSS hereof will be briefly described below.

Encapsulation involves isolating the internal mechanisms of individual processes so that no part of the system is dependent on the internal details of any other part thereof. In contrast with a monolithic structure wherein a single large process is composed of interconnected and interdependent subprocesses, an encapsulated system has a series of independent communicating processes. Consequently, in the encapsulated system design of the present invention, the problem of developing, maintaining, and changing the system is simply reduced to exchanging modules rather than modifying a monolithic interdependent system.

Modularity is inherent in encapsulation and simplifies the design goal of engineering each process as a separate standalone entity realized by its own set of code. This makes it possible to alter the code of a process without affecting other processes. Because processes shall communicate via messages, changes to the way in which a process handles a message shall not affect another process within the system.

Abstraction is the isolation of data accessing operations from data processing operations. The primary advantage of this system design feature is that it makes possible for the relational database of the GCSS, which will be described in great detail hereinafter, to be changed without affecting the many processes that use it. Another advantage of this system design feature is that it minimizes the need for stored procedures and triggers, thus making even the database engine independent of data processing engine of the GCSS. This feature of the system permits the operator of the GCSS to change from one to another database programming language or another one, while only requiring the reengineering of a minimum number of processes. This system design feature ensures that the GCSS is easily updatable and maintainable system characterized by high performance, with maximum flexibility and extensibility.

All information items pertaining to GCSS customers, their accounts, credit support agreements, credit support assets, credit exposures, chains of asset transfers among counter-parties and the like, are maintained within a database maintained within the GCSS Database Server Workstation 2. In the preferred embodiment, this database is realized as a relational database using database management computer software, such as Oracle 7.x. Pro-C, or any other database management software. The construction of the relational database of the present invention will be described in great detail hereinafter with reference to FIGS. 3 through 8C.

Figure 2A:
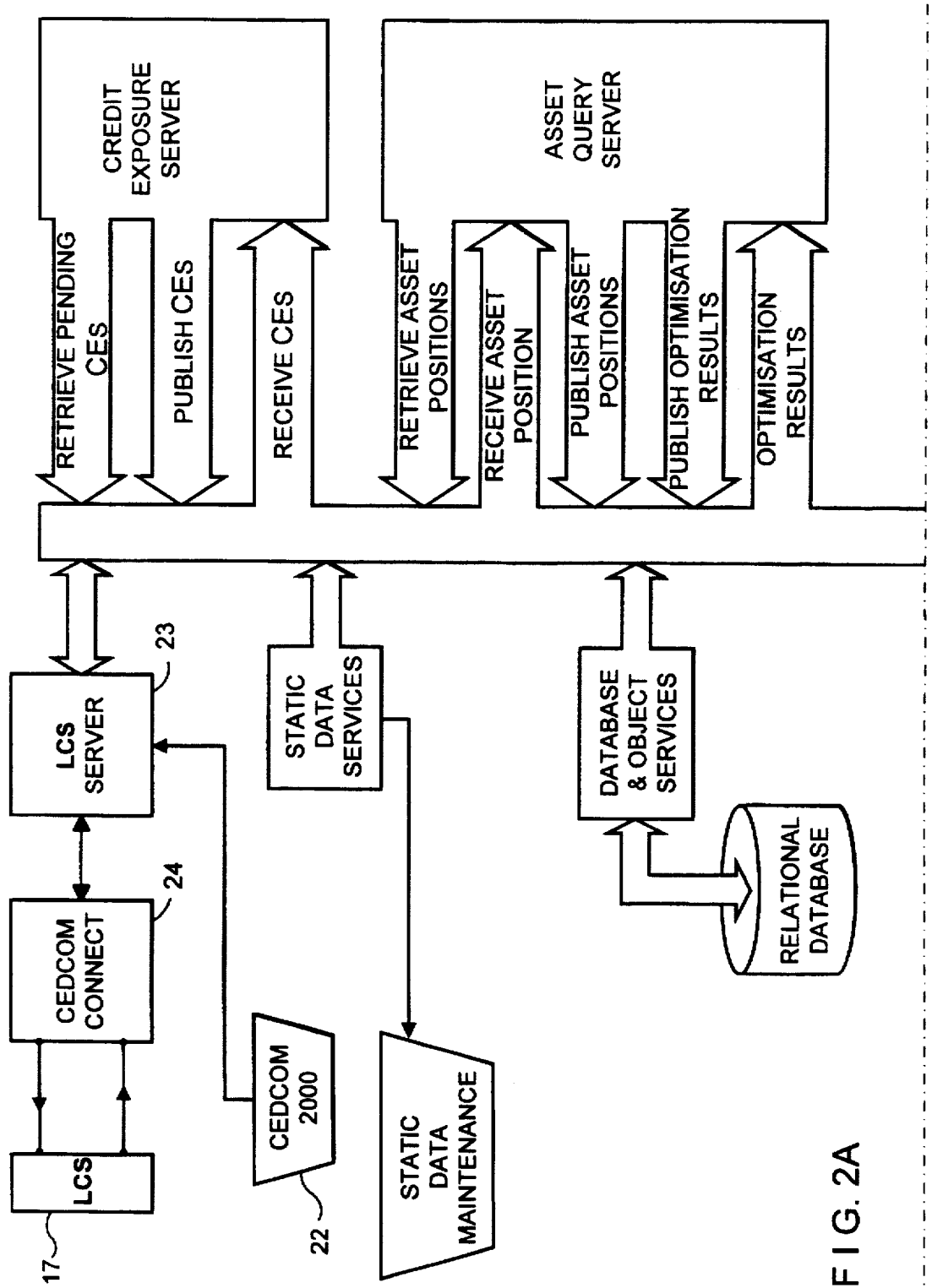
FIG. 2 is a schematic diagram of the physical architecture of the GCSS of the present invention, showing various processes carried out on the client-server workstations of the system.
Figure 2B:
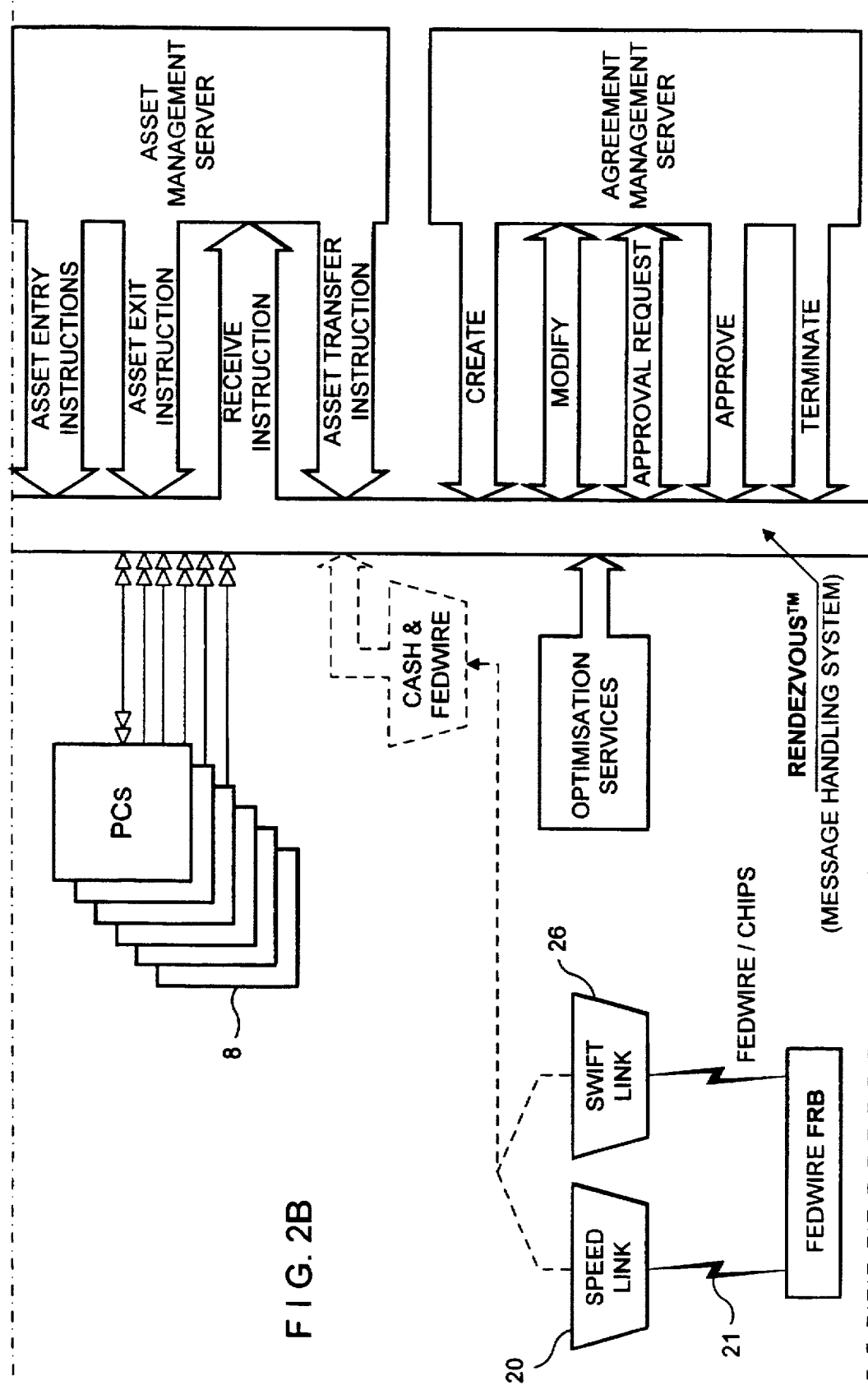
Figure 2C:
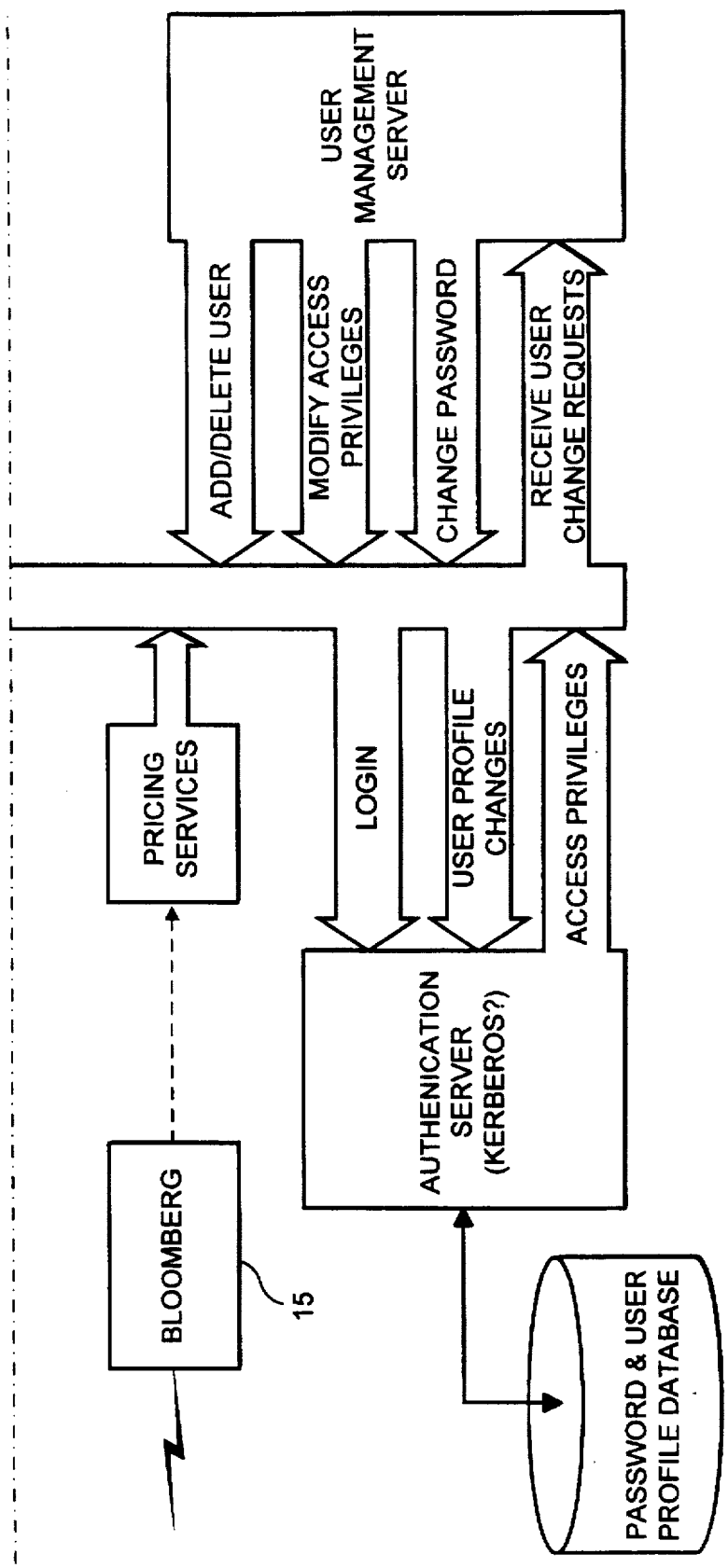

Referring to FIG. 2, a functional overview of the GCSS of the present invention will be described below.

In general, GCSS is a globally distributed computer-based information network (i.e., system) for tying together customer sites in the U.S., Europe and Asia via a Wide Area Telecommunications Network (WAN). Typically, several hundred broker-dealers, banks, and end users can simultaneously use GCSS. In order to support the different time zones, GCSS provides two major processing cycles which allows Europeans, Americans, and Asians to participate in the system without handicaps or disadvantages owing to their geographical location on the Earth.

Each GCSS customer opens a GCSS account and transfers to the system assets which are available for use in providing collateral to counterparties providing credit to the GCSS customer. Such an account contains customer identification information, asset information, and various unilateral parameters unique to the preferences of the customer. Then using the GUI at its GCSS Customer Workstation, each customer (i.e., party) and its counterparty to a credit support agreement, creates a credit support agreement report with bilateral parameters typically found in ISDA credit support agreements. The parameters of each such credit support agreement report are jointly entered into the relational database of the GCSS by a pair of authorized GCSS customers. Once entered into the system, such credit support agreement reports can be modified by the parties by way of their GCSS Customer Workstations with the agreement of the relevant counterparty, or terminated by either counterparty unilaterally.

Thereafter, the customers calculate their or their counterparty net positions or credit exposure (i.e., "mark-to-market" values) with respect their counterparties, using their current methods and algorithms. Customers then input to their GCSS Customer Workstations, their credit exposures either individually or in bulk using GCSS input screens and/or GCSS file reading mechanisms. Bulk input of credit exposures can be accomplished through the creation of a fixed format file created by the customer using a commercially available spreadsheet program. Once created, the file can then be read by the GCSS Customer Workstation and then transmitted to the GCSS Database Workstation in which the relational database is realized.

Based on the size of the credit exposure entered into the GCSS, the collateral previously transferred to the GCSS by the respective parties, the daily valuation of credit support assets within the GCSS accounts thereof, and the terms listed in the credit support agreement, the GCSS interprets the entered credit exposure figures using rule-based semantics, and then calculates whether or not additional assets are required for credit support under the credit support agreement report. The amount of assets that must be provided by one party to its counterparty to cover its credit exposure, or returned to a party from its counterparty, is displayed to the customer on the display screen of its GCSS Customer Workstation. Then during an optional period, each customer may do any one or more of things, namely: instruct GCSS by manual-actuation, which particular assets are to be provided thereby to its counterparty in order to cover its credit exposure (i.e. designation); enter a refusal to accept instruction into the GCSS, enter a decline to receive instruction into the GCSS; enter an asset freeze instruction to the GCSS; enter a specific-asset return instruction to the GCSS; and/or enter an asset substitution instruction to the GCSS. If the customer who is required to provide assets to its counterparty does not hold sufficient assets with its GCSS account to cover it outstanding credit exposure, then it may either transfer assets into its GCSS customer account by an associated clearing and settlement account, or Fedwire service.

If the customer who is required to provide assets to its counterparty does not do so manually under his or her own control within the time period allotted to do so, then the GCSS automatically enters its asset movement optimization mode. Based on the size of the net exposure, the terms of the bilateral credit support agreement report therebetween, and the unexecuted asset movement instructions issued by the counterparties up until that time period, the GCSS in the mode of operation automatically computes (using linear programming techniques) optimal asset movements among the participating counterparties to cover the outstanding credit exposures thereamong, simultaneously executes and finalizes the same in an automated manner, and thereafter notifies the GCSS counterparties of the results of the asset transfers, including the positions of the counterparties, shortfalls, excesses, etc. A primary advantage of this system functionality is that, where counterparties permit each other reuse, it allows a single asset to be reused (i.e. rehypothocated) in order to cover the credit exposure of many counterparties, and thereby ensuring optimal utilization of assets in bilateral collateralization applications.

In the event that a party has insufficient assets within its GCSS account to provide to it a counterparty, and thus cover its credit exposure therewith, the GCSS Process Server 5 or 6 notifies both parties of a shortfall of credit support assets by way of a report displayed on its GCSS Customer Workstation 8. If on the other hand, a party has transferred an excess of assets to a counterparty to cover its credit exposure therewith, then GCSS Process Server 5 or 6 automatically notifies both parties of a credit asset excess by way of a report displayed on its GCSS Customer Workstation. Thereafter, each party is given a time period within which to cure any shortfall or excess by manually-actuated function buttons emulated on the GUI of the GCSS Customer Workstation.

In the event that a counterparty does not have a GCSS account, i.e., is not a GCSS member, a GCSS member may sponsor a nonmember by creating an account within its own account hierarchy. In such a case, the GCSS member shall be solely responsible and solely authorized to enter MTMs and agreement information for the non-customer counterparty. Only GCSS customers (i.e., members) are allowed access to GCSS and their own customer accounts.

The Legal Environment for the GCSS of the Illustrative Embodiment

In the preferred embodiment of the present invention, each GCSS customer contracts with the GCSS Operator to use GCSS services and operations. Where necessary, the GCSS Operator will exploit preexisting laws on securities custody, settlement and collateralization, and if necessary, seek changes therein to construct and operate the information, storage, and processing system and method of the present invention.

In the preferred embodiment, legal and equitable title of all of the assets within the GCSS are held by the GCSS Operator, subject to a single fiduciary agreement for each customer (i.e., "the GCSS Fiduciary or Operating Agreement"). The GCSS Fiduciary Agreement allows the GCSS Operator to efficiently allocate assets from one customer to another as needed in order to meet credit support obligations thereof, while ensuring that the differing terms of the security arrangements will be individually respected. The GCSS Fiduciary Agreement will incorporate instructions for disposition of assets which can be varied to reflect different legal requirements in the customer's credit support agreement reports with its various counterparties. For example, a customer may have some New York Law agreements which create pledges under Article 8 of the New York Uniform Commercial Code, some English Law agreements requiring a transfer of credit support assets, and some English law or other charge arrangements. Thus, interests of the counterparties in the assets in the GCSS can vary according to which instructions apply in respect of each counterparty. While this is a preferred way in which to practice the present invention, it is understood that there will be different legal solutions to such problems and that such solutions will depend in part on the particular embodiment of the present invention that one wishes to practice.

Specification Of The Information Structures Comprising The Relational Database Of The Gcss Of The Present Invention Referring to FIG. 3, the structure of the relational database of the GCSS will now be described in detail below.

Figure 3A:
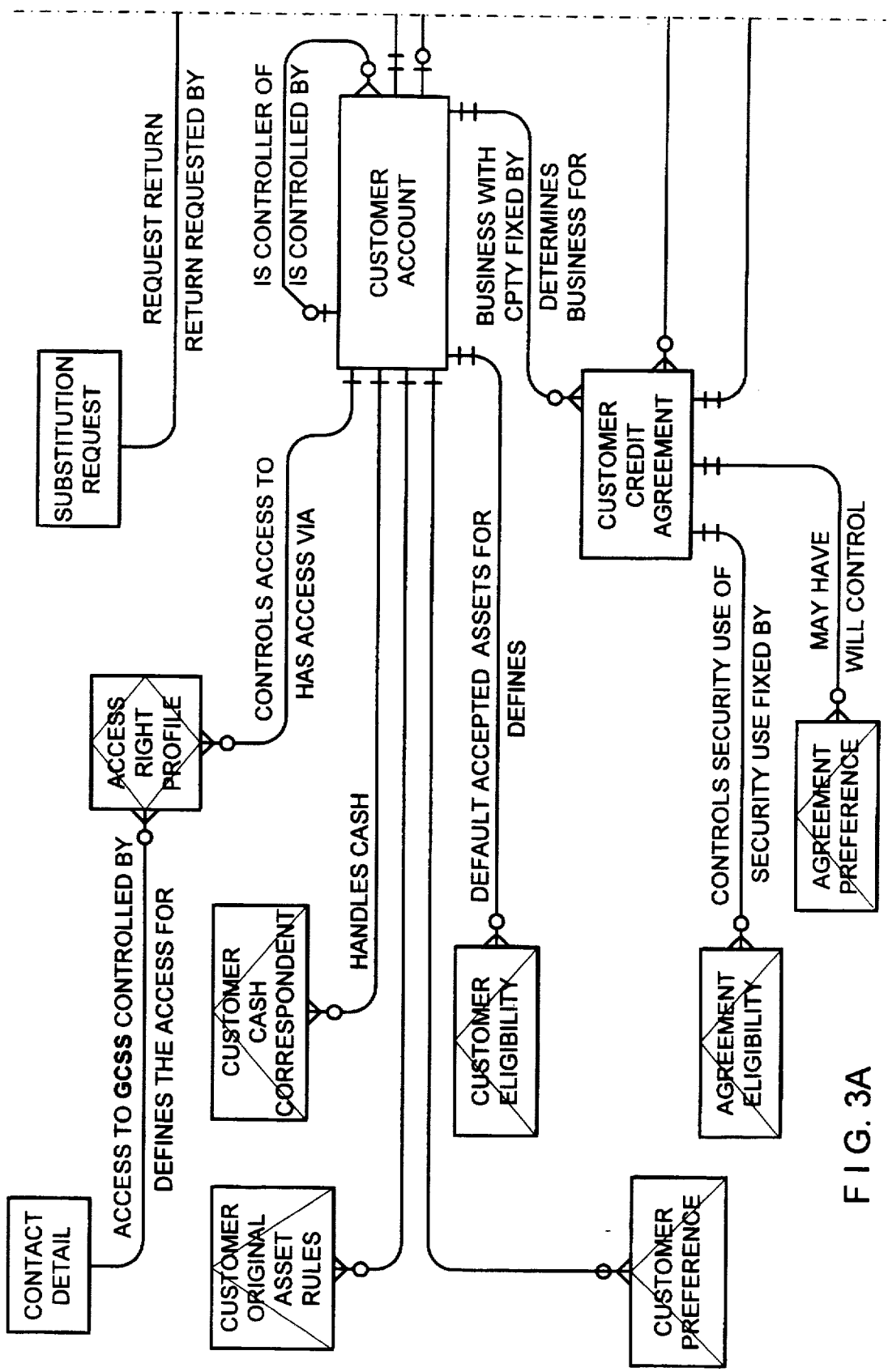
FIG. 3 is a schematic representation (i.e., logical entity model) of the relational database used in the construction of the illustrative embodiment of the GCSS of the present invention, showing the five groups of data structures used in the realization of the diverse functionalities of the system of the present invention.
Figure 3B:
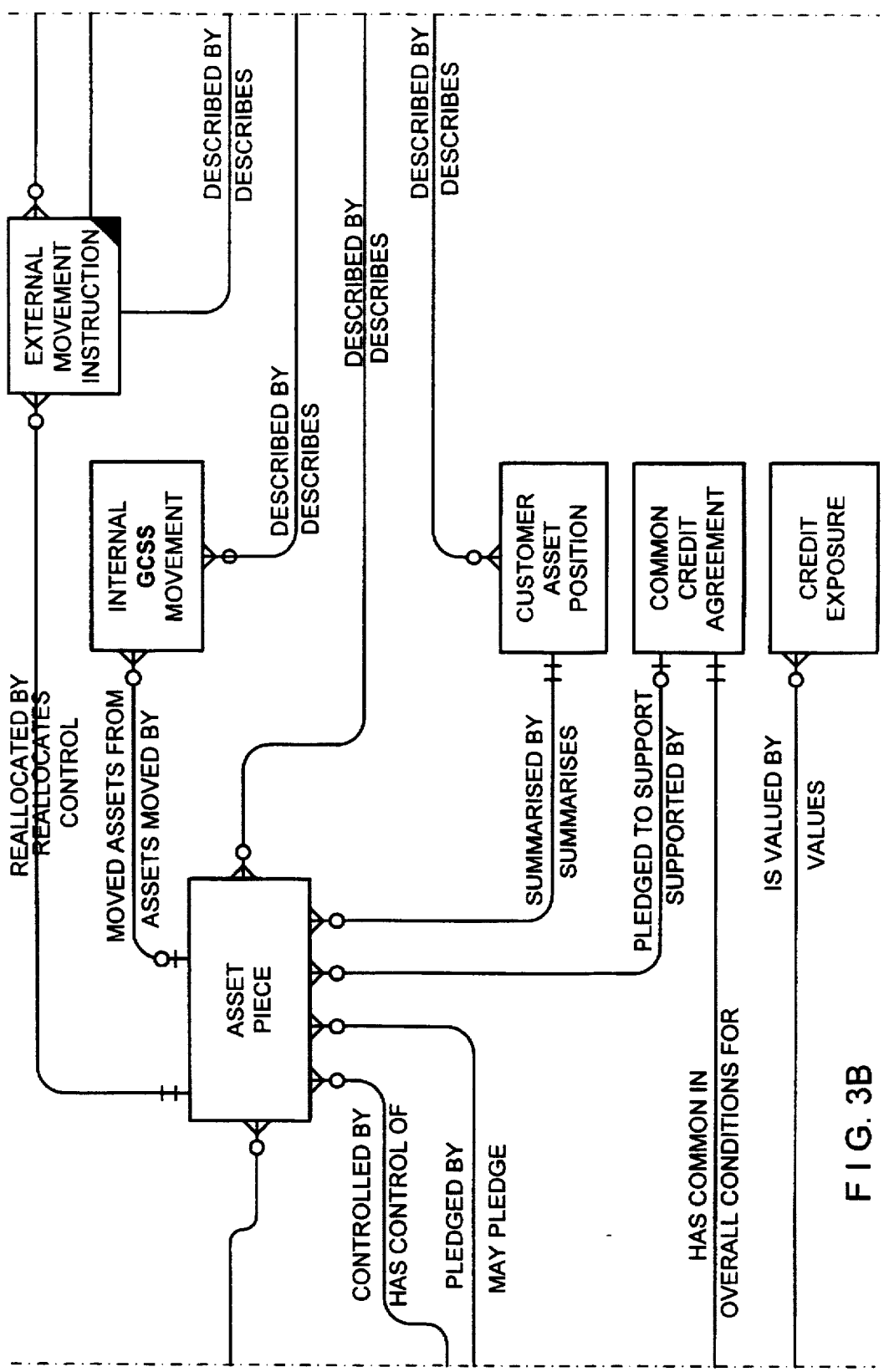
Figure 3C:
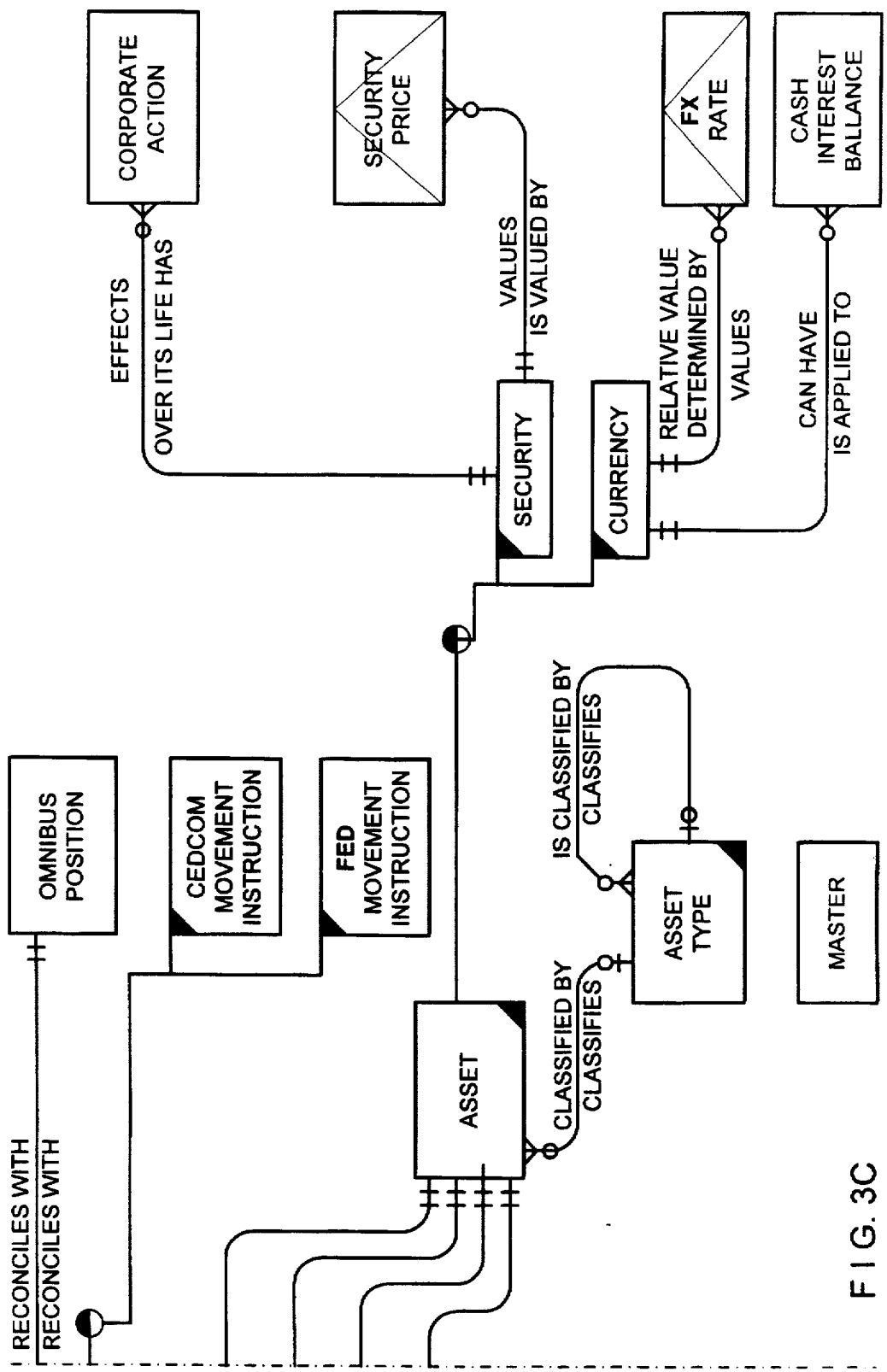

As shown in the information entity model of FIG. 3, the GCSS database of comprises a number of information structures, which are interrelated by the relational links shown. For pedagogical purposes, these information structures are shown associated within five information structure groups, namely: Accounts, Agreements, Assets, Credit Support Functions, and External Asset Movements. The information structures within the Accounts Group are identified by the following information structure titles: CUSTOMER ACCOUNT; ACCESS RIGHTS PROFILE; CONTACT DETAIL; CUSTOMER ORIGINAL ASSET RULES; CUSTOMER PREFERENCE (i.e., PREFERENCE TABLES); CUSTOMER ELIGIBILITY; CUSTOMER CASH CORRESPONDENT; and MASTER. The information structures within the Agreements Group are identified by the following information structure titles: CUSTOMER CREDIT AGREEMENT; AGREEMENT ELIGIBLE COLLATERAL; AGREEMENT PREFERENCE; and COMMON CREDIT AGREEMENT. The information structures within the Assets Group are identified by the following information structure titles: OMNIBUS POSITION; ASSET TYPE; SECURITY; CURRENCY; SECURITY PRICE; FX PRICE; CASH INTEREST BALANCE; and CORPORATE ACTION. The information structures within the Credit Support Functions Group are identified by the following information structure titles: ASSET PIECE (i.e., ASSET PLEDGE); INTERNAL GCSS MOVEMENT; CUSTOMER ASSET POSITION; CREDIT EXPOSURE; and SUBSTITUTION REQUEST. The information structures within the External Movements Group are identified by the following information structure titles: EXTERNAL MOVEMENT INSTRUCTIONS; CEDCOM (i.e., a proprietary digital telecommunication system) MOVEMENT INSTRUCTION; and FED MOVEMENT INSTRUCTIONS. Below, the substructure of each of these information structures will described in detail in the order set forth above.

In FIG. 4A, the substructure of the information structure entitled CUSTOMER ACCOUNT is represented. As shown, the CUSTOMER ACCOUNT information structure comprises a plurality of distinct information fields, each of which is specified by its information field title and the type of information which it contains. The prime identifier for this structure is the GCSS CUSTOMER NUMBER field. These information fields and information types are specified as follows: the information field entitled CUSTOMER NUMBER, stores a unique GCSS account number; the information field entitled CUSTOMER LONG NAME stores an alphanumeric character string identifying the full name of the customer; the information field entitled CUSTOMER SHORT NAME stores an alphanumeric character string identifying the short name of the customer; the information field entitled ACCOUNT STATUS stores a GCSS account status code (e.g., open, closed, default, etc.; the information field entitled MAIN GCSS ACCOUNT NUMBER stores a main account number for customers the information field entitled SWIFT ADDRESS stores an alphanumeric character string identifying the address of the customers for the purpose of receiving electronic payments; the information field entitled PARENT ACCOUNT NUMBER stores a GCSS account number of any parent account within the GCSS; the information field entitled DATE OF MEMBERSHIP stores date of membership of the customer; the information field entitled GCSS OPERATING AGREEMENT REFERENCE stores an alphanumeric character string identifying the GCSS operating agreement under which the GCSS customer account will be operated (i.e., managed); the information field entitled GCSS AGREEMENT SIGNED DATE stores date on which the GCSS operating agreement was signed by the customer; the information field entitled ADDRESS stores an alphanumeric character string identifying the address of the customer; the information field entitled CITY stores alphanumeric character string identifying the city of the customer; the information field entitled STATE stores an alphanumeric character string identifying the state of the customer; the information field entitled COUNTRY stores an alphanumeric character string identifying; the information field entitled POSTAL CODE stores an alphanumeric character string identifying the postal code of the customer; the information field entitled TELEPHONE NUMBER stores an alphanumeric character string identifying the telephone of the customer; the information field entitled FAX NUMBER stores an alphanumeric character string identifying the fax number of the customer; the information field entitled BILLING ADDRESS stores an alphanumeric character string identifying the billing address of the customer; the information field entitled GEOGRAPHIC REGION stores a country code identifying the country of the customer; the information field entitled DEFAULT HOLIDAY CALENDAR stores a default holiday calendar code which specifies a holiday table which is used by the GCSS in connection with the referenced customer account; the information field entitled ALLOW AGREEMENTS FLAG stores a flag bit which indicates whether or not the customer is allowed to create a credit support agreement; the information field entitled OPENED TIMESTAMP stores the time when the GCSS account was originally set up; the information field entitled ACCOUNT OPENED BY stores the user code identifying the user who opened the customer account; the information field entitled PUBLISHED ACCOUNT FLAG stores an indicator flag indicating whether or not the referenced account will be viewed by the GCSS customer; and the information field entitled NON-GCSS CUSTOMER FLAG stores an flag indicating whether the account is managed for a non-GCSS customer. Notably, the information fields of the CUSTOMER ACCOUNT information structure are interrelated with the information structures indicated by the relational links shown in the information entity model of FIG. 3. In general, the primary function of this information structure is to store static information associated with each particular GCSS customer account. Each GCSS customer account can be associated with another GCSS customer account by way of a parent-child relationship. While the GCSS system automatically assigns a unique internal account number to each GCSS customer account opened within the system, the GCSS operator may also manually assign a unique mnemonic code to the GCSS customer account in order to easily describe it. Billing information associated with maintaining and servicing each GCSS customer account will be stored within a separate accounting system which is operably connected, yet independent of the GCSS.

In FIG. 4B, the substructure of the information structure entitled ACCESS RIGHTS PROFILE is represented. As shown, the ACCESS RIGHTS PROFILE information structure comprises a plurality of distinct information fields, each of which is specified by its information field title and the type of information which it contains. The prime identifier in this structure is the concatenation of CUSTOMER NUMBER and USER NUMBER field. These information fields and information types are specified as follows: the information field entitled USER REFERENCE, stores a unique user identification number associated with the system user about which the information structure contains information concerning specified access rights within the GCSS; the information field entitled CUSTOMER NUMBER, stores the GCSS customer account number associated with the referenced user; the information field entitled SUPER USER RIGHTS, stores an flag (i.e., yes or no) indicating whether or not the referenced user has super user right within the GCSS; the information field entitled NO ACCESS RIGHTS, stores an flag (i.e., yes or no) indicating whether or not the referenced user has access rights within the GCSS; the information field entitled ABILITY TO AUTHORIZE NEW USERS, stores an flag (i.e., yes or no) indicating whether or not the referenced user has the right to authorize new users within the GCSS; the information field entitled ABILITY TO ADD SUB-ACCOUNTS, stores an flag (i.e., yes or no) indicating whether or not the referenced user has the right to add sub-accounts within the GCSS; the information field entitled ABILITY TO VIEW ACCOUNT, stores an flag (i.e., yes or no) indicating whether or not the referenced user has the right to view customer accounts within the GCSS; the information field entitled ABILITY TO VALUE CREDIT SUPPORT, stores an flag (i.e., yes or no) indicating whether or not the referenced user has the right to value credit support assets within the GCSS; the information field entitled ABILITY TO UPGRADE AGREEMENTS, stores an flag (i.e., yes or no) indicating whether or not the referenced user has the right to upgrade (e.g., modify) credit support agreements within the GCSS; the information field entitled ABILITY TO RELEASE COLLATERAL, stores an flag (i.e., yes or no) indicating whether or not the referenced user has the right to release collateral (assets) within the GCSS; the information field entitled ABILITY TO SEND DELIVERY INSTRUCTIONS, stores an flag (i.e., yes or no) indicating whether or not the referenced user has the right to send asset delivery instructions within the GCSS; the information field entitled ABILITY TO SET MASTER CUSTOMER DATA, stores an flag (i.e., yes or no) indicating whether or not the referenced user has the right to set master customer information relationships within the GCSS; the information field entitled ABILITY TO FREEZE ASSETS, stores an flag (i.e., yes or no) indicating whether or not the referenced user has the right to freeze assets within the GCSS; the information field entitled ABILITY TO DEFAULT (CREDIT SUPPORT) AGREEMENT, stores an flag (i.e., yes or no) indicating whether or not the referenced user has the right to place a credit support agreement in default notification status within the GCSS; the information field entitled ID SETUP DATE, stores the date that the user was set up within the GCSS; and the information field entitled AUTHORIZED BY, stores a user identification of the person who has authorized the access rights of the referenced user within the GCSS. Notably, the information fields of the CUSTOMER ACCOUNT information structure are interrelated with the information structures indicated by the relational links shown in the information entity model of FIG. 3. In general, the primary function of this information structure is to store information specifying the access rights of each user of the GCSS. Whenever a user attempts to use the GCSS in any way possible (e.g., by way of a GCSS Customer Workstation 8 or GCSS Workstation Server 4, 5, or 6, etc.), the system automatically checks to determine the user has been previously authorized to carry out such operations within the GCSS. In general, each GCSS customer account can have an arbitrary number of authorized users who can access and operate the account. The primary function of the ACCESS RIGHTS PROFILE information structure then is to specify the specific actions that can be carried out by each registered user. Notably, such physically implemented security measures may be distributed between the GCSS Customer Workstation and the GCSS Workstation Servers.

In FIG. 4C, the substructure of the information structure entitled CONTACT DETAIL is represented. As shown, the CONTACT DETAIL information structure comprises a plurality of distinct information fields, each of which is specified by its information field title and the type of information which it contains. The prime identifier of this structure is the USER REFERENCE field. These information fields and information types are specified as follows: the information field entitled USER REFERENCE, stores a user identification for each user within the GCSS; the information field entitled USER NAME, stores an alphanumeric character string specifying the full name of the referenced user; the information field entitled CUSTOMER FLAG stores a flag which indicates whether or not the named user is a GCSS customer rather than a GCSS operator in order to control the information that the user is authorized to access; the information field entitled TYPE stores an alphanumeric character string specifying the type of user (e.g., Customer user, GCSS operations user, or GCSS process user); the information field entitled FAX, stores an alphanumeric character string specifying the fax number of the referenced user; the information field entitled PHONE, stores an alphanumeric character string specifying the phone number of the referenced user; the information field entitled TITLE, stores an alphanumeric character string specifying the title of the user within the organization of the customer with which the user is associated; and the information field entitled TELEX, stores an alphanumeric character string specifying the telex number of the referenced user. Notably, the information fields of the CONTACT DETAIL information structure are interrelated with the information structures indicated by the relational links shown in the information entity model of FIG. 3. Whereas the ACCESS RIGHTS PROFILE information structure stores information specifying which customer accounts a particular user may work with, and in what mode of operation, the CONTACT DETAIL information structure stores information concerning personal details of each authorized GCSS user. In addition, this information structure contains information specifying how each such user may be contacted by various communication mediums.

In FIG. 4D, the substructure of the information structure entitled CUSTOMER ORIGINAL ASSET RULES is represented. As shown, the information structure CUSTOMER ORIGINAL ASSET RULES comprises a plurality of distinct information fields, each of which is specified by its information field title and the type of information which it contains. The prime identifier of this structure is the CUS- TOMER ACCOUNT and ASSET TYPE fields. These information fields and information types are specified as follows: the information field entitled CUSTOMER ACCOUNT, stores a GCSS customer account number to which the below listed asset rules apply; the information field entitled ASSET TYPE, stores an asset type code indicative of the type of the referenced asset; the information field entitled STANDARD VALUATION PERCENTAGE (i.e., HAIRCUT), stores a numerical value indicative of the valuation percentage of the asset type; the information field entitled DELIVERY SYSTEM, stores a delivery system code indicative of the type of delivery system which will be used to deliver the original asset into the GCSS; the information field entitled CLEARING AND SETTLEMENT SYSTEM (e.g;., LCS) ACCOUNT NUMBER, stores the principle trading account number of the GCSS lending, clearing and settlement (LCS) system; the information field entitled FOR ACCOUNT OF, stores text identifying the custodian account (e.g., Cedel, LCS, or outside GCSS). The outgoing asset should be sent and is incorporated into the External Movement Instructions relating to that asset; the information field entitled IN FAVOR OF, stores text identifying the owner of the GCSS account; and is incorporated into the External Movement Instructions relating to that asset. Notably, the information fields of the information structure CUSTOMER ORIGINAL ASSET RULES are interrelated with the information structures indicated by the relational links shown in the information entity model of FIG. 3. In general, the information contained in the CUSTOMER ORIGINAL ASSET RULES information structure is used to provide two functions, namely: to specify, for each asset type, where outside of the GCSS the asset should be default delivered; and to specify an approximate valuation of the assets independent of credit support agreements. The asset rules for cash is specified in greater detail in the CUSTOMER CASH CORRESPONDENT information structure.

In FIG. 4E, the substructure of the information structure entitled CUSTOMER PREFERENCE is represented. As shown, the information structure CUSTOMER PREFERENCE comprises a plurality of distinct information fields, each of which is specified by its information field title and the type of information which it contains. The prime identifier of this structure is the concatenation of the CUSTOMER NUMBER, ASSET IDENTIFIER, and ASSET TYPE fields. These information fields and information types are specified as follows: the information field entitled CUSTOMER NUMBER, stores the GCSS account number assigned to the identified customer; the information field entitled ASSET TYPE, stores an asset type code indicative of asset type; information field entitled ASSET IDENTIFIER, stores an asset identifier indicative of the identity of the asset; the information field entitled USAGE PRIORITY, stores a numerical value indicative of the usage priority assigned to the asset (e.g., U.S. Treasuries 6, Eurobonds 4, etc), used in the Asset Movement Optimization Process and the COVER NOW process C680; the information field entitled HOLD ASSET FLAG, stores an flag which indicates whether or not the customer has frozen any particularly identified asset. Notably, the information fields of the information structure CUSTOMER PREFERENCE are interrelated with the information structures indicated by the relational links shown in the information entity model of FIG. 3. In general, the information contained in the CUSTOMER PREFERENCE information structure allows the customer to specify for each asset class (i.e., security type), or at a lower level specific security, (i) the order in which the customer wants the security used to cover credit exposure, all things being equal, and (ii) the securities can be over-ridden by the Agreement Preference Parameters the customer would like to hold onto.

In FIG. 4F, the substructure of the information structure entitled CUSTOMER ELIGIBILITY is represented. As shown, the information structure CUSTOMER ELIGIBILITY comprises a plurality of distinct information fields, each of which is specified by its information field title and the type of information which it contains. The prime identifier of this information structure is identified in the upper fields of this figure. These information fields and information types are specified as follows: the information field entitled CUSTOMER NUMBER stores the GCSS customer number assigned to the customer at the time of opening the account; the information field entitled ASSET TYPE CODE, stores the asset type code assigned to the referenced asset; the information field entitled ASSET IDENTIFIER, stores an asset identifier code; the information field entitled valuation percentage stores the valuation that will be applied when computing the value of the asset (e.g., 100 implies field market valuation of security; 95 implies a 5% haircut); the information field entitled ACCEPT ASSET FLAG, stores a flag (i.e., yes/no) which indicates which whether or not the customer will accept the referenced asset type as collateral; the information field entitled ACCEPT ON-TRANSFER FLAG, stores a flag (i.e., yes/no) which indicates which whether or not the customer will allow any acquired asset of the referenced asset type to be on-transferred (i.e., rehypothocated); the information field entitled ALLOW ON-TRANSFER ORIGINAL ONLY, stores a flag (i.e., yes/no) which indicates which whether or not the customer will allow only original assets of the referenced asset type to be rehypothocated; the information field entitled ALLOW ON-TRANSFER ALL, stores a flag (i.e., yes/no) which indicates which whether or not the customer will allow all assets, original or acquired, of the referenced asset type to be rehypothocated; the information field entitled ALLOW REPO ORIGINAL ONLY, stores a flag (i.e., yes/no) which indicates which whether or not the customer will allow only original assets of the referenced asset type to be repoed (i.e., repurchased); and the information field entitled ALLOW REPO ALL FLAG, stores a flag (i.e., yes/no) which indicates which whether or not the customer will allow all assets of the referenced asset type to be repoed. Notably, the information fields of the information structure CUSTOMER ELIGIBILITY are interrelated with the information structures indicated by the relational links shown in the information entity model of FIG. 3. In general, the information contained in the CUSTOMER ELIGIBILITY information structure allows the customer to determine which assets it is willing to accept as collateral by a counterparty covering its credit exposure. The information in this structure creates default eligibility tables are used in setting up new credit support agreement. Notably, while multiple flags used in the illustrative embodiment to control the re-use of an asset in a particular situation, it is possible to use a single flag for asset re-use control. Also, this customer eligibility table is used when setting up a new credit support agreement. When the agreement is modified, the agreement eligibility table will override the customer eligibility table.

In FIG. 4G, the substructure of the information structure entitled CUSTOMER CASH CORRESPONDENT is represented. As shown, the information structure CUSTOMER CASH CORRESPONDENT comprises a plurality of distinct information fields, each of which is specified by its information field title and the type of information which it contains. These information fields and information types are specified as follows: the information field entitled CUSTOMER ACCOUNT stores the GCSS customer number assigned to the customer; the information field entitled CURRENCY CODE stores the currency code assigned to the referenced currency; the information field entitled PAY TO stores an alphanumeric character string indicative of the party to whom the cash should be paid; the information field entitled CASH ACCOUNT stores an alphanumeric character string indicative of the account to which the cash will be sent upon the cash being released using an external movement instruction (i.e., moved outside GCSS); the information field entitled PAYMENT IN FAVOR stores an alphanumeric character string indicative of the underlying customer. Notably, the information fields of the information structure CUSTOMER CASH CORRESPONDENT are interrelated with the information structures indicated by the relational links shown in the information entity model of FIG. 3. In general, the information contained in the CUSTOMER CASH CORRESPONDENT information structure defines per currency type, the cash correspondent and account that the customer wishes to use when moving excess (i.e., surplus) cash out of the GCSS. Notably, such excess cash need not be an original asset.

In FIG. 4H, the substructure of the information structure entitled MASTER is represented. As shown, the information structure MASTER comprises a plurality of distinct information fields, each of which is specified by its information field title and the type of information which it contains. The prime identifier of this information structure is identified in the upper fields of this figure. These information fields and information types are specified as follows: the information field COMPANY FULL NAME stores an alphanumeric string indicative of the full name of the GCSS operator which will be displayed on display screen of GCSS display terminals whenever it is necessary to do so; the information field COMPANY SHORT NAME stores the information field SYSTEM DATE stores an alphanumeric string indicative of the short name of the company (i.e., customer; the information field OPTIMIZATION RUNNING FLAG stores a flag which indicates whether the Asset Movement Optimization Process of the present invention is running; the information field TIMEZONE INDICATOR stores a time zone indicative of the time zone code (e.g., America, Asia, Europe) currently being processed; the information field entitled SYSTEM DATE stores the date that GCSS is current operating in conformity with GCSS calendar table; the information field entitled OPTIMIZATION START TIMESTAMP stores the timestamp of when the optimization cycle of the GCSS begins; the information field OPTIMIZATION END TIMESTAMP stores the timestamp of when the optimization cycle of the GCSS ends; the information field OMNIBUS ACCOUNT stores the omnibus account number of the GCSS inside the LCS system. Notably, the information fields of the information structure MASTER are not interrelated with any information structures shown in the information entity model of FIG. 3. In general, the information contained in the MASTER information structure specifies system information that can apply. Thus this information structure could in theory stand by itself, or with any other information structure group indicated in the information entity model.

In FIG. 5A, the substructure of the information structure entitled CUSTOMER CREDIT AGREEMENT is represented. As shown, the information structure CUSTOMER CREDIT AGREEMENT comprises a plurality of distinct information fields, each of which is specified by its information field title and the type of information which it contains. The prime identifier of this information structure is identified in the upper fields of this figure. These information fields and information types are specified as follows: the information field entitled GCSS AGREEMENT NUMBER stores the number automatically assigned by the GCSS to the credit support agreement report; the information field entitled CUSTOMER NUMBER stores the GCSS account numbers of the customer who is a counterparty to the credit support agreement report; the information field entitled VERSION NUMBER stores the version number of the credit support agreement; the information field entitled CUSTOMER ONE OR TWO stores a number indicative of the number assigned to the customer by both parties to the credit support agreement; the information field entitled CUSTOMER INTERNAL AGREEMENT NUMBER stores the internal agreement number assigned to the credit support agreement by the customer; the information field entitled INDEPENDENT AMOUNT stores an amount of credit support assets that one party must provide to a secured counterparty, independent of the Basic Amount and in addition to the computed Credit Support Amount; the information field entitled INDEPENDENT AMOUNT CURRENCY stores the currency code indicative of the currency in which the Independent Amount is valued; the information field entitled THRESHOLD AMOUNT stores the credit support amount below which no credit support assets are provided; the information field entitled THRESHOLD CURRENCY stores the currency code indicative of the currency in which the Threshold Amount is valued; the information field entitled MINIMUM TRANSFER AMOUNT stores the minimum amount of computed credit support assets which will necessitate the provision of a return or delivery which will trigger a delivery obligation; the information field entitled MINIMUM TRANSFER CURRENCY stores the currency code indicative of the currency in which the Minimum Transfer Amount is valued; the information field entitled ROUNDUP VALUE stores the amount by which Delivery Amounts and Return Amounts are rounded; the information field entitled ROUNDUP VALUE CURRENCY stores the currency code indicative of the currency in which the Roundup Value is valued; the information field entitled ROUNDUP AMOUNT stores the Roundup amount using in the rounding of the computed Delivery and Return Amounts; the information field entitled ROUNDUP AMOUNT CURRENCY stores the currency in which the Roundup Amount is valued; the information field entitled BASIC AMOUNT stores the Basic Amount with respect to a counterparty, representative of the value of Credit Support Assets which are required to be provided and constantly held from its counterparty, independent of the Credit Support Amount; the information field entitled BASIC AMOUNT CURRENCY stores the currency code indicative of the currency in which the Basic Amount is valued; the information field entitled ROUNDUP TYPE stores a choice of three methods of rounding computed Delivery and Return Amounts; the information field entitled HOLIDAY CALENDAR stores the choice of holiday calendar(s) applicable to the referenced credit support agreement; the information field entitled THRESHOLD CALCULATION METHOD stores a code which indicates the threshold calculation method (e.g., A or B disclosed herein) which by agreement is to be used to compute the Credit Support Amount for the referenced credit support agreement; the information field entitled ALLOW REPO FLAG stores a flag which indicates whether or not the assets held by the counterparties to the referenced credit support agreement can be repurchased (i.e., repoed); the information field entitled ALLOW ON-TRANSFER FLAG stores a flag which indicates whether or not the assets held by the counterparties to the referenced credit support agreement can be transferred on to other customers as collateral; the information field entitled INDEPENDENT AMOUNT NET FLAG stores a flag which indicates whether or not the Independent Amount will be netted within the credit exposures entered into the GCSS by the counterparties to the referenced credit support agreement; the information field entitled SUM INDEPENDENT AND BASIC AMOUNT FLAG stores a flag which indicates whether or not the Independent Amount and the Basic Amount are to be summed by the counterparties to the referenced credit support agreement when determining the Credit Support Amount; the information field entitled ENTRY DATE stores the date on which the referenced credit support agreement was entered into by the counterparties; the information field entitled ENTERED BY stores the identification of the GCSS users who entered the customers into the credit support agreement; the information field entitled LAST MODIFIED DATE stores the date on which the referenced credit support agreement was last modified; the information field entitled LAST MODIFIED BY stores identification of the GCSS user who has modified the referenced the last modified credit support agreement; the information field entitled APPROVED TIMESTAMP stores the date of the timestamp approving the referenced credit support agreement; the information field entitled APPROVED BY stores the identification of the GCSS user who approved the referenced credit support agreement; and the information field entitled ONE WAY COVERAGE FLAG stores a flag indicative of whether or not the referenced customer has instructed the GCSS not to deliver or return assets in its GCSS account to the counterparty. Notably, the information fields of the information structure CUSTOMER CREDIT AGREEMENT are interrelated with the information structures indicated by the relational links shown in the information entity model of FIG. 3. In general, the information contained in the CUSTOMER CREDIT AGREEMENT information structure stores information (i.e., bilaterally agreed upon parameters) which is specific to each of the two GCSS customers associated with a specific credit support agreement. As indicated above, counterparties to a credit support agreement may change or modify the agreement over the life of the agreement by generating a new version thereof. This can be accomplished using the GCSS Customer Workstations of the GCSS.

In FIG. 5B, the substructure of the information structure entitled AGREEMENT ELIGIBLE COLLATERAL is represented. As shown, the information structure AGREEMENT ELIGIBLE COLLATERAL, commonly referred to as the "Eligibility Table", comprises a plurality of distinct information fields, each of which is specified by its information field title and the type of information which it contains. The prime identifier of this information structure is identified in the upper fields of this figure. These information fields and information types are specified as follows: the information field entitled CUSTOMER AGREEMENT NUMBER stores the customer agreement number assigned to the referenced customer credit agreement; the information field entitled CUSTOMER NUMBER stores the GCSS customer number assigned (by the GCSS) to the specified GCSS customer of the referenced customer credit support agreement; the information field entitled VERSION NUMBER stores the version number of the customer credit support agreement; the information field entitled ASSET TYPE CODE stores the asset type code of the asset referenced to the customer credit support agreement; the information field entitled ASSET IDENTIFIER stores the asset identifier (e.g., ISIN) which uniquely identifies the referenced asset; the information field entitled VALUATION PERCENTAGE stores the valuation that will be applied when computing the value of the asset (e.g., 100 implies full market value of security, 95 implies a 5% haircut) is received from the counterparty of the referenced agreement; the information field entitled ACCEPT ASSET FLAG stores a flag which indicates whether or not the referenced asset will accepted as collateral by the GCSS customer to the GCSS agreement; the information field entitled ACCEPT ON-TRANSFER FLAG stores a flag which indicates whether or not the specified GCSS customer will accept the transfer of the referenced asset from a counterparty to cover credit exposure therebetween; and the information field entitled ALLOW ON-TRANSFER ORIGINAL ONLY stores a flag which indicates whether or not the specified GCSS customer will only on-transfer its original asset to its counterparty to cover credit exposure therebetween; the information field entitled ALLOW ONTRANSFER ALL stores a flag which indicates whether or not the specified GCSS customer will on-transfer all of its assets (i.e., original and received assets) to its counterparty to cover credit exposure therebetween; the information field entitled ALLOW REPO ORIGINAL ONLY stores a flag which indicates whether or not the specified GCSS customer will only repo (i.e., repurchase) its original assets; and the information field entitled ALLOW REPO ALL FLAG stores a flag which indicates whether or not the specified GCSS customer will repo (i.e. repurchase) all of its assets. Notably, the information fields of the information structure AGREEMENT ELIGIBLE COLLATERAL are interrelated with the information structures indicated by the relational links shown in the information entity model of FIG. 3. In general, the information contained in the AGREEMENT ELIGIBLE COLLATERAL information structure overrides the customer-level eligible collateral, and applies to one credit support agreement with a counterparty. In essence, the information structure entitled AGREEMENT ELIGIBLE COLLATERAL specifies which assets a customer is willing to accept and at what valuation percentage (i.e., haircut). Collateral eligibility can be defined at either: a specific asset level, e.g., U.S. dollars, Gilt 8.5% Maturity 23 Jun. 1998, in which case this overrides asset type below if an asset is specifically mentioned; or asset type, e.g., U.S. treasury, Cash, etc. This information is used when covering a credit exposure (i.e., by manual or automated asset movement) and when calculating the value of coverage. Notably, in applications where a single re-use flag is employed, the corresponding on-transfer and repo-related flags will be replaced with a single re-use flag in this information structure.

In FIG. 5C, the substructure of the information structure entitled AGREEMENT PREFERENCE is represented. As shown, the information structure AGREEMENT PREFERENCE, commonly referred to as "Preference Table" comprises a plurality of distinct information fields, each of which is specified by its information field title and the type of information which it contains. The prime identifier of this information structure is identified in the upper fields of this figure. These information fields and information types are specified as follows: the information field entitled VERSION NUMBER stores the version number of the credit support agreement being referenced; the information field entitled CUSTOMER CREDIT AGREEMENT NUMBER stores the credit support agreement number assigned to the referenced credit support agreement; the information field entitled CUSTOMER stores the GCSS account number of the GCSS customer to whom the Agreement Preferences apply; the information field entitled ASSET NUMBER stores an asset type code that corresponds to the credit support asset; the information field entitled ASSET TYPE stores the asset type code of the asset being referenced; the information field entitled ASSET IDENTIFIER stores an asset identifier indicative of the identity of the referenced asset; and the information field entitled USAGE PRIORITY stores a usage priority number assigned to the referenced asset. Notably, the information fields of the information structure AGREEMENT PREFERENCE are interrelated with the information structures indicated by the relational links shown in the information entity model of FIG. 3. In general, the information contained in the AGREEMENT PREFERENCE information structure allows a customer to control which assets are preferentially used to cover a credit exposure for a specific credit support agreement. Notably, the parameters in this agreement preference overrides any preference parameters set at the customer level in this table. Also, since it is not part of the contractual credit support agreement, these parameters can be changed at any time at the discretion of the GCSS customer. In the illustrative embodiment, the parameters in this structure are not viewable by one's counterparty as such parameters typically constitute confidential information.

In FIG. 5D, the substructure of the information structure entitled COMMON CREDIT AGREEMENT is represented. As shown, the information structure COMMON CREDIT AGREEMENT comprises a plurality of distinct information fields, each of which is specified by its information field title and the type of information which it contains. The prime identifier of this information structure is identified in the upper field of this figure. These information fields and information types are specified as follows: the information field entitled GCSS CREDIT AGREEMENT REFERENCE NUMBER stores the GCSS Credit Agreement Number assigned to the agreement by the GCSS; the information field entitled VERSION NUMBER stores the version number of the credit support agreement; the information field entitled AGREEMENT STATUS CODE stores the status code indicative of the status of the agreement (e.g., open, closed, etc.); the information field entitled COUNTERPARTY 1 stores the name of the customer who is designated as Counterparty No. 1 for purposes of the agreement; the information field entitled COUNTERPARTY 2 stores the name of the customer who is designated as Counterparty No. 2 for purposes of the agreement; the information field entitled CREDIT AGREEMENT DATE stores the date on which the agreement was made effective; the information field entitled REVIEW DATE stores the date on which the credit support agreement to be reviewed by the counterparties; the information field entitled CALCULATION AGENT stores the GCSS account number of the counterparty who is responsible for calculating MTM figure for both computations in particular structure where single entry credit exposure is to occur pursuant to the underlying credit support agreement; the information field entitled FREQUENCY CREDIT EXPOSURE stores a frequency code indicative of the frequency (e.g., daily, weekly, monthly, etc.) of credit exposure processing that is to be carried out by the GCS Processing Cycle under the credit support agreement; the information field entitled DATE OF NEXT CREDIT EXPOSURE stores the date of the next GCS Processing Cycle in which the referenced credit support agreement will be involved; the information field entitled CURRENCY CREDIT EXPOSURE stores the currency code in which credit exposures are to be entered into and valued by the GCSS by the parties; the information field entitled VALUE BY AGREED AMOUNT FLAG stores a flag which indicates whether or not the counterparties have agreed upon an Agreed Amount in connection with credit support asset computations carried out by the GCSS; the information field entitled OPTIMIZATION TIME PERIOD stores the timezone code identifying an optimization time period during which the Asset Movement Optimization Process hereof is to be carried out in order to cover credit exposures of the counterparties under the credit support agreement; the information field entitled UNDERLYING PORTFOLIO stores an underlying portfolio code which identifies the type of translation which the agreement will support (e.g., interest rate derivatives, equity derivatives, FX transactions, undisclosed, etc.); the information field entitled DELIVERY TIME DAYS stores a number which indicates the number of days in which a counterparty must deliver required assets to its counterparty as computed by the GCSS in order to cover outstanding credit exposures; the information field entitled RETURN TIME DAYS stores a number which indicates the number of days in which a party to the agreement must return required assets to its counterparty as computed by the GCSS; and the information field entitled EFFECTIVE DATE VERSION START stores the effective date on which the referenced version of the credit support agreement will begin. Notably, the information fields of the information structure COMMON CREDIT AGREEMENT are interrelated with the information structures indicated by the relational links shown in the information entity model of FIG. 3. In general, the information contained in the COMMON CREDIT AGREEMENT information structure stores agreement information (e.g., bilateral parameters) common to both parties of the credit support agreement. As indicated above, this information storage structure contains information identifying the counterparties to the referenced agreement; processing parameters related to the Asset Movement Optimization Process, and control parameters relating to the identity of the user who last effected a change to the credit support agreement. Each version of a particular credit support agreement stored in the relational database of the GCSS, is referenced to the original agreement. While credit support agreement has two counterparties, and normally refers to many derivative transactions, it could, at the discretion of the parties, be structured for a single transaction. In the illustrative embodiment, the GCSS is designed to support credit support agreements where one of the counterparties is a full member (i.e., customer) of the GCSS, while the other counterparty is not. In this case, the non-member will be set up as a sub-account of the full member and the full member will set up the credit support agreement in its name. The agreement management mechanisms provided by the GCSS will operate as normal, although it is likely that the full member will set up the agreement so that all of the securities used to cover credit exposures between such counterparties, remain in his account. Notably, the GCSS requires information details of the underlying transactions which the GCSS supports.

In FIG. 6A, the substructure of the information structure entitled OMNIBUS POSITION is represented. As shown, the information structure OMNIBUS POSITION comprises a plurality of distinct information fields, each of which is specified by its information field title and the type of information which it contains. The Prime identifier of this information structure is identified in the upper field of this figure. These information fields and information types are specified as follows: the information field entitled DATE OF BALANCE stores date indicative of the balance of the assets maintained within the omnibus account; the information field entitled ASSET IDENTIFIER stores the asset identifiers of all of the assets maintained within the omnibus account; the information field entitled NOMINAL AMOUNT stores the nominal amount (i.e., value) of assets maintained within the omnibus account; the information field entitled BALANCE RECONCILED FLAG stores a flag which indicates whether or not the balance of assets in the Omnibus Account has been reconciled with the balance of assets in the LCS system, as of the referenced Date of Balance. Notably, the information fields of the information structure OMNIBUS POSITION are interrelated with the information structures indicated by the relational links shown in the information entity model of FIG. 3. In general, the OMNIBUS POSITION information structure stores the aggregate balance of all of the assets maintained in the Omnibus Account customers. This information is updated periodically by (i) the LCS system using CEDCOM movement instructions and (ii) the result of corporate actions which are also implemented by CEDCOM Movement Instructions. In the illustrative embodiment, this Omnibus Account is managed by a sole fiduciary (i.e., GCSS operator). On a daily basis, the information structure entitled OMNIBUS POSITION is populated with "asset positions" which specifies information obtained directly from LCS system. As discussed above, the function of the LCS system is to maintain custody of all GCSS customer assets registered with the GCSS, whereas the GCSS manages the allocation of interests in such assets among its customers to cover credit exposure obligations as hereinbefore described. The OMNIBUS POSITION information structure stores both security balances and cash balances, as conventionally maintained in a normal customer account of an asset custody system, such as the Cedel LCS system. Using normal instructions employed in the LCS asset custody system, securities will be effectively moved to and from the GCSS Accounts in the GCSS. Notably, information regarding ownership of the assets accounted for in the OMNIBUS POSITION information structure, and thus the right to use the same to cover credit exposures, is maintained within the LCS (sub)system of the GCSS. Details regarding the movement of assets into and out of GCSS Accounts are described in the Information Processes Section hereof.

In FIG. 6B, the substructure of the information structure entitled ASSET is represented. As shown, the information structure ASSET comprises a plurality of distinct information fields, each of which is specified by its information field title and the type of information which it contains. The Prime identifier of this information structure is identified in the upper field of this figure. These information fields and information types are specified as follows: the information field entitled ASSET IDENTIFIER stores tile asset identifier (e.g., common code) of each eligible asset maintained delivered to the GCSS for use in covering credit exposure among parties to credit support agreements; and the information field entitled ASSET TYPE stores the asset type code for each such asset maintained within this GCSS. Notably, the information fields of the information structure ASSET are interrelated with the information structures indicated by the relational links shown in the information entity model of FIG. 3. In general, this information structure stores static information pertaining to each particular asset delivered to the GCSS either for use in credit support (i.e., recorded in the GCSS accounts) or likely to be used at some future date. The assets represented by the information within this structure can be either cash or securities. However, each asset must be eligible according to credit support agreements maintained within the system. As will become apparent hereinafter with reference to the information processes of the GCSS, the primary function of the ASSET information structure is to describe each of the potential individual asset lines that may be brought into the system.

In FIG. 6C, the substructure of the information structure entitled ASSET TYPE is represented. As shown, the information structure ASSET TYPE comprises a plurality of distinct information fields, each of which is specified by its information field title and the type of information which it contains. The Prime identifier of this information structure is identified in the upper field of this figure. These information fields and information types are specified as follows: the information field entitled ASSET TYPE stores the asset identifier (e.g., ISSN) of each eligible asset maintained in GCSS; the information field entitled LONG NAME stores the long name assigned to the referenced asset; the information field entitled PARENT ASSET TYPE CODE stores the asset type code assigned to the parent asset to which the referenced asset is related, if related to any such parent asset type; and the information field entitled SHORT NAME stores the short name assigned to the referenced asset type. Notably, the information fields of the information structure ASSET are interrelated with the information structures indicated by the relational links shown in the information entity model of FIG. 3. In general, the primary function of the ASSET TYPE information structure is to classify the assets within the GCSS, and is used in combination with eligibility and preference parameters to construe credit support processing.

In FIG. 6D, the substructure of the information structure entitled SECURITY is represented. As shown, the information structure SECURITY comprises a plurality of distinct information fields, each of which is specified by its information field title and the type of information which it contains. The Prime identifier of this information structure is identified in the upper field of this figure. These information fields and information types are specified as follows: the information field entitled SECURITY CODE stores the security code (i.e., ISIN or CUSIP) of each eligible asset that will be or is expected to be used in the GCSS; the information field entitled ISIN CODE stores ISIN code of each eligible asset (i.e., security) that will be or is expected to be used in the GCSS; the information field entitled DOMESTIC SECURITY CODE stores domestic security code (i.e., CUSIP) of each eligible asset; the information field entitled SHORT DESCRIPTION stores the short name given to each eligible security; the information field entitled LONG DESCRIPTION stores the long name given to each eligible security; the information field entitled NOMINAL CURRENCY stores the currency code of the underlying security; the information field entitled MINIMUM DENOMINATION stores the minimum multiple of the referenced security that can be moved; the information field entitled COUPON RATE stores the rate at which interest or dividends are paid on each security; the information field entitled COUPON CURRENCY CODE stores the currency code in which the coupon is to be paid on the security; the information field entitled MATURITY DATE stores the maturity date of each security; the information field entitled MATURITY CURRENCY CODE stores the currency code of the currency in which the principal of the referenced security is redeemed; the information field entitled CUSTODY SYSTEM (i.e., CEDEL) DEPOSITORY CODE stores the depository code assigned to the depository (i.e., custodian) in which each referenced security is deposited in the LSC System; the information field entitled SECURITY CONVERTIBILITY CODE stores an internal classification code used by the GCSS operator to classify the referenced security; the information field entitled CLOSING DATE stores the closing date, which is the date that the security is initially available for trading after it is launched as a new issue; the information field entitled DISTRIBUTION DATE stores the date on which the security is allocated (i.e., distributed) to members of the syndication group that initially bought the security issue; the information field entitled DELIVERY CODE stores a user-invisible delivery code that is used to further classify the asset to which it refers as well as control how the asset can be settled; the information field entitled BRIDGE ELIGIBLE FLAG stores a flag indicating whether or not the security can be transferred across the settlement bridge with the Euroclear system; the information field entitled SECURITY ACTIVE FLAG stores a flag which indicates whether or not the security can be used in the GCSS; the information field entitled GCSS ASSET TYPE CODE stores the GCSS asset type code assigned to each security; the information field entitled GEOGRAPHICAL SECTOR stores a country reference to the issuer of the security; the information field entitled INDUSTRY CODE ISSUER stores the industry code, which indicates the professional sector that the issuer of the security is engaged in; the information field entitled RATING SP stores the security rating accorded to the referenced security by Standard and Poor; the information field entitled RATING MOODY stores security rating accorded to the referenced security by Moody; the information field entitled RATING MIKUNI stores security rating accorded to the referenced security by Mikuni; the information field entitled RATING CUSTODY/DEPOSITORY SYSTEM (i.e., CEDEL LCS SYSTEM) stores security rating accorded to the referenced security by the operator of the LCS System; the information field entitled GCSS ASSET RATING stores security rating accorded to the referenced security by GCSS; the information field entitled GCSS ASSET FLAG stores a flag which indicates whether or not the security will be used in the GCSS as a GCSS asset; and if yes, then it will be priced and made viewable by customers; and the information field entitled LAST UPDATED TIMESTAMP stores the time when the SECURITY information structure was last updated (i.e., maintained). Notably, the information fields of the information structure SECURITY are interrelated with the information structures indicated by the relational links shown in the information entity model of FIG. 3. In general, the primary function of the SECURITY information structure is to define (i) the characteristics of the securities which may be used in the GCSS as credit support assets, and (ii) provide securific specific information which is required in credit support processing. On a daily basis, many information items in this structure will be synchronized with corresponding information in the latest updated version of LCS system.

In FIG. 6E, the substructure of the information structure entitled CURRENCY is represented. As shown, the information structure CURRENCY comprises a plurality of distinct information fields, each of which is specified by its information field title and the type of information which it contains. The Prime identifier of this information structure is identified in the upper field of this figure. These information fields and information types are specified as follows: the information field entitled ISO CURRENCY CODE stores the ISO currency code assigned to each referenced currency utilizable in the GCSS; the information field entitled DESCRIPTION stores a brief description of each of the referenced currencies utilizable in the GCSS; and the information field entitled HOME COUNTRY CODE stores the country code of each of the respective currencies in the GCSS. Notably, the information fields of the information structure CURRENCY are interrelated with the information structures indicated by the relational links shown in the information entity model of FIG. 3. In general, the primary function of the CURRENCY information structure is to specify the various monetary currencies that the GCSS will accept. This information structure contains static information associated with these cash currencies, which specifies the characteristics thereof.

In FIG. 6F, the substructure of the information structure entitled SECURITY PRICE is represented. As shown, the information structure SECURITY PRICE comprises a plurality of distinct information fields, each of which is specified by its information field title and the type of information which it contains. The Prime identifier of this information structure is identified in the upper field of this figure. These information fields and information types are specified as follows: the information field entitled SECURITY CODE stores the security codes (i.e., ISIN) used to identify the various securities utilizable within the GCSS; the information field entitled VALUATION DATE stores the date on which the price of a security has been valuated; the information field entitled PRICE stores the valuated price of each security in the GCSS; the information field entitled PRICE TYPE CODE stores the price type code of each valuated security; the information field entitled CURRENCY stores the currency code of the currency in which the price of a particular security is evaluated; and the information field entitled SOURCE USER IDENTIFICATION stores the identification of the user who updated the referenced price. Notably, the information fields of the information structure SECURITY PRICE are interrelated with the information structures indicated by the relational links shown in the information entity model of FIG. 3. In general, the primary function of the SECURITY PRICE information structure is to store current price information of each security asset utilizable within the GCSS, as well as a price history thereof.

In FIG. 6G, the substructure of the information structure entitled FX RATE is represented. As shown, the information structure FX RATE comprises a plurality of distinct information fields, each of which is specified by its information field title and the type of information which it contains. The Prime identifier of this information structure is identified in the upper field of this figure. These information fields and information types are specified as follows: the information field entitled CURRENCY CODE stores the currency code for each FX rate (i.e., cross-exchange rate from a particular currency to U.S. dollars); the information field entitled DATE stores the date of each exchange rate; and the information field entitled EXCHANGE RATE TO USD stores the exchange rate for the referenced currency. Notably, the information fields of the information structure FX RATE are interrelated with the information structure entitled CURRENCY indicated by the relational link shown in the information entity model of FIG. 3. In general, the primary function of the FX RATE information structure is to store the daily FX rate for each currency utilizable as collateral within the GCSS. The FX rate is used to value assets within the GCSS by converting their value to U.S. dollars (i.e., USD).

In FIG. 6H, the substructure of the information structure entitled CORPORATE ACTION is represented. As shown, the information structure CORPORATE ACTION comprises a plurality of distinct information fields, each of which is specified by its information field title and the type of information which it contains. These information fields and information types are specified as follows: the information field entitled CORPORATE ACTION IDENTIFICATION stores a token identifier to identify each particular corporate action detected by the GCSS; the information field entitled SECURITY CODE stores the security code which identifies the associated security to its respective corporate action; the information field entitled EVENT TYPE CODE stores the corporate action event type code which identifies the type of event that the corporate action represent (e.g., coupon, redemption, stock split, right to offering, etc.); the information field entitled EVENT STATUS CODE stores corporate action event status code assigned to referenced corporate action; the information field entitled RECORD DATE stores the record date of the corporate action; the information field entitled PAYMENT DATE stores the payment date associated corporate action; the information field entitled NOMINAL BASIS stores a numerical value used when calculating the proceeds of corporate action entitlements (i.e., the Amount Paid to customer equals [Customer Position Balance]×[Amount Paid Per Nominal Basis] divided by [Nominal Basis]); the information field entitled AMOUNT PAID PER NOMINAL BASIS stores the amount paid per Nominal Basis (see above); the information field entitled CURRENCY OF PAYMENT stores The currency code of the payment made; the information field entitled TOTAL AMOUNT PAID TO GCSS stores the amount paid to the GCSS by LCS for the referenced corporate action; the information field entitled TOTAL AMOUNT DISTRIBUTED BY GCSS stores the amount distributed by the GCSS to customer with respect to the referenced corporate action; the information field entitled INTERNAL COMMENTS stores the internal comments associated with the Corporate Action, which are not reviewable by customers; and the information field entitled EXTERNAL COMMENTS stores external comments associated with the corporate action, which are reviewable by customers. Notably, the information fields of the information structure CORPORATE ACTION are interrelated with the information structure entitled SECURITY indicated by the relational link shown in the information entity model of FIG. 3. In general, the function of the CORPORATE ACTION information structure is to monitor and record corporate actions in order to support the distribution of entitlements (e.g., voting rights) or proceeds (e.g., income) derived from or associated with any corporate action associated with an asset maintained within the GCSS. While an asset may be transferred from one party to another party in the GCSS, the proceeds are distributed to the original asset holder (i.e., the customer originally placing the asset in the GCSS). Typically, such proceeds are in the form of coupon payments, and redemptions, but may also be in the form of bond defaults, name changes, and other corporate events. In the illustrative embodiment, such proceeds are distributed to the customer who originally placed the asset within the GCSS. The balance information indicative of such proceeds is stored in the CUSTOMER ASSET POSITION information structure, which will be described in detail below.

In FIG. 6I, the substructure of the information structure entitled CASH INTEREST BALANCE is represented. As shown, the information structure CASH INTEREST BALANCE comprises a plurality of distinct information fields, each of which is specified by its information field title and the type of information which it contains. The Prime identifier of this information structure is identified in the upper field of this figure. These information fields and information types are specified as follows: the information field entitled CURRENCY CODE stores the currency code for each cash asset held by the respective customers as collateral to cover outstanding credit exposure between counterparties to a credit exposure agreement; the information field entitled BALANCE DATE stores the date of each cash interest balance maintained in the information structure; the information field entitled BALANCE AMOUNT stores the amount of each cash interest balance maintained in the information structure; the information field entitled CREDIT INTEREST RATE stores the rate at which interest is computed for cash credit balances; the information field entitled CREDIT INTEREST PAID stores the amount of cash interest paid to holder of cash debit balances in the referenced currency; the information field entitled DEBIT INTEREST RATE stores the rate at which cash interest is computed for cash overdrafts in the referenced currency; the information field entitled DEBIT INTEREST PAID stores the amount of cash interest due to GCSS by customers overdrawn in the referenced currency; and the information field entitled INTEREST DISTRIBUTED IN GCSS stores the amount of cash interest distributed in total to each GCSS customer. Notably, the information fields of the information structure CASH INTEREST BALANCE are interrelated with the information structure entitled CURRENCY indicated by the relational link shown in the information entity model of FIG. 3. In general, the function of the CASH INTEREST BALANCE information structure is to store interest payment information relating to cash balances in the Omnibus Account, and to subsequently distribute such interest payments to the cash holders indicated in the records of the GCSS Accounts, as deemed appropriate. In the illustrative embodiment, entries regarding cash interest produced from cash balances maintained in the Omnibus Account are computed in the respective currency and entered into the CASH INTEREST BALANCE information structure. Thereafter, the GCSS should pay such interest to those who hold cash (in their GCSS Accounts) as collateral after asset movement (e.g., pledging) as occurred, and not to the original customer who delivered the cash into the GCSS. Preferably, the interest is computed at the internal rate of the LCS system, and is distributed monthly by the GCSS according to the cash balances indicated in the CASH INTEREST BALANCE information structure. The information stored in this structure (i.e., table) is used to produce monthly statements affecting interest paid and received in a particular currency.

In FIG. 7A, the substructure of the information structure entitled ASSET PIECE is represented. As shown, the information structure ASSET PIECE, commonly called "Asset Piece Table", comprises a plurality of distinct information fields, each of which is specified by its information field title and the type of information which it contains. The Prime identifier of this information structure is identified in the upper field of this figure. These information fields and information types are specified as follows: the information field entitled PIECE IDENTIFICATION stores a token identifier for each asset piece in the GCSS; the information field entitled ASSET IDENTIFIER stores an asset identifier for the referenced asset piece; the information field entitled BALANCE CODE stores the balance code for each referenced asset piece which describes what the referenced asset piece is used for (e.g., original asset, pledged asset, repo'ed out, etc.); the information field entitled CONTROLLED NOMINAL AMOUNT stores the nominal amount of each referenced asset piece, which is used to compute its value by multiplying the current price (i.e., security price or FX Rate) by the valuation percentage (i.e., from applicable preference table); the information field entitled CURRENT NOMINAL AMOUNT stores the nominal amount of the referenced asset piece which is currently held (i.e., recorded) in the CONTROL GCSS ACCOUNT, described below; the information field entitled AGREEMENT REFERENCE stores the credit support agreement number to which each asset piece in the GCSS is referenced (i.e., if this field is empty, then the referenced asset piece refers to an original piece); the information field entitled CONTROL GCSS ACCOUNT stores the GCSS account number of the GCSS customer who holds the referenced asset piece as either an original asset, as collateral, etc.; the information field entitled PREVIOUS GCSS ACCOUNT stores the GCSS account number of the previous GCSS customer who held the referenced asset piece (i.e., if this field is empty, then the referenced asset piece is under full control of the CONTROL GCSS ACCOUNT); the information field entitled START DATE stores the date on which the referenced asset piece was transferred to cover a credit exposure; the information field entitled RETURN DATE stores the date on which the referenced asset piece should to be returned to the previous customer holding the asset piece (i.e., for a subsequent sale, or other use contemplated by its previous holder); the information field entitled ACTUAL END DATE stores the date on which the referenced asset piece was actually returned to the previous holder; the information field entitled ON TRANS FLAG stores a flag which indicates whether or not the referenced asset piece, when received as collateral from one counterparty can be subsequently transferred onto another (i.e., rehypothocated) counterparty to cover a credit exposure; and the information field entitled REPO FLAG stores a flag which indicates whether or not the referenced asset piece can be repoed. Notably, the information fields of the information structure ASSET PIECE are interrelated with the information structures indicated by the relational links shown in the information entity model of FIG. 3.

By definition, an "asset piece" is created when an asset originally placed into a GCSS customer account is transferred as collateral (e.g., pledged) from one party to a counterparty in order to cover a credit exposure. An asset piece can be created as a result of originally transferred assets, covering for credit support shortfalls, automated-initiation of asset transfer, or manual-initiation of asset transfer. The function of the ASSET PIECE information structure is to store detailed information on each piece of asset moved into a GCSS customer account, and also its current status (e.g., it may have been transferred-on in part or whole to another GCSS customer account). The information items stored in CONTROL GCSS ACCOUNT and the PREVIOUS GCSS ACCOUNT collectively represent a "pseudo-chain" of asset transfers among GCSS customer accounts in the GCSS. This functionality enables the customers to track the movements of assets into and out of his or her GCSS account for purposes of credit support processing. Should an asset piece be transferred by a party in order to cover a credit exposure of its counterparty, its corresponding information structure will then be modified to identify the current holder and to whom the asset piece has been transferred. In the illustrative embodiment, each asset piece is classified by its assigned Balance Code, which specifies (i.e., controls) how the asset is used in credit support processing. For example, as shown below different calculations are performed for asset pieces having different Balance Codes:

| Code | Calculating Excess | Original Asset |
|---|---|---|
| ORIGINAL | positive | positive |
| IN INTRANS | positive | zero |
| OUT TRANS | negative | zero |
| REPOOUT | negative | negative |
| DEFAULT | negative | negative |
| CLOSED | zero | zero |

In FIG. 7B, the substructure of the information structure entitled INTERNAL GCSS MOVEMENT is represented. As shown, the information structure INTERNAL GCSS MOVEMENT comprises a plurality of distinct information fields, each of which is specified by its information field title and the type of information which it contains. The Prime identifier of this information structure is identified in the upper field of this figure. These information fields and information types are specified as follows: the information field entitled MOVEMENT IDENTIFICATION stores a token identifier for each referenced asset piece within the GCSS; (the information field entitled MOVEMENT PURPOSE CODE stores a code which identifies the instruction which effected the movement (i.e., transfer) of the referenced asset piece (e.g., Delivery, Pledge, Retrieve, Substitution, Original Asset Allocation, etc.); the information field entitled PIECE IDENTIFIER stores an asset piece identifier for each referenced asset piece within the GCSS; the information field entitled NOMINAL AMOUNT stores the nominal amount of the referenced asset piece within the GCSS; the information field entitled TIMESTAMP stores the timestamp of each referenced asset piece transferred within the GCSS; and information field entitled USER ID stores the identification of the user who issued the asset movement instruction. Notably, the information fields of the information structure INTERNAL GCSS MOVEMENT are interrelated with the information structures indicated by the relational links shown in the information entity model of FIG. 3. The function of the INTERNAL GCSS MOVEMENT information structure is to store information which reflects the movement (i.e., transfer) of any asset piece within (i.e., internal to) the GCSS.

In FIG. 7C, the substructure of the information structure entitled CUSTOMER ASSET POSITION is represented. As shown, the information structure entitled CUSTOMER ASSET POSITION comprises a plurality of distinct information fields, each of which is specified by its information field title and the type of information which it contains. The Prime identifier of this information structure is identified in the upper field of this figure. These information fields and information types are specified as follows: the information field entitled CUSTOMER ACCOUNT stores the GCSS account number; the information field entitled ASSET IDENTIFIER stores the asset identifier for each of the referenced asset piece being managed by the GCSS; the information field entitled DATE stores the date of the asset position information within the information structure; the information field entitled ORIGINAL BALANCE stores the original balance of the referenced asset piece; the information field entitled IN ONTRANS BALANCE stores the current nominal balance of each asset piece that has been pledged "into" the referenced GCSS account from other counterparties; and the information field entitled our ONTRANS BALANCE stores current nominal balance of referenced asset piece that has been pledged "out" of the referenced GCSS account from other counterparties. Notably, the information fields of the information structure entitled CUSTOMER ASSET POSITION are interrelated with the information structures indicated by the relational links shown in the information entity model of FIG. 3. The function of the entitled CUSTOMER ASSET POSITION information structure is to store current and historic information regarding the position of each asset (of a GCSS customer) allocated within the GCSS. This is achieved by using a Date attribute, Asset Identifier, the Account Number, and Balance Code to make up the identifier of an asset position (i.e., sum of asset pieces). As indicated by the substructure of the CUSTOMER ASSET POSITION, there are two principal types of assets maintained in this information structure, namely: original assets and credit support assets. Credit support assets may exist in the form of cash or securities transferred to a GCSS customer account as a credit support amount. In contrast, original assets are assets credited to a GCSS account which were either brought into the account by way of transfer of assets in to the GCSS on behalf of that customer, or were obtained from another customer who defaulted. As described hereinabove, a customer will receive all produced income attributable to all original non-cash security-type assets so long as, they remain in the GCSS, whereas all produced income attributable to cash assets will be distributed to the holder of the cash collateral at the time the income has accrued.

In FIG. 7D, the substructure of the information structure entitled CREDIT EXPOSURE is represented. As shown, the information structure entitled CREDIT EXPOSURE comprises a plurality of distinct information fields, each of which is specified by its information field title and the type of information which it contains. The Prime identifier of this information structure is identified in the upper field of this figure. These information fields and information types are specified as follows: the information field entitled IDENTIFIER stores the credit support agreement reference number assigned to each credit support agreement; the information field entitled GCSS CREDIT SUPPORT AGREEMENT REFERENCE NUMBER stores the credit support agreement reference number assigned to each active credit support agreement in the GCSS; the information field entitled CUSTOMER NUMBER stores the customer number assigned to each customer to such credit support agreement; the information field entitled DUE DATE stores the date on which the credit support assets for a particular credit exposure are due to be delivered; the information field entitled VALUE DATE stores the date on which the referenced credit support assets were valuated; the information field entitled COVER DATE stores the date on which its referenced credit exposure must be covered under the respective credit support agreement; the information field entitled TIMESTAMP ENTERED stores the timestamp that the referenced credit exposure figure was entered in the GCSS by way of a GCSS Customer Workstation; the information field entitled SENDER IDENTIFICATION stores the identification of the party (i.e., GCSS customer) who entered the referenced credit exposure figure into the GCSS; the information field entitled EXPOSURE CURRENCY stores the currency code in which the referenced credit exposure figure is valued; the information field entitled CREDIT EXPOSURE AMOUNT stores the credit exposure figure (i.e. MTM figure) entered into the system by the referenced GCSS customer; the information field entitled AMOUNT TO MOVE (ATM) stores the amount of asset to be delivered and/or returned in connection with covering the referenced credit exposure; the information field entitled DIFFERENCE IN CREDIT EXPOSURE stores the difference in credit exposure between the counterparties to the credit support agreement; the information field entitled BASIS stores the Basis computed by the GCSS using the credit exposure figures entered by the counterpartie(s) on the referenced date; the information field entitled CREDIT SUPPORT AMOUNT stores the Credit Support Amount computed by the GCSS using the corresponding computed Basis; the information field entitled REFUSE TO DELIVER FLAG stores a flag which indicates whether or not the party required to transfer the referenced credit support assets refuses to deliver the same to its counterparty to cover the computed credit exposure therebetween; the information field entitled DECLINE RECEIPT FLAG stores a flag which indicates whether or not the party to receive the referenced credit support assets refuses to accept the same from its counterparty to cover the computed credit exposure therebetween; the information field entitled QUALITY MATCH STATUS stores an exposure match code indicative of the difference between the determined credit support assets and the referenced credit exposure figure; the information field entitled COVERAGE STATUS stores a coverage match code which provides a measure of how close the entered credit exposure figures of the counterparties to the referenced agreement match and is used in customer display screen display operations; the information field entitled INITIAL VALUATION COVERAGE stores the valuation of the credit support assets required to cover the referenced credit exposure, on the date that the credit support assets were originally due; and the information field entitled CURRENT VALUATION COVERAGE stores valuation of the credit support assets required to cover the referenced credit exposure, on the date the credit support assets were determined by the GCSS. Notably, the information fields of the information structure entitled CURRENT ASSET POSITION are interrelated with the information structures indicated by the relational links shown in the information entity model of FIG. 3. The information structure entitled CREDIT EXPOSURE is central to the operation of the GCSS, as it stores the credit exposure (i.e., mark to market value) between each pair of GCSS customers (i.e., counterparties) involved in derivative trading under a credit support agreement, as well as the determined amounts of credit support assets required to cover such credit exposures under the credit support agreement. In addition, this information structure also functions to store other parameters associated with such credit exposures and determined credit support assets, such as instructions to the GCSS, refusing to deliver required credit support assets, as well as refusing to accept particular credit support asset.

In FIG. 7E, the substructure of the information structure entitled SUBSTITUTION REQUEST is represented. As shown, the information structure entitled SUBSTITUTION REQUEST comprises a plurality of distinct information fields, each of which is specified by its information field title and the type of information which it contains. The Prime identifier of this information structure is identified in the upper field of this figure. These information fields and information types are specified as follows: the information field entitled SUBSTITUTION IDENTIFIER stores a token identifier which identifies referenced substitution request (i.e., instruction); the information field entitled PREVIOUS SUBSTITUTION IDENTIFIER stores a token identifier which identifies the previously referenced substitution request; the information field entitled PIECE IDENTIFICATION stores a token identifier which identifies the asset piece for which the referenced substitution request has been made; the information field entitled NOMINAL AMOUNT REQUESTED stores the nominal amount of the referenced asset piece for which the substitution request is being made; the information field entitled VALUATION AMOUNT stores the value amount of the referenced asset piece for which the substitution request is being made; the information field entitled VALUATION CURRENCY CODE stores the currency code of the currency in which the referenced asset piece is valued; the information field entitled AGREED FLAG stores a flag which indicates whether or not the current counterparty holding the referenced asset piece agrees to the referenced substitution request. In general, requests for substitutions has agreed to return the asset piece; the information field entitled PARTIAL FLAG stores a flag which indicates whether or not a return of a partial portion of the referenced asset (for which a substitution request has been made) is acceptable between the counterparties; the information field entitled SUBSTITUTION STATUS stores the a substitution status code indicative of the status of the referenced asset piece for which a substitution request has been made; the information field entitled REQUEST CREATED USER IDENTIFICATION stores the user identifier of the GCSS user who created (i.e., placed) the referenced substitution request to be serviced by the GCSS; the information field entitled REQUEST CREATED TIMESTAMP stores the timestamp indicative of when the referenced substitution request was made; and the information field entitled EXECUTED TIMESTAMP stores the timestamp indicative of when the request substitution request instruction was executed by the GCSS. Notably, the information fields of the information structure entitled SUBSTITUTION REQUEST are interrelated with the information structure ASSET PIECE indicated by the relational link shown in the information entity model of FIG. 3. In general, a substitution request involves replacing one set of securities by another as a result of a customer request to retrieve a specific security.

Because of differences in denominations and haircuts, it may be necessary to transfer slightly more or less of the substituted securities then are being released under the substitution. The new securities shall be considered eligible by the counterparty as defined in the Credit Support Agreement. Therefore such security within the system shall be categorized in order to be recognized as eligible or ineligible by each party. This substitution feature shall allow customers to retrieve securities, which they can repo out (customers shall transact from their account). The primary function of the information structure entitled SUBSTITUTION REQUEST is to provide a previous holder (i.e., providee) of an asset piece an added measure of control over the recovery of the asset piece once it has been transferred out of its GCSS account.

In FIG. 8A, the substructure of the information structure entitled EXTERNAL MOVEMENT INSTRUCTION is represented. As shown, the information structure entitled EXTERNAL MOVEMENT INSTRUCTION comprises a plurality of distinct information fields, each of which is specified by its information field title and the type of information which it contains. The Prime identifier of this information structure is identified in the upper field of this figure. These information fields and information types are specified as follows: the information field entitled GCSS TRANSACTION REFERENCE stores a token identifier which identifies the instruction; the information field entitled RECEIPT FLAG stores a flag which indicative whether or not an asset movement instruction has been received from a GCSS customer (i.e., if yes, then the instruction refers to a receiving instruction associated with an incoming or entering asset; if no, then the instruction is a delivery instruction associated with an outgoing or exiting asset); the information field entitled ASSET IDENTIFIER stores the asset identifier associated with the referenced movement instruction; the information field entitled RECONCILED FLAG stores a flag which indicates whether or not the instruction has been fully checked and processed within the system, which for the majority of instructions will be automatically set, but for certain instructions such as late forced instructions, will be manually set; the information field entitled GCSS ACCOUNT UPDATED FLAG stores a flag which indicates whether or not the referenced GCSS account has been updated; the information field entitled INPUT USER IDENTIFICATION stores the user identification of the GCSS user who input the referenced asset movement instruction; the information field entitled AUTHORIZED USER IDENTIFICATION stores the user identification of the GCSS user who is authorized to make the instruction; the information field entitled AUTHORIZED TIMESTAMP stores the timestamp indicative of when the instruction has been authorized; the information structure entitled CREATED TIMESTAMP stores the timestamp indicative of when the instruction has been received into the GCSS; the information field entitled TRANSMITTED LCS TIMESTAMP stores the timestamp indicative of when the GCSS transmitted to the asset custody system (e.g. LCS) the referenced asset movement instruction. Notably, the information fields of the information structure entitled EXTERNAL MOVEMENT INSTRUCTION are interrelated with the information structures indicated by the relational links shown in the information entity model of FIG. 3. The function of the entitled EXTERNAL MOVEMENT INSTRUCTION information structure is to store instructions regarding the movement of assets inside and outside of the GCSS. All asset movements inside and outside of the GCSS require an instruction either from the Omnibus Account or to the Omnibus Account held within the asset custody system (e.g., LCS). In general, different types of instructions are used to effect the movement of incoming assets and outgoing assets.

In FIG. 8B, the substructure of the information structure entitled CEDCOM MOVEMENT INSTRUCTION is represented. As shown, the information structure entitled CEDCOM MOVEMENT INSTRUCTION comprises a plurality of distinct information fields, each of which is specified by its information field title and the type of information which it contains. The Prime identifier of this information structure is identified in the upper field of this figure. These information fields and information types are specified as follows: the information field entitled GCSS TRANSACTION NUMBER stores an instruction identifier which identifies the GCSS transaction to which the referenced asset movement instruction is associated; the information field entitled ASSET CUSTODY TRANSACTION NUMBER stores an instruction identifier which identifies the LCS transaction to which the referenced asset movement instruction is associated; the information field entitled INSTRUCTION TYPE stores the instruction type code indicative of the type of the referenced instruction (e.g., Cedel Instruction Nos. 10, 21, 31, 81, 90); the information field entitled ACCOUNT NUMBER COUNTERPARTY stores the account number of the counterparty issuing the referenced asset movement instructions; the information field entitled SECURITY CODE stores the security code which the issuer of the referenced instruction entered into the GCSS; the information field entitled CURRENCY CODE stores the currency code of the currency of which the referenced instruction specifies internal asset movement; the information field entitled NOMINAL AMOUNT stores the nominal value of the asset of which the referenced instruction specifies internal asset movement; the information field entitled CASH AMOUNT stores the cash amount of the asset of which the referenced instruction specifies asset movement; the information field entitled REQUESTED SETTLEMENT DATE stores the requested date on which the transfer of the asset specified in the referenced instruction should settle; the information field entitled EXECUTED DATE stores the date on which the referenced asset movement instruction was executed; the information field entitled VALUE DATE stores the date on which the asset of the referenced instruction was valued; the information field entitled TIMESTAMP CAPTURED IN GCSS stores the timestamp of when the asset movement instruction was received in the GCSS; the information field entitled LCS STATUS stores the instruction status code specifying the status (e.g., executed, pending, canceled, etc.) of the referenced asset movement instruction; the information field entitled GCSS ACCOUNT stores the GCSS account number in which the asset specified in the referenced asset movement instruction is specified; and the information field entitled WORDING INFORMATION stores textual information representative of comments regarding the referenced instruction. Notably, the information fields of the information structure entitled CEDCOM MOVEMENT INSTRUCTION are interrelated with the information structures indicated by the relational links shown in the information entity model of FIG. 3. The function of the entitled CEDCOM MOVEMENT INSTRUCTION information structure is to store instructions received from the GCSS regarding the movement of assets within the Omnibus Account using the CEDCOM telecommunications system 22, LCS Server 23, and CEDCOM connect interface 24, shown in FIG. 2. The asset movement instructions stored in this information storage structure include both cash movement instructions and security movement instructions. In general, all security instructions should be free of payment (i.e., not conditional upon a simultaneous countervailing movement of money).

In FIG. 8C, the substructure of the information structure entitled FED MOVEMENT INSTRUCTION is represented. As shown, the information structure entitled FED MOVEMENT INSTRUCTION comprises a plurality of distinct information fields, each of which is specified by its information field title and the type of information which it contains. The prime identifier of this information structure is identified in the upper field of this figure. These information fields and information types are specified as follows: the information field entitled GCSS TRANSACTION REFERENCE stores a token identifier which identifies the GCSS transaction associated with the referenced FED instruction; the information field entitled SPEED TRANSACTION IDENTIFICATION stores the FED instruction identifier which identifies the referenced FED instruction; the information field entitled SECURITY CODE stores the security code (e.g., ISIN ) of the asset being transferred by the referenced FED instruction; the information field entitled NOMINAL QUANTITY stores the nominal the information field entitled NOMINAL CURRENCY stores the nominal amount of the referenced asset; the information field entitled CASH AMOUNT stores the amount of cash to be transferred by the referenced instruction; the information field entitled REQUESTED SETTLEMENT DATE stores the requested date the referenced transaction should be settled; the information field entitled EXECUTION DATE stores the actual date the referenced transaction was actually settled; the information field entitled MEMO FIELD stores a memorandum pertaining to the transaction; the information field entitled GCSS ACCOUNT stores the GCSS account associated with the transaction; the information field entitled EXTERNAL CLEARING BANK stores the name of the bank to which the asset refers; the information field entitled EXTERNAL BANK ACCOUNT stores the bank account number to which the asset refer; the information field entitled CAPTURED GCSS TIMESTAMP stores the date when the referenced FED instruction was received into GCSS; the information field entitled CONFIRMED REC FED TIMESTAMP stores the timestamp when FED confirmed the instruction had been received; and the information field entitled CONFIRMED EXEC FED TIMESTAMP stores the timestamp when FED confirmed the instruction was executed on its system. Notably, the information fields of the information structure entitled FED MOVEMENT INSTRUCTION are interrelated with the information structures indicated by the relational links shown in the information entity model of FIG. 3. The function of the entitled FED MOVEMENT INSTRUCTION information structure is to store instructions which transfer assets from the FED system 25 to the GCSS and from the GCSS to the FED system by way of the SPEED link communication system 20, (or alternatively, the SWIFT link 26) illustrated in FIG. 2. After an asset transfer operation has occurred at the FED system, there will be a matching instruction subsequently created at the GCSS confirming that the asset transfer operation has occurred. After the FED instruction has been received, the GCSS generates a movement instruction to the LCS system 17 by way of a CEDCOM message in order to update the records of the LCS system.

INFORMATION PROCESSES SUPPORTED WITHIN THE GCSS

Referring to FIGS. 9 through 13E, each of the information processes supported within the GCSS will now be described in detail.

Figure 9A:
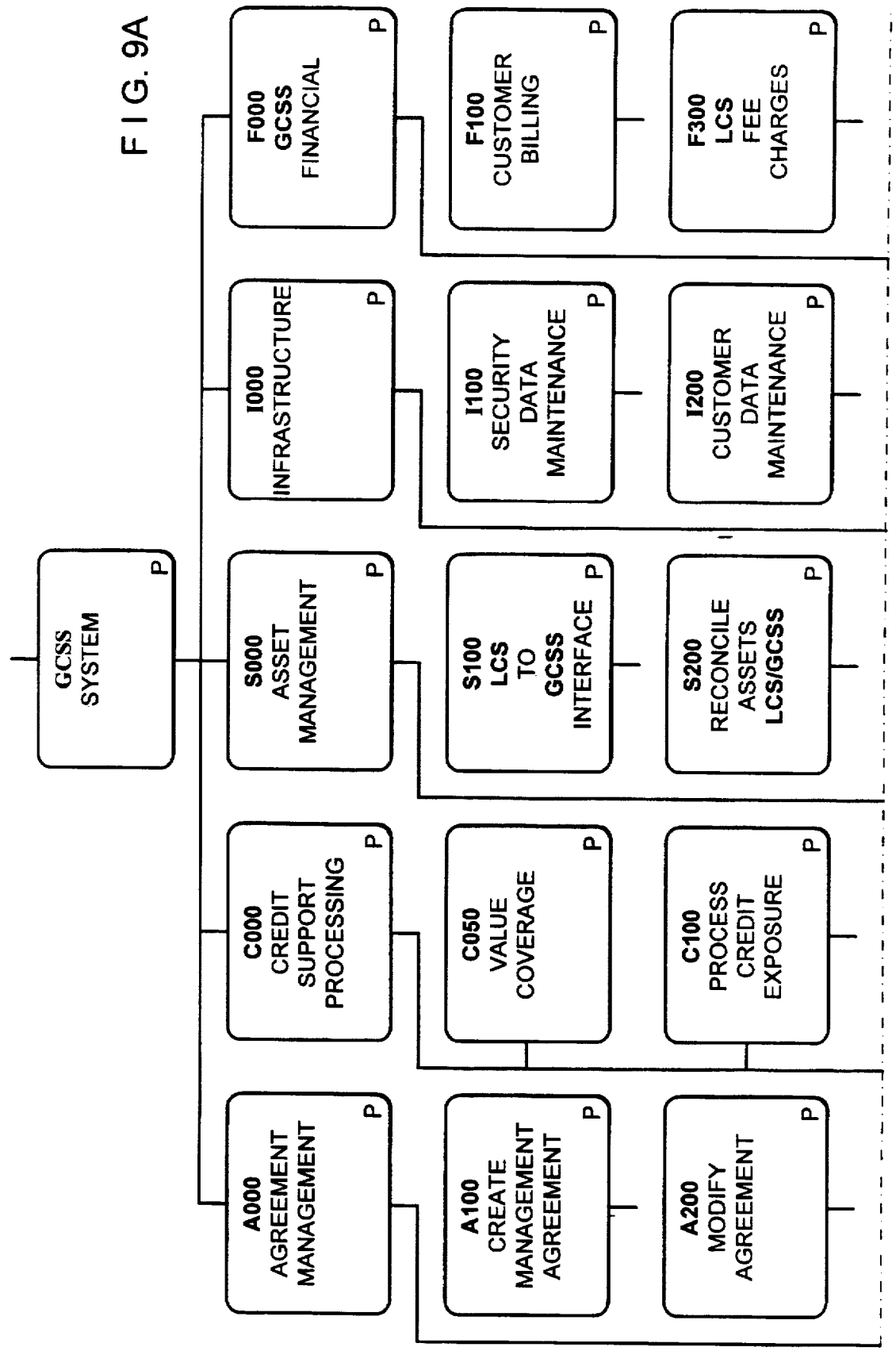
FIG. 9 is a schematic diagram illustrating the various groups of information processes carried out by the GCSS of the present invention entitled AGREEMENT MANAGEMENT, CREDIT SUPPORT PROCESSING, ASSET MANAGEMENT, INFRASTRUCTURE, and GCSS FINANCIAL and also the hierarchical organization of the various information subprocesses thereof.
Figure 9B:
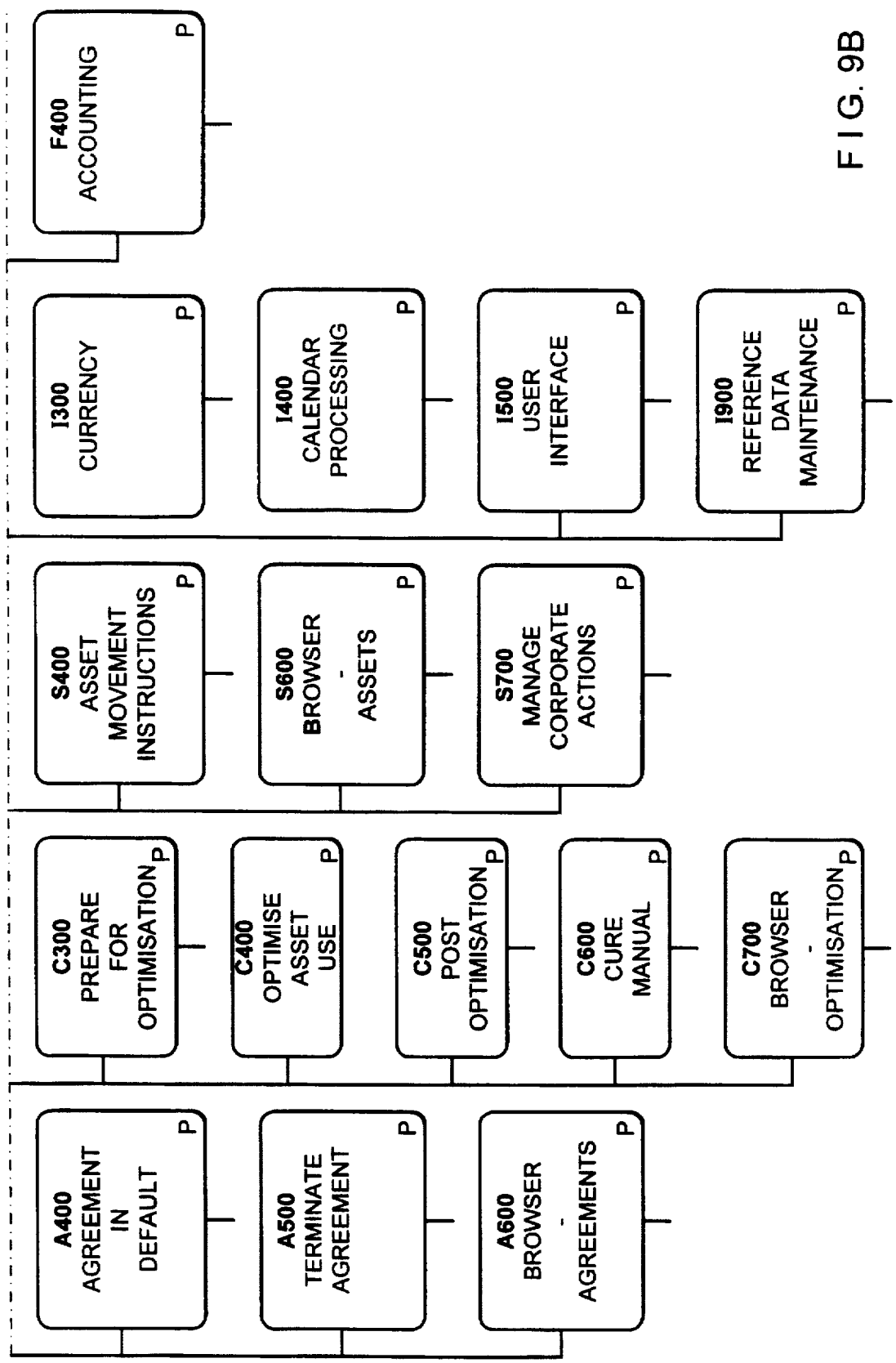
Figure 10A:
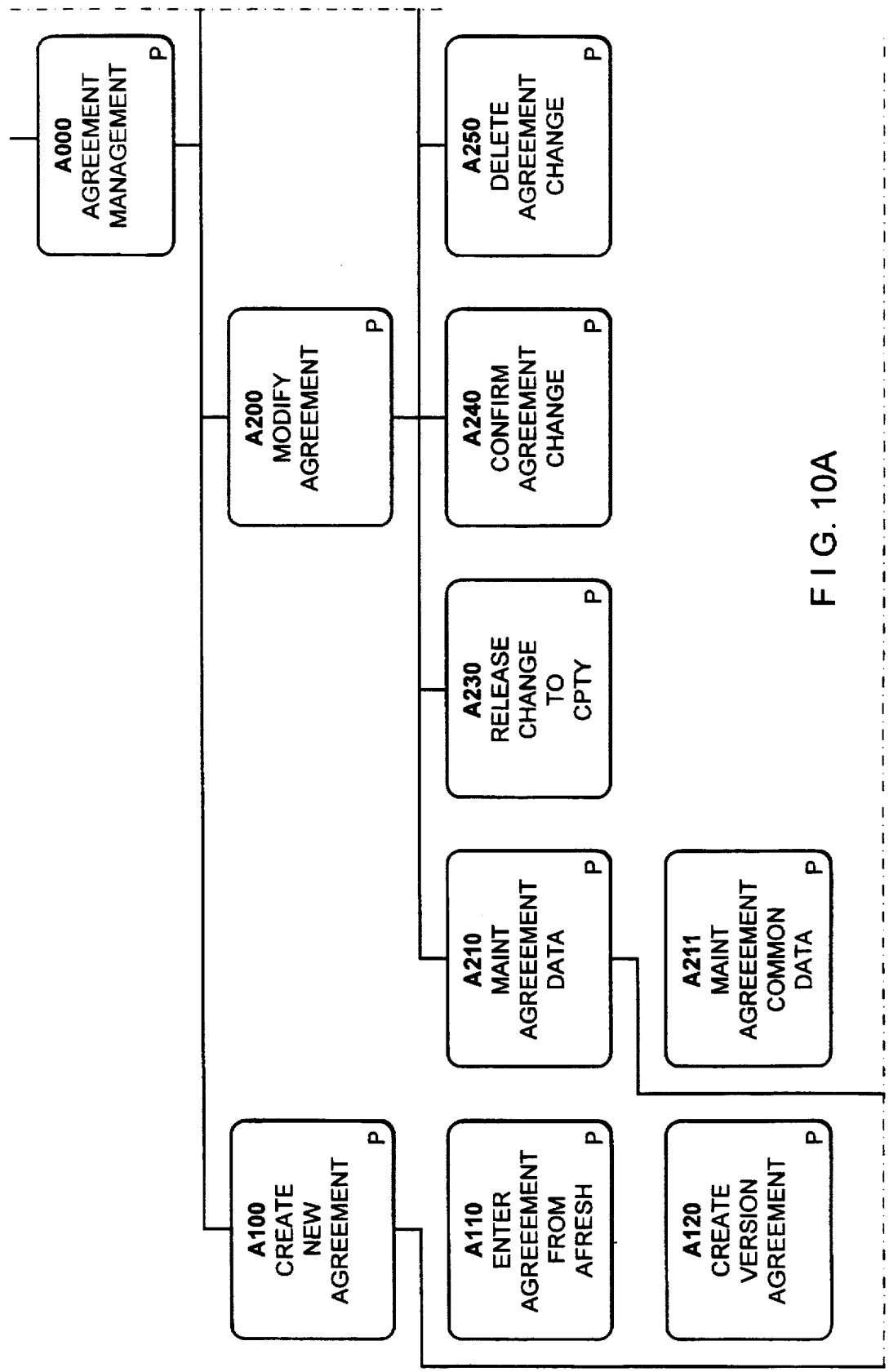
FIG. 10 is a schematic diagram illustrating the hierarchical arrangement among the various information subprocesses comprising the information process group entitled AGREEMENT MANAGEMENT.
Figure 10B:
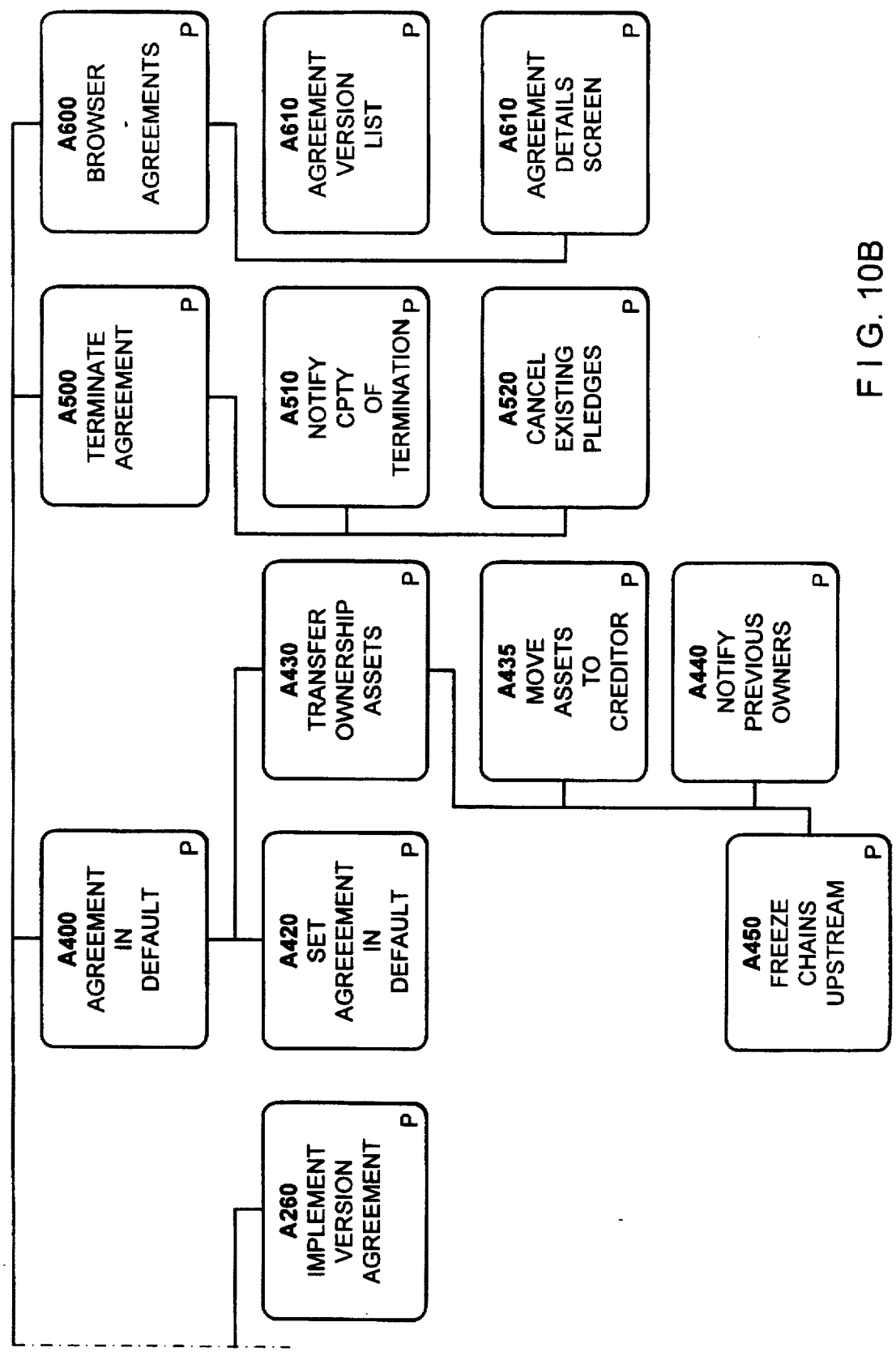
Figure 10C:
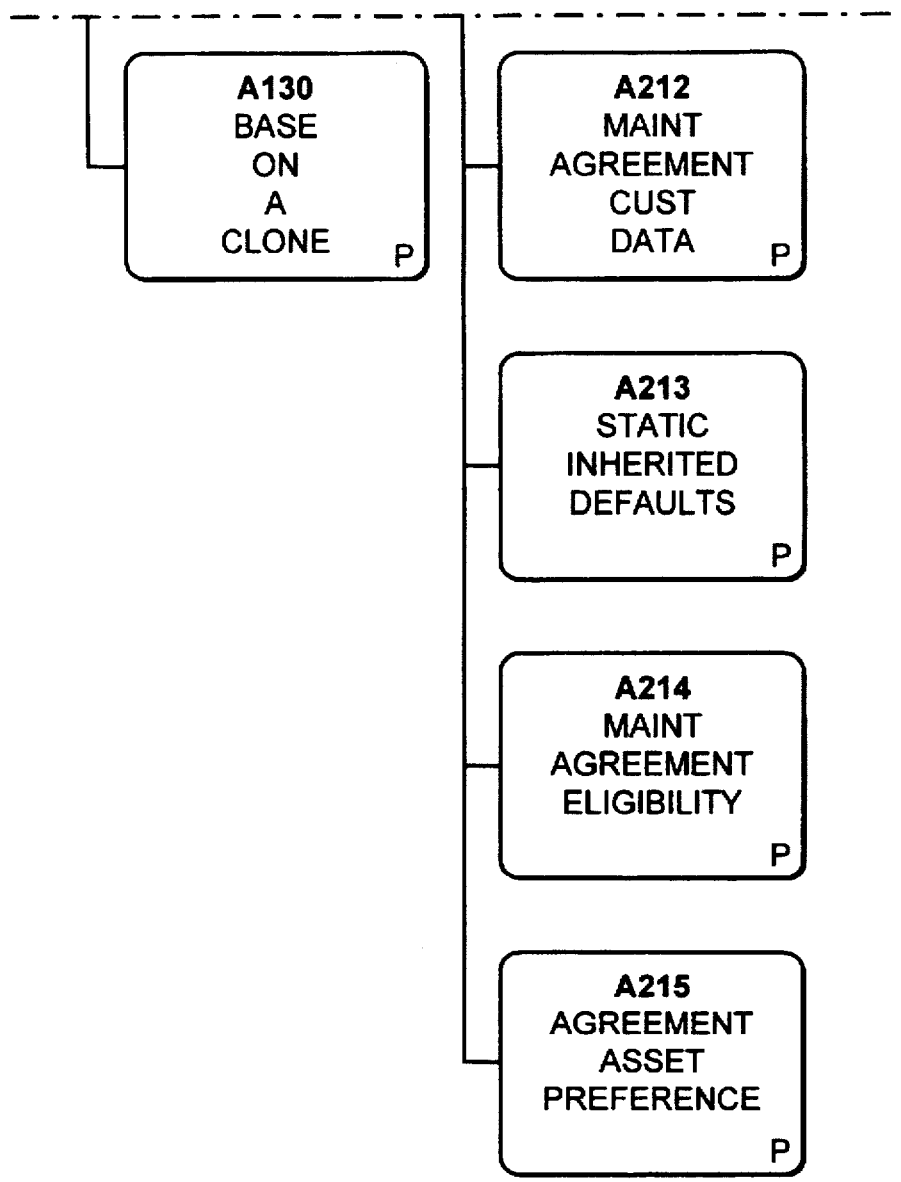

As shown in FIG. 9, the processes of the GCSS are organized into six major process groups, namely: (1) AGREEMENT MANAGEMENT comprising Process A100 entitled CREATE NEW AGREEMENT, Process A200 entitled MODIFY AGREEMENT, Process A400 entitled AGREEMENT IN DEFAULT, Process A500 entitled TERMINATE AGREEMENT, and Process A600 entitled BROWER AGREEMENTS; (2) CREDIT SUPPORT PROCESSING comprising Process C050 entitled VALUE COVERAGE, Process C100 entitled PROCESS CREDIT EXPOSURE, Process C300 entitled PREPARE FOR OPTIMIZATION; Process C400 entitled OPTIMIZE ASSET USE, Process C500 entitled POST OPTIMIZATION; Process C600 entitled CURE MANUAL, Process C700 entitled BROWSER OPTIMIZATION; (3) ASSET MANAGEMENT comprising Process 5100 entitled LCS To GCSS Interface, Process 5200 entitled RECONCILE ASSETS LCS/GCSS, Process 5400 entitled ASSET MOVEMENT INSTRUCTIONS, Process 5600 entitled BROWSER ASSETS, and Process 5700 entitled MANAGE CORPORATE ACTIONS; (4) Infrastructure comprising Process I1100 entitled SECURITY DATA MAINTENANCE, Subprocess I1200 entitled CUSTOMER DATA MAINTENANCE, Process I300 entitled CURRENCY, Process I400 entitled CALENDAR PROCESSING, Process I500 entitled USER INTERFACE, and Process I1900 entitled DEFERENCE DATA MAINTENANCE; (5) GCSS FINANCIAL comprising Process F100 entitled CUSTOMER BILLING, Process F300 entitled LCS FEE CHARGES, and Process F400 entitled ACCOUNTING. Below, Process Groups (1), (2), and (3), and their supporting subprocesses, will be described in terms of their inputs, outputs, interfaces, event-triggers, and functionalities performed within the GCSS. Inasmuch as Process Groups (4) and (5) relate to ancillary functions of the GCSS, they will not be described in detail to avoid obfuscating the inventive features of the information network hereof.

The Process entitled AGREEMENT MANAGEMENT enables customers to enter new credit support agreements into the system, and subsequently modify them over the lifetime thereof. Credit support agreements consist of information (i.e. bilateral parameters) common to both counterparties, and details specific to each counterparty. This information includes information used by each party to calculate the amount of asset to move for each credit exposure. In addition, the functionality allows each counterparty to set up Eligibility Tables which determine which securities they are willing to accept to cover a credit exposure. Using this functionality, a party may also specify a valuation percentage (i.e. haircut) for each security type.

The approval process is accomplished by having multiple versions of a credit support agreement stored in the GCSS database managed by Database Server 2. Thus when a particular a credit support agreement needs to be changed, one counterparty to the agreement opens up a new version thereof, makes their changes, then releases the new version of the agreement to their counterparty who adds their changes, then releases the agreement back to the other party, and so on. Once both parties concur with the terms of the agreement, they will both authorize the version thereof and specify a date when it will replace the existing agreement. Once this date is reached, the system will automatically operate according to the new settings (i.e., parameters) in the information structure representative of the released credit support agreement.

Using this basic system functionality, each counterparty can specify preferences as to which assets they would like to be used from their portfolio to cover credit exposure. As these preferences are not part of the negotiated credit support agreement, they can be changed at any time by each side without the approval of the other. Should a credit support agreement fall into default status, then the counterparty exposed can unilaterally terminate the agreement within the GCSS. A termination within the GCSS does not have any effect on the credit support agreement; rather it simply means that the counter parties to the agreement are no longer are dealing with (and thus bound by) the bilateral terms in the terms thereof. Another possibility is for a credit support agreement to end by mutual agreement. This may occur because the counterparties thereto have no more outstanding deals, do not want to use the GCSS any longer, or simply wish to restructure their exposure obligations into another credit support agreement within the GCSS.

Within the GCSS, customers are explicitly required to have permission to create, modify or terminate credit support agreements. As such, GCSS customers must have the security attribute "ability to upgrade agreements" set to True in order to be able to modify agreements. Similar conditions must exist in the GCSS Database for customers to operate in other ways on a credit support agreement.

The Process A100 comprises a collection of subprocesses, which together allows the creation of new agreements in the GCSS system. When creating new agreements, the process will automatically generate a new agreement number, unique within the GCSS system. Once created, the customer will be able to enter all the data via the modify agreement process, indicated by Process A200. Display screens 15B and 15C are used during this process. Following this, the counterparty will either authorize the created agreement, or else modify it, for the originator to agree. The subprocesses A110, A121, and A130 which supports this class of functionalities will be described below.

The subprocess A110 entitled ENTER AGREEMENT FROM AFRESH is a GUI-based process supported by a GCSS Customer Workstation 8, and allows a customer to generate a new empty template for defining a new agreement. The Inputs to this subprocess are Inherited Agreement defaults from customer preferences; its Outputs are New Agreement Template (in memory); and its Event/Trigger is provided by user selection. This subprocess allows the GCSS to assist in the definition of a new credit support agreement via inherited data, such as Asset Preference and Eligibility Tables for the customer. Notably, the counterparty will need to define its own settings for eligibility and preference tables.

The subprocess A120 entitled CREATE VERSION AGREEMENT is a GUI processing function which enables counterparties to modify an existing agreement (i.e., create a new version of a pre-existing agreement). The Inputs to this subprocess are an existing agreement number; the Outputs are a copy of the specified agreement with a new version number; and its Event/Trigger is provided by user selection. This subprocess provides the following functionalities: to determine whether a pending uncompleted version already exists (i.e., if yes, then reject as the user can delete this incomplete version within the agreement modification suite); to prompt the user to confirm new version agreement required; to display the list of old versions of the agreement from which this one will be cloned (i.e., the default is the current active agreement); to load into the created agreement definitions taken from a selected agreement; and to prompt the user for version control data, such as the date when the agreement is to be made active.

Subprocess A130 entitled BASE ON A CLONE is a GUI process which allows customers to copy the data defined from another agreement. The Inputs to this subprocess is an existing agreement number; the Outputs are a new agreement with a unique number; and its Event/Trigger is provided by user selection. This subprocess operates as follows. The subprocess displays a list of agreements defined within the account, and allows the user to select which agreement is to be used as base. Optionally, the subprocess allows the user to pick another account within the same customer/ account parent structure. This is similar to a file open dialogue box where the user can select a different disk from which to read files. The user must select which data will be copied in. The GUI display screen will have a separate function button for: Agreement common data (i.e., default is Yes); Customers data (default is Yes); Customers preference data (i.e., default is Yes); Customers eligibility data (i.e., default is Yes); Counterparties data (i.e., default is No); Counterparties preference data (i.e., default is No); Counterparties eligibility data (i.e., default is No); a warning prompt before loading the data (i.e., if data already exists in any of the categories, then a further warning will be displayed).

The Process A200 entitled MODIFY AGREEMENT comprises a collection of subprocesses, which together allows the modification of a preexisting agreement in the GCSS. When modifying an agreement, this process will automatically assign a new version number to the modified version of the agreement. When modifying an agreement, process A200 causes the GCSS to operate within following interactive loop described below. A new agreement or version is set up using process A100. A GCSS Customer who initiates agreement/change, uses screen processes A210 (sub processes A211, A212, A213, A214 and A215) to enter common data for agreement and their specific data. The customer then uses process A230 to release agreement to counterparty. If required, he can add comments in the agreement version note to let the counterparty know what he has done. Counterparty 2 the reviews the agreement and enters its data using process A210. Notably, if counterparty 1 had authorized the agreement, this would be reset by the system since the document had been changed by the other side. When counterparty 2 has finished modifying the agreement, he will either: use subprocess A240 to confirm agreement, and since counterparty 1 has not agreed their changes, it will pass to counterparty 1 for authorization; or use subprocess A230 to release agreement back to counterparty 1 for correction. The agreement will remain in the above two steps until both counterparties have authorized the modified agreement. When condition is satisfied, the modified agreement will be set to the status of awaiting the date when it will become active. Notably, the modified version of the credit support agreement can be changed at any time until it becomes active. However, should this occur, the authorization codes will be reset. The subprocesses A210, A211, A212, A213, A214, and A215, which supports this class of functionalities, will be described below.

The subprocess A210 entitled MAINTAIN AGREEMENT DATA comprises a group of screen-based subprocesses which enables customers to view and modify an agreement in detail.

The subprocess A211 entitled MAINTAIN AGREEMENT COMMON DATA is a GUI process which provides a screen-based function that enables the customer to enter common agreement data (i.e., bilateral parameters). It also serves as a menu for displaying other types of information relating to the counterparty, eligible securities and asset preferences. The Inputs to this subprocess are user input; the Outputs are attributes of common agreement parameters; and the Event/Trigger is provided by user selection. The bilateral parameters that can be entered into a credit support agreement by this subprocess include: GCSS credit support agreement number uniquely generated by the GCSS and cannot be modified; Counterparty 1 specifying who initially entered agreement and can only be modified during the initial group, and is reviewable only after the agreement is in operation; Counterparty 2, which as with counterparty 1, can only be modified during initial agreement setup; Credit exposure frequency (e.g., daily, weekly, monthly); Due date of next credit exposure calculated by GCSS; Currency of credit exposure; Optimization cycle (e.g. American, European or Asian); Calculation agent which can only be counterparty 1 or counterparty 2; Agreement type and Type of credit covered.

The subprocess A212 entitled MAINTAIN AGREEMENT CUSTOMER DATA is a GUI-based process which provides a screen function that enables GCSS customers to enter their customer specific information associated with a credit support agreement. The Input to this subprocess is Agreement Customer Data; the Output thereof is Modified Customer Data; and the Event/Trigger is provided by user selection. Using this subprocess, each counterparty is able to define the following parameters, without GCSS validation, except ensuring that the currency type is valid within the GCSS: their own internal agreement number; Independent Amount and the currency thereof; Threshold and the currency thereof; Minimum Transfer Amount and the currency thereof; Roundup value and the currency thereof; Roundup Amount and the currency thereof; and Basic Amount and the currency thereof; Roundup type (reference table); Threshold Calculation Method (Method A or B); Independent Amount Net flag (i.e., Yes or No); Sum Independent Amount and Basic Amount Net flag (i.e., Yes or No); and Holiday calendar (reference table or defined tables). In the illustrative embodiment of the GCSS, each counterparty may only change its own details during either the initial agreement setup or a subsequent agreement version update.

The subprocess A213 entitled STATIC INHERITED DEFAULTS is GUI internal process which allows GCSS customers to remove current preference and eligibility information from an agreement (if previously set) and replace this information with master definitions maintained at the customer level. The Input to this subprocess is Agreement and Account master definitions; the Output thereof is Modified eligibility or preference tables for the credit support agreement (in memory); and the Event/Trigger is provided by user selection. In the illustrative embodiment, this subprocess employs some type of hierarchical data relationship between customer accounts and credit support agreements associated with the customer accounts.

Subprocess A214 entitled MAINTAIN AGREEMENT ELIGIBILITY is a GUI process which provides a screen-based function that enables a customer to control which assets will be eligible (i.e., accepted) to support a credit agreement, and to what valuation percentage (i.e., haircut) will apply to such assets. The Input to this subprocess is user input and Agreement eligibility tables; the Output thereof is the Modified Eligibility Table; and the Event/Trigger is provided by User Selection. Eligibility tables are constructed on a per-agreement basis. They can be specified by the asset type (e.g., U.S. treasury, Eurobond A grade+) or by specific asset (U.S. dollars cash, UK gilt 9.5% 1998). This subprocess employs either a mechanism or hierarchy of description which puts the asset types into some type of inheritance hierarchy that recognizes generic types or specific instances.

Subprocess A215 entitled AGREEMENT ASSET PREFERENCE is a GUI process executed on the GCSS customer workstation which provides a screen-based function that enables customers to control which securities are preferred to be given to support any exposure figure in connection with a particular credit support agreement. The Input to this subprocess is user input and preference table, and securities table of the Agreement; the Output thereof is the modified preference table; and the Event/Trigger is provided by User selection. Notably, asset preferences are not part of a credit support agreement, and therefor can be changed unilaterally as required by the customer. This subprocess provides a control tool which enables the GCSS customer to stop, for example, the delivery of U.S. treasuries in connection with a specific credit support agreement and deliver lower-rated Eurobonds instead. This function can be selected from the display screens shown in FIGS. 15B and 15C. This subprocess allows each counterparty to only see its own preference data.

Subprocess A230 entitled RELEASE CHANGE TO COUNTERPARTY is GUI process executed on the GCSS customer workstation which provides a screen-based function that allows a GCSS customer to release all changes to a credit support agreement (requiring bilateral agreement. The Input to this subprocess is a the new or modified agreement; the Output thereof is the Agreement transmitted to counterparty; and the Event/Trigger is provided by user selection. This subprocess is executed when a change to a credit support agreement is completed and one counterparty wishes it to be committed to the system. Because all credit support agreements must be approved by both counterparties the changes must be sent to the counterparty for approval. In the illustrative embodiment, this is implemented by a method call to a server process which communicates the modified agreement to the counterparty and accept its approval or rejection. Preferably, this server process is an asynchronous process for both counterparties so that notification of changes and notification of acceptance (or rejection) of changes are accessible to the user.

Subprocess A240 entitled CONFIRM AGREEMENT CHANGE is a GUI process executed on a customer workstation which provides a screen-based function that enables a customer to accept the updates made by a counterparty, to a credit support agreement. The Input to this subprocess is a new or modified agreement; the Output thereof is the Approved Agreement, Unapproved Agreement, or further Modified Agreement transmitted to counterparty; and the Event/Trigger of this subprocess is provided by User selection. Using this subprocess, the user is notified that a modification to a credit support agreement has occurred within the GCSS. Using this subprocess, the user calls up that modified credit support agreement and displays the modifications in a highlighted manner that facilitates easy comprehension of such proposed changes. If the user is satisfied with the changes, he can approve them by sending (from its GCSS Customer Workstation) a message to the GCSS Agreement Server, approving the changes which will thereafter be committed to the GCSS database. If however the counterparty is not satisfied with the proposed changes to the credit support agreement, then he can either: change the credit support agreement to reflect his/her understanding and re-transmit the same for approval by the other counterparty; or completely reject the proposed changes by sending a message (from its GCSS Customer Workstation) to the counterparty, advising of such rejections and possibly proposing additional changes for consideration. Ultimately, the modified agreement will be either accepted by the parties or rejected, as the case may be.

Subprocess A250 entitled DELETE AGREEMENT CHANGE is a GUI process executed on a GCSS customer workstation which provides a screen-based function that enables GCSS customers to delete a version of a credit support agreement within the GCSS. The Input to this subprocess is the version of the credit support agreement to be deleted; the Output is the deleted version of the credit support agreement; and the Event/Trigger of this subprocess is provided by User selection. Agreement deletion is subject to the following rules. It cannot be deleted if it is already in use. In this case it can only be replaced by a later version of the credit support agreement. A version of a credit support agreement can only be deleted unilaterally by the creator. If the version of the agreement has been approved by both counterparties, but its effective date has not passed, then it can be deleted but only by agreement of both counterparties. If it is a first version (i.e., version 1) of a credit support agreement, then this function will also completely delete the whole agreement (if it has not been used). If the credit support agreement is not the first version of a credit support agreement, then other versions of the agreement remain.

Subprocess A250 entitled IMPLEMENT VERSION AGREEMENT is an internal function of an agreement management server-based process which activates a new version of a credit support agreement. The Input to this subprocess is the version of the credit support agreement to be activated within the GCSS; the Output thereof is the activated version of the credit support agreement; and the Event/Trigger is provided by the occurrence of a change in date. By way of this subprocess, activation of a particular version of a credit support agreement is driven by the effective date of it version attribute. From this date, the particular version of the agreement will be active and it cannot be deleted by customers. Credit support agreements are monitored daily to determine whether or not they are to be activated on that particular date by subprocess A250.

Process A400 entitled AGREEMENT IN DEFAULT is central to the fundamental purpose of the GCSS in that it allows GCSS customers to put a counterparty on notice of default status regarding their credit support agreement. GCSS customers should rarely need to place a credit agreement in default status, as doing so is considered a serious matter and not is easily undone. However, when required, this process allows a counterparty of a defaulted credit support agreement to effectively seize credit support assets by default processing, thereby providing the secured party to the defaulted credit support agreement an additional measure of required security. This process involves subprocesses A420 and A430 described in detail below.

Subprocess A420 entitled SET AGREEMENT IN DEFAULT is a GUI process executed on a GCSS customer workstation which provides a screen-based function that enables a GCSS customer to declare a credit support agreement in default status. The Input to the subprocess is User Selection of the agreement to be placed in default status and user permission; the Output thereof is a message sent to the GCSS Agreement Server in order to place the agreement in default status; and the Event/Trigger of this subprocess is provided by User selection. This operation is subject to the following rules. The Customer user must have permission to put a counterparty of an agreement into default status. Specifically, their security attribute Ability to Default Agreement must be set to YES. A default warning must already have been issued to the defaulting counterparty. The current date must be greater than or equal to the date given to the counterparty to resolve the problem. This process will prompt for double confirmation before initiating agreement default processing, effected by subprocess A430.

Subprocess A430 entitled TRANSFER OWNERSHIP ASSETS is a server-based process which transfers the ownership of assets that were pledged to a GCSS account, to the counterparty of the party defaulting in its credit support agreement. This changes the assets from being pledged (i.e., transferred) to the GCSS account of the defaulting party, to being originally owned by the GCSS account of the counterparty of the defaulted credit support agreement. The Input to this subprocess is the defaulted credit support agreement and pledged (i.e., transferred) assets supporting that agreement; the Output thereof is the modification to the customer asset position of both pledgor and pledgee to the defaulted credit support agreement (i.e., removal of pledges, or marking them as permanently transferred); and the Event/Trigger of the subprocess is provided by the customer requesting that the credit support agreement be placed in default status. This subprocess will examine the defaulted credit support agreement, and if it determines that the assets have been used to cover either the Independent Amount or credit exposure, then this subprocess will perform the following operations, for each of the credit support assets: debit the account of the pledgor for the amount of the asset pledged, although this could result in the pledgor having a negative balance of original assets; credit the account of the pledgee for the amount of the asset pledged; and destroy the pledges of the assets. Notably, the credit support assets transferred by the defaulting party, could have been pledged in a chain of rehypothocated asset pledges. If so, the original owner of an asset that is pledged down a chain, all other transferors in the chain, will need to be notified of the fact that their asset will not be returned until the defaulting counterparty brings assets into the system. This notification of non-returned asset will be sent when the return assets process runs before the next optimization cycle.

Process A500 entitled TERMINATE AGREEMENT enables a credit support agreement to be terminated (i.e., closed). This will be achieved by setting the Agreement Status attribute to TERMINATED. At this point, no more versions of credit support agreements therefrom will be possible, and any assets pledged thereunder will be released to the party holding them at the time. This process is designed so that there is no conflict in connection with terminating an agreement default processing, or shortfall processing. Subprocesses A510 and A520 employed in carrying out process A500 will be described in detail below.

Subprocess A510 entitled NOTIFY COUNTERPARTY OF TERMINATION is a GUI function with server logic that allows a party to notify its counterparty of its intent to terminate a credit support agreement. However, the counterparty must approve any such termination, in the same way it must approve any modification to a credit support agreement before the GCSS implements the same. The Input to this subprocess is the credit support agreement to be terminated; the Output thereof is the server request to terminate the credit support agreement; and the Event/Trigger of this subprocess is provided by User selection. This subprocess is similar to the one that transmits agreement modifications to the other counterparty.

Subprocess A520 entitled CANCEL EXISTING PLEDGES is a server-based process function which allows a GCSS customer to cancel existing pledges for a particular credit support agreement. The Input to this subprocess is the credit support agreement for which the pledges are to be cancelled; the Output thereof is the removal of the pledges and reversal of the respective debits and credits in the affected GCSS customer accounts; and the Event/Trigger for this subprocess is provided by a User request for agreement termination, and in part by a request to return assets. This subprocess removes the pledge records and reverses the debits and credits that they produced.

Process A600 entitled BROWSER-AGREEMENTS comprise a collection of GUI processes which allows customer to peruse several credit support agreements and view the details thereof with ease and flexibility. The Input to these processes is User ID and the Account(s) to browse; the Output thereof is the display of information regarding a selected set of credit support agreements; and the Event/Trigger is provided by way of user selection. This process is a Screen based query tool which can be used by: Customers on one account; Customers across their customer structure (subject to user access rights); and GCSS operations across all accounts. Also, this process has a number of filters and sort functions which enable a list of credit support agreements to be generated, from which the detailed agreement parameters can be accessed, including, for example: Specified account; Specified node in an account structure, and all accounts therebelow; Date credit support agreement started; and credit support agreements within one timezone. Sorting operations which can be nested include attributes Agreement Number and the Account of a counterparty. The subprocess which carries out these functionalities will be described below.

Subprocess A610 entitled AGREEMENT VERSIONS LIST is a GUI process which provides a screen-based process that allows a customer to produce a list of the different version numbers for a specified credit support agreement. The Input to this subprocess is the main agreement number; the Output thereof is the list of agreement versions (with dates, etc.); and the Event/Trigger of this subprocess is provided by way of user selection. This subprocess will also display: the version number; the version timestamp; the effective date version becomes operative; and the Status flag (e.g., Pending agreement, Future, Active or Past) for the version of the credit support agreement. Notably, a pending credit support agreement is one that is being worked on, and not authorized by both counterparties. A future agreement is one that has been authorized, but will only be active on the effective date.

The subprocess A620 entitled AGREEMENT DETAILS SCREEN is a GUI process that allows a customer to display the details of credit support agreements. The Input to this subprocess is the credit support agreement; the Output thereof is the displayed credit support agreement; and the Event/Trigger is provided by way of user selection. This subprocess uses the normal modify agreement screens produced by process A200, and is subject to the normal access rights in the GCSS. Notably, any agreed or past credit support agreements cannot be changed. For a change to be made, a new version of the agreement must be created. The only exception is modification preference data which comprises unilateral rather than bilateral parameters.

Subprocess A630 entitled AGREEMENT MANAGEMENT SERVER is a server-based process that performs the functions of agreement management as requested by the client workstations in the GCSS network. The Inputs to this subprocess include Agreements, user Id, and Selected function; the Outputs thereof are various; and the Event/Trigger is provided by way of user request. This subprocess will implement the server functions underlying the management of credit support agreements. The functionality of the individual operations is described in the previously described subprocesses. This subprocess largely exists to coordinate the modification of credit support agreements between counterparties and to coordinate the communication of messages therebetween with respect to their various credit support agreements. In addition, this subprocess maintains the various versions of credit support agreement in the GCSS database. In the illustrative embodiment, only this subprocess is able to modify credit support agreements in GCSS, inasmuch as User processes are not be allowed to write directly therein.

Process C000 entitled CREDIT SUPPORT PROCESSING comprises a collection of subprocesses which are concerned with the entry and transmission of periodic credit exposures between counterparties. As will be described below, this process group includes GUI processes that enable the entering of multiple credit exposures and the transmission thereof to the GCSS process servers. In turn, the GCSS server processes credit exposures received from the various counterparties, retransmits them between counterparties, and through a series of computational operations, ultimately produces an amount to move (ATM) to cover credit exposure of the counterparty. The Display Screens shown in FIGS. 15D and 15E are used during this process. Before describing these various GUI functions and computational processes in detail, it is appropriate to first briefly provide an overview of the time sequence of events which may occur within each Global Support Processing Cycle of the GCSS of the illustrative embodiment. Thereafter, the subprocesses which support such functionalities will be described.

In each (GCSPC) about which Asset Movement Optimization Process revolves, a number of contiguous time periods have been predefined in order to permit counterparties to enter their credit exposure figures for credits support agreements, and resolve any disputes that may arise in connection therewith. In particular, several hours before the Asset Movement Optimization Process is prescheduled to occur, GCSS customers (i.e., counterparties) are provided a time window (called the "Notification Period" or "Exposure Entry Period") within which they may or may not transmit by way of their GCSS Customer Workstation, their exposure number (i.e., mark-to-market figure) for each credit support agreement. As discussed above, this figure represents what is commonly referred to as the "mark", for the entire book of transactions covered by that credit support agreement. The GCSS automatically dates the entered exposure figures with a specific market valuation date, i.e., Valuation Date reference (V). Counterparties agree in advance when they will submit figures for a Valuation Date. This planned Submission Date (S) can be V itself, V−1, V+1, V+2, etc.

In general there are three cases of credit exposure entry which the GCSS is logically prepared to respond to: (1) where both parties enter a credit exposure figure to the GCSS; (2) where only one of the parties enter a credit exposure figure to the GCSS; and (3) where none of the parties enter a credit exposure figure to the GCSS. In each of these situations, the GCSS employs rule-based logic, agreed to by the counterparties, in order to compute a required credit support amount for the particular credit exposure entry period. Thus, if both parties to a credit support agreement enter an assessment of the credit exposure, then the GCSS will receive two numbers expressed in a currency agreed to in the credit support agreement. Each of these three cases will be considered in greater detail hereinbelow.

During the Notification Period, parties may see their counterparties' entered credit exposure figures only if they have input their own. In the GCSPC of the illustrative embodiment, there is also a Cut-Off Time following the Notification Period, after which no more credit exposure figure entries are accepted and final exposure reports are generated by the GCSS. In addition, between the end of the Notification Period and the Cut-Off Time, there is a 30-minute period called the Resolution Period during which counterparties to a credit support agreement are provided an opportunity to correct by amendment errors in their entered figures, or resolve any disputes that may arise with regard to exposure figure differences between the counterparties. Up until the end of the Notification Period, counterparties may send in new credit exposure figures, and only if they have done so before the Notification Period, may they amend their credit exposures up until the Cut-off Time. At the end of the Cut-Off Time, the GCSS will consider only the most recent received credit exposure figure, unless credit exposures have been locked-in through the non-dispute mechanism which will be described in greater details hereinafter. This final credit exposure figure will ultimately be used to determine the Basis. The Basis, in turn, is used to compute the Credit Support Amount required to cover the credit exposure among the counterparties. The Credit Support Amount in combination with priorly provided Credit Support Assets, will determine the Delivery and Return Amounts (collectively referred to as the Amount to Move). With this overview in mind, the processes and subprocesses which support the functionalities of the GCSPC will be described in detail below.

Subprocess C050 entitled VALUE COVERAGE is a server/client (GUI) process which provides a calculation function that computes the values of the coverage amounts based on the market price of credit support assets on a particular day. The Input to this subprocess is the account to be valued and market prices; the Output is the current value of assets pledged to this account; and the Event/Trigger is provided by various triggers in server and the GUI. Prior to capturing credit exposure figures from the counterparties to a credit support agreement, it is necessary to value (using today's prices) the credit support assets transferred (i.e., provided) therebetween. This operation is required to maintain sufficient, but not excessive cover, and so that the GCSS can ensure that if a substitution occurs, the replacement credit support assets will have a value equal or greater than the original credit support assets. This needs to be done for all credit support assets transferred after the new prices are received by the GCSS.

Process C100 entitled PROCESS CREDIT EXPOSURE is a collection of subprocesses which allow GCSS customers to enter credit exposure figures into the GCSS by way of their GCSS Customer Workstations, and ultimately ascertain the required amounts of credit support assets that must be moved to cover outstanding credit exposures between counterparties to credit support agreements within the GCSS network. In connection therewith, GCSS customers will calculate their credit exposure figures (i.e., mark-to-market figures per counterparty) using their own algorithms and software in the conventional manner. It is anticipated that some customers will use an electronic spreadsheet programs, such as Lotus 123 or Microsoft Excel, and complex proprietary algorithms to calculate such figures. Typically such figures will be computed on a separate computing platform (e.g., PC workstation). In the illustrative embodiment, customers are provided two ways in which to enter credit exposure figures. One way is for customers to enter their credit exposure figures directly on the Exposure Entry Screen which can be popped-up from the Asset Management Screen.

Alternatively, customers may choose to enter their credit exposures figures into the GCSS in a bulk manner. This method is carried out by first inserting the exposure figures into a fixed format file on the PC workstation, which is thereafter read by the GCSS Workstation by selecting an appropriate command from a File pull-down menu on the Asset Management Screen. By selecting such a command, the file is read by the GCSS Workstation and the information will be displayed in the Asset Management Screen. Then the credit figures are sent to the GCSS server process (at the GCSS central station) when the user clicks on the <SEND> button or <SEND ALL> button on the GUI of the GCSS Customer Workstation. A GCSS server process then monitors the receipt of exposure figures, and matches the exposure figures with the corresponding credit support agreement. As mentioned above, each party is not permitted to see the other's mark until they have submitted their own. Each time a party enters an amended mark, the other party must be notified of the new mark and alerted to resubmit their own previous mark or a new value. This process will archive each credit exposure entry with a timestamp. Below, the various subprocesses supporting this process will be described in detail.

Subprocess C110 entitled CAPTURE CREDIT EXPOSURE comprises a set of processes is used by customers to enter their credit exposure and transmit the same to their respective counterparties. Facilities are built into this process to allow the bulk input of exposures, for use by those customers with many different counterparties. Features of this GUI subprocess include the ability to select which currency the exposures are viewed in (both the individual exposures and the totals). This also includes the functionality to control aspects of the delivery and receipt of assets on a per agreement basis. Each customer can block the delivery of assets on a particular agreement and refuse delivery of assets under a particular credit support agreement. Another part of this functionality is the transmission and validation of the exposures themselves. In connection with the transmission and validation of exposure figures, this subprocess provides customers with the following capabilities: before a specified credit exposure due date/time, the customer can only see the exposures they entered; before the due date/time, the user can change their price as often as required; and after the specified date/time, the user will see the counterparty price after entering their own. However, if the prices are within a pre-specified tolerance, then they cannot be changed. Other sub-functions of this subprocess enable a customer to further control how the exposure will be processed. Subprocesses C115 through C186 supporting this process will be described in detail below.

Subprocess C115 entitled ENTER MARK OF PORTFOLIO is a GUI process which allows a customer to enter a specific mark-to-market value for a specific credit support agreement. The Input to this subprocess is the list of credit support agreements to be valued today, and the mark to specific credit exposure figures; the Output is computed credit support amounts for each credit support agreement; and the Event/Trigger is provided by way of user selection. Each day, a Credit Support Processing Screen will display to GCSS customers a list of credit support agreements for which marks are required. The user can modify this display to show the marks required for an extended time period. For each credit support agreement displayed, the user is able to enter the credit exposure that they have calculated. This credit exposure should reflect the valuation of a portfolio of deals between the two counterparties covered under the credit support agreement. Once the exposures are entered into the GCSS, the user can transmit them to the GCSS server for processing, defined by process C200 described below.

Subprocess C120 entitled AGREED AMOUNT FUNCTION is a GUI process which allows customers to enter a mutually agreed upon amount to be moved for the credit exposure which must exactly match. The Input to this subprocess is a credit exposure record and the Agreed Amounts; the Output thereof is the modified credit exposure record; and the Event/Trigger is provided by user input. An Agreed Amount is used when the counterparties cannot agree on the correct valuation of a credit exposure. The Agreed Amount is a mechanism to let the two counterparties set the exact basis amount for this credit exposure. This means that both GUI process counterparties must enter exactly the same "agreed" amount for a credit exposure as opposed to the normal matching within a non-dispute range. It can be used in special situations for an agreement where there is a major variation in each parties valuation. In this case, the Agreed Amount is used to determine an amount to be moved, but still preserving the Individual Amounts. In this case, the flag value of the Agreed Amount Flag will be set to Yes.

Subprocess C125 entitled ABILITY TO BLOCK DELIVERY is GUI process which allows the customer to instruct the GCSS to not deliver (i.e. freeze) any further securities to the counterparty. This subprocess applies to one side of the credit support agreement, although there is no system restriction on both customers setting the asset freeze feature. The Input to this subprocess is the credit support agreement to be blocked; the Outputs thereof is changes to the credit support agreement in the GCSS database and the "refuse to deliver" flag (i.e., set to YES); and the Event/Trigger is provided by way of User selection. This function allows a counterparty to block (i.e., freeze) the further delivery of assets to a counterparty under a specified credit support agreement. The relevant counterparty is subsequently notified of the refusal to deliver.

Subprocess C130 entitled ABILITY TO DECLINE is a GUI process which allows a customer to refuse receipt of assets for a particular credit support agreement. The Input to this subprocess is the credit support agreement to be declined; the Output thereof is the changes to the agreement in the GCSS database (i.e., the Decline Receipt Flag in the information structure CREDIT EXPOSURE will be set to Yes for the particular day in question); the Event/Trigger is provided by way of User selection. The function provided by this subprocess is to allow a counterparty to refuse assets that they are entitled to receive under a credit support agreement. This may be used by a counterparty to refuse assets that they would have to pay a return on (cash). Because a counterparty cannot selectively refuse assets by type (if they are accepted in the credit support agreement), this feature allows them to reject any and all assets. Cash is treated slightly different than other pledged assets, in as much as the customer who receives the cash asset as collateral will have to pay interest to the party who delivered the cash asset. The interest rate is defined in the credit support agreement, and because this rate maybe unattractive compared to the market rate, the customer may decline to accept the collateral, rather than take a loss on the interest rate differential. A preferred mechanism for implementing this subprocess would be to set a value (e.g., Threshold) at which no more assets would be accepted. This threshold could be set to the value of maximum acceptable credit support, thereby causing new securities not to be delivered. Also, this mechanism can be used to set the amount to accept a 0, allowing full collateral return. Subprocess C140 entitled RECALCULATE FOR A CURRENCY CHANGE is a GUI process which allows customers to recalculate credit support amounts in a different currency. The Input to this subprocess is the new currency in which to display values; the Output is the recalculated display values of credit support amounts; and the Event/Trigger is provided by way of user input. Each credit exposure will be entered in a specific currency. Furthermore, the credit exposures will be totaled on the users screen and the total must be expressed in a single currency. This subprocess allows customers to convert currencies between the currency of entry and the currency of display, as well as switch the currency of display for individual (or sets of) credit exposures, as well as for the total values of the credit exposure.

Process C180 entitled ENTER EXPOSURES OFF-LINE is a collection of subprocesses which allow GCSS customers to enter exposure figures off-line. Some customers will have up to hundreds of counterparties, and thus they will need an ability to enter into the GCSS bulk amount of exposure figures which they have calculated off-line. Expectedly, some customers will desire to manipulate their exposure calculations into a form that is readable by a commonly used spreadsheet program such as Lotus 1-2-3 or Microsoft Excel. This process enables customers to enter MTM calculations off-line and then upload the information (within a fixed format) into their GCSS workstation for validation and transmission to the GCSS server workstation. The practical utility of this exposure entry method is that many GCSS customers will have tens and possibly hundreds of counterparties for which to enter exposure figures. This process provides GCSS customer with the ability to bulk enter many exposure figures into the GCSS in an easy manner. Logically, this process consists of the following steps: using subprocess C182 to download to the GCSS customer workstation, the credit exposure figures to be entered in the system; using subprocess C184 to enter figures off-line; and using subprocess C186 to upload the valuations to the GCSS workstation for validation. Subprocesses C182 to C186 supporting this functionality will be described in detail below.

Subprocess C182 entitled DOWNLOAD EXPOSURES TO PC is a GUI process which downloads all active credit exposures to the customer's PC for local processing. This file will serve as a template for the new exposures. The Input to this subprocess is the customer account number and exposure figures; the Output is a file of formatted credit exposures figures displayed on the user's PC; the Event/Trigger is provided by way of User Selection. The format of this data file will have a Header record with the following fields: Name of file; Credit Exposures; Account number; Data file generated; and Number of records including header. Then one record per credit exposure containing: credit support agreement number; counterparty name; value date; currency agreement; previous basis; credit exposure; and counterparty exposure.

Subprocess C184 entitled OFF-LINE ENTRY EXPOSURES is a customer specified process which allows the customer to enter credit exposure figures in an off-line manner.

Subprocess C186 entitled UPLOAD EXPOSURES TO PC is a GUI process which uploads the file of credit exposures into the GCSS GUI program. The Input to this subprocess is the file name to uploaded; the Output is the set of credit exposures that are uploaded into memory of the GCSS Workstation; and the Event/Trigger is provided by way of user selection. In the illustrative embodiment, this function operates as follows: it prompts for the uploaded data's filename, and default last used filename; it uploads the file (if the file is of the incorrect format, then it will be rejected as whole); and it generates a simple report file which will detail per valuation if it was accepted or not. The customer will need to check this and carry out any necessary actions.

Process C200 entitled VERIFY CREDIT EXPOSURE comprises a collection of subprocesses which collectively transmit the credit exposure figures from the GCSS Customer Workstation to the GCSS server-based processes at Central Station, verifies these figures, and then calculates the Basis and then the Delivery and/or Return Amounts (i.e, Amount to Move (ATM)) using a complex system of rules to be described hereinbelow. Prior to describing the subprocesses involved in this process, a brief overview of this process is in order.

Figure 14A:
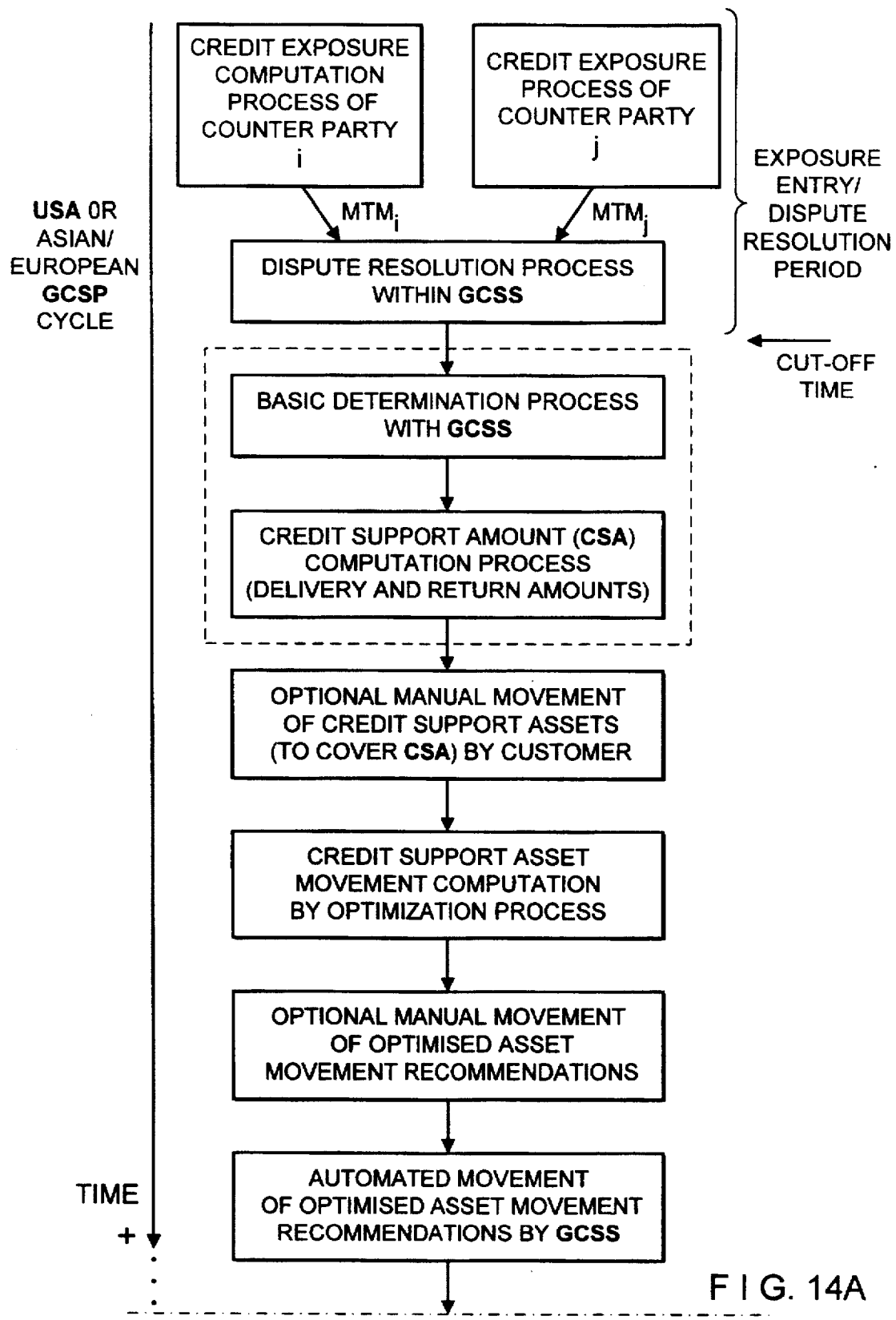

As illustrated in FIGS. 14A through 14C, starting at about 5 or so hours before the Asset Movement Optimization Process is prescheduled to occur, GCSS customers are provided a time window (called the Exposure Entry Period) within which they may or may not transmit by way of their GCSS Customer Workstation, their exposure number (i.e. mark-to-market figure) for each credit support agreement. As discussed above, this figure represents what is commonly referred to as the "mark", for the entire book of transactions covered by that credit support agreement. The GCSS automatically dates the entered exposure figures with a specific market valuation date, i.e., Valuation Date reference (V). Counterparties agree in advance when they will submit figures for a Valuation Date. This planned Submission Date (S) can be V itself, V−1, V+1, V+2, etc.

In general there are three cases of credit exposure entry which the GCSS is logically prepared to respond to: (1) where both parties enter a credit exposure figure to the GCSS; (2) where only one of the parties enter a credit exposure figure to the GCSS; and (3) where none of the parties enter a credit exposure figure to the GCSS. In each of these situations, the GCSS employs rule-based logic, agreed to by the counterparties, in order to compute a required credit support amount for the particular credit exposure entry period. Thus, if both parties to a credit support agreement enter a credit exposure figure, then the GCSS will receive two numbers expressed in a currency agreed to in the credit support agreement. If only one party to a credit support agreement enters a credit exposure figure, then GCSS will receive only one number expressed in a currency agreed to in the credit support agreement. If none of the parties to a credit support agreement enter a credit exposure figure, then GCSS will receive no numbers during the particular GCSPC in question. However, the credit support amount computation rules of the present invention accommodate each of this possible situations and provides an Amount to Move which is in full accordance with the bilateral terms of the credit support agreement between the parties. With this overview of the exposure entry process in mind, the details of the subprocesses supporting this system functionality will now be described in greater detail below.

Subprocess C220 entitled TRANSMIT TO GCSS EXPOSURE is a GUI-based process which allows the customer (i.e., counterparty) to transmit entered credit exposure figures from the GCSS Customer Workstation to the GCSS Process Server 6 at the Central Station for processing, as shown in FIG. 1. The Input to this subprocess includes a list of credit exposure records; the Output is the transmission of those records to GCSS server; and the Event/Trigger is provided by way of user selection. The user can transmit all exposures or only a selected subset thereof. The Exposures are marked as transmitted to avoid duplicate transmissions. If an exposure had been previously transmitted and then was modified, the Transmitted Flag would be reset indicating that the modified exposure needs to be re-sent.

Subprocess C230 entitled CREDIT EXPOSURE CALCULATION is a server-based process carried out at the GCSS Central Station, which receives final credit exposure figures entered into the GCSS by the counterparties to a particular credit support agreement during a specified GCSPC (e.g., the i-th GCSP Cycle), and thereafter processes the same in order to compute the Basis and the required Credit Support Amount (i.e., collateral) to cover the outstanding credit exposure between the counterparties. Thereafter, this credit support amount is translated into a Delivery and/or Return Amount, expressed as an Amount to Move (ATM) a particular asset type k from party i to counterparty j (for Delivery Amounts), and/or from counterparty j to counterparty i (for Return Amounts). Notably, this subprocess is performed for each active credit support agreement in the GCSS. The Input to this subprocess is list of credit exposure figures, and credit support agreement information; the Output thereof includes the computed Basis, Credit Support Amount, the Amount to Deliver, Amount to Return for transmission to the GCSS database and the counterparties of the credit support agreement; and the Event/Trigger is provided by a TIB message(s) received asynchronously from the GCSS Customer Workstations. In order to understand the operation of this important subprocess of the GCSS, it will be helpful to first provide a concise overview of the credit support requirements under a credit support agreement, and thereafter describe the computational details of this subprocess.

In the GCSS, the calculation of Credit Support Assets for each credit support agreement follows industry standard rules and takes into account the following conventional figures: Basis; Threshold (both "new" and "old" methods accepted); Independent Amount; Minimum Transfer Amount; and Rounding parameters for Delivery and Return Amounts; and other fixed amounts. As will be described below, each of these figures are used by the Subprocess C230 to the compute the total amount of credit support assets which must be "provided" to the secured counterparty in order to cover the total credit exposure of the secured counterparty. Notably, during each i-th GCSP Cycle, the total credit exposure of the secured counterparty comprises several independent components, namely: (1) the Basic Amount, typically a constant figure set by agreement and made a bilateral term of the credit support agreement; (2) the Basis, computed by the Subprocess C230 using MTM figures of the counterparties, if entered into the GCSS; and (3) the Independent Amount, typically a quasi-constant figure periodically changed (e.g., about 10 or so times per year) and which may or may not be netted in with the MTM figures of the counterparties, depending on the parameters of the credit support agreement.

By definition, the Basic Amount, with respect to any one counterparty (i.e., the secured counterparty), represents the value of Credit Support Assets which the secured counterparty contractually requires, independently of the Basis, to be constantly held in its GCSS account as the result of a transfer from the transferring counterparty (i.e., the Transferor Counterparty). The Basic Amount cannot be netted with either the Deliver or Return Amounts, or any other computation, except rounding when top-ups or releases are required. Any counterparty to a credit support agreement may require a Basic Amount from the other counterparty, in which case these Basic Amounts are held separately in each counterparty's GCSS account and are not netted together. In the event that Credit Support Assets between a pair of counterparties are insufficient to cover all forms of exposure presented therebetween, then the Basic Amount has a higher order of priority than all other security figures and must be satisfied foremost.

By definition, the Basis, a figure distinct from the Basic Amount, is the (last) value of the credit exposure effectively calculated by the GCSS based on credit exposure figures entered into the GCSS during the Notification Period, and is used to compute the Credit Support Amount between a pair of counterparties to a credit support agreement. Depending on the circumstances of each credit support agreement during the GCSP Cycle in question, subprocess C230 computes the Basis in any one of the following techniques: by application of the Non-Dispute Rule or Undisputed Amount Rule; by application of the Passive Acceptance Band Rule; or by overriding the Undisputed Amount Rule. Each of these Basis Determination Rules will be described in detail below.

When two Exposure figures are received from the counterparties to a credit support agreement, then subprocess C320 uses either the Non-Dispute Rule or the Undisputed Amount Rules to determine a figure for the Basis.

Non-Dispute Rule

During the formation of each credit support agreement in the GCSS, both counterparties agree to a specific de minimis Non-Dispute Band of X%/X'$. This rule, called the Non-Dispute Rule, considers only the actual credit exposure figures entered into the GCSS by both counterparties, and ignores both the implied amount and direction(s) of change in the credit exposure from the prior period. According to this Basis Determination Rule, subprocess C320 computes the GCSP Cycle's Basis, as the average value of the two credit exposure figures received into the GCSS (by the end of the Resolution Period) but only if these credit exposure figures satisfy either of the following conditions:

(1) the two credit exposure figures carry the same sign and the higher figure (in absolute terms) does not exceed the lower figure (in absolute terms) by more than X%; or (2) the dollar difference between the two credit exposure figures (including if they carry opposite signs) is less than X'$.

If during the Resolution Period, the two amended credit exposures figures reside within the Non-Dispute Band, then subprocess C230 will automatically split the difference equally and use the resulting number as the Basis.

Undisputed Amount Rule

When the two credit exposure figures cannot be reconciled by the Non-Dispute Rule (which has precedence over the Undisputed Amount Rule), subprocess C320 uses the Undisputed Amount Rule to compute the Basis for the GCSP Cycle. According to the Undisputed Amount Rule, the Basis is equal to the smaller of the two credit exposure figures when there is an increase in the credit exposure relative to the previous Basis, and the larger of the two figures in the case of a decrease in the Exposure relative to the previous Basis. This ensures that in case of a dispute, the smallest amount both counterparties agree to is transferred (i.e., provided as credit support assets). Should the two credit exposure figures reflect changes of a different sign from one another, subprocess C230 will conclude that no Undisputed Amount can be computed and determine the current Basis as the prior cycle's Basis.

In the event that the counterparties agree to apply an exposure amount greater than the amount otherwise computed using the Undisputed Amount Rule above, then the Transferor may manually override the computed Undisputed Amount displayed on its GCSS Workstation screen by simply entering in the required number which, in turn, will cause an adjustment to the Basis for the GCSP cycle.

Passive Acceptance Band Rules

When the GCSS receives only one credit exposure figure from a counterparty to a credit support agreement, then the Passive Acceptance Band Rules are used to determine a figure for the Basis. During the formation of the credit support agreement, both counterparties to the credit support agreement agree to a Passive Acceptance Band for Return Amounts, a Passive Acceptance Band for Delivery Amounts, and a set of rules therefor that are to be applied only in the event that one credit exposure figure is communicated to GCSS by one of the counterparties during the Exposure Entry Period.

Regarding the Passive Acceptance Band for the Delivery Amounts, each counterparty establishes a two "$ yd/zd %" configuration, unique to each credit support agreement and counterparty. The yd and zd values need not be symmetrical between counterparties to a given credit support agreement, and, in general, may range between 0 to infinity, indicating that counterparty's willingness to automatically deliver credit support assets to the other counterparty when called upon to do so by subprocess C230.

Regarding the Passive Acceptance Band for Return Amounts, each counterparty establishes a $ yr/zr %" configuration, unique to each credit support agreement and counterparty. The yr and zr values need not be symmetrical between counterparties to a given credit support agreement, and may range between zero and infinity, indicating that counterparty's willingness to automatically return credit support assets to the other counterparty when called upon to do so by subprocess C230.

In the illustrative embodiment, the set of Passive Acceptance Rules are designed to address three different situations that are logically possible when only counterparty enters a credit support figure into the GCSS during a particular GCSP Cycle. These three situations and the rules that apply therein will be considered below.

Delivery Amount Rule:

Where Sole Counterparty Entering a Credit Exposure Figure Requests Credit Support Assets to be Provided in its Favor This Delivery Amount Rule states that the sole party not entering a credit support figure into the GCSS is willing to:
  (1) maintain up to $yd of total credit support assets at any one time with the requesting counterparty regardless of how the current Basis compares to the prior cycle's Basis; or
  (2) deliver credit support assets consistent with any Basis which does not exceed zd % of the prior cycle's Basis,whichever comes closest to satisfying the calling party's request.

This rule is applied on a continuing basis, and once the $yd guidance cap has been reached, the Basis can be upwardly incremented each cycle by a multiplicative factor of (1+zd).

Return Amount Rule:

Where Sole Counterparty Entering A Credit Exposure Figure Into The GCSS Requests Credit Support Assets To Be Returned To It This Return Amount Rule states that the sole counterparty entering a credit support figure into the GCSS is willing to:
  (1) maintain up to $yr of total credit support assets at any one time with the requesting counterparty regardless of how the current Basis compares to the prior cycle's Basis; or
  (2) return Credit Support Assets in any amount consistent with a Basis not varying by more than zr% compared to the prior period's Basis, whichever comes closest to satisfying the requesting party's request. This rule is applied repeatedly on subsequent valuation days and once the $yr guidance cap has been reached, the Basis can be incremented upwardly each cycle by a multiplicative factor of (1+zr).

If the sole new credit exposure represents a change in sign of the Basis (e.g., −10 becomes +15), then the change in credit exposure is decomposed into a Return Amount for which Return Amount Rule applies, and a Delivery Amount for which Delivery Amount Rule applies. Thus, in order to facilitate sign changes which are small in absolute terms, but are located around the zero mark, it is advisable to set $yr at some small amount, as the zr% ratio will allow such a situation to be unwound without zr%=100%, a figure counterparties might find too high.

Return/Transfer Rule:

Where Sole Counterparty Entering Credit Exposure Figure (i.e. Sole Valuation Agent) Into The GCSS Offers To Return or Deliver Credit Support Assets If the sole provider of the credit exposure figure is offering to return, or transfer new, credit support assets, then the sole credit exposure figure is considered as the current cycle's Basis.

After the Basis has been determined using the above set of Basis Determination Rules, subprocess C230 proceeds to automatically compute the credit support amount required to cover the determined Basis and other terms of the credit support agreement. The details of this procedure will be described below.

For GCSS calculations, the Basis (expressed as a positive number) represents the credit exposure of the secured counterparty (i.e., Secured Party) on the asset providing counterparty (i.e., Transferor). The Credit Support Amount, on the other hand, is the total value of Credit Support Assets, adjusted for haircuts, that the Transferor must transfer to the Secured Party to cover the credit exposure presented by the Basis. The subprocess C230 can compute the Credit Support Amount using either Method A or Method B described below.

According to Method A, subprocess C230 computes the Credit Support Amount required to cover the determined Basis, by: first subtracting from the Basis, the Threshold applicable to the Transferor with respect to that bilateral credit support agreement; then adding the Independent Amount applicable to the Transferor; and then subtracting the Independent Amount applicable to the Secured Party; the Credit Support Amount is the resulting amount provided that this figure is greater than zero; if it is not, then the Credit Support Amount is nil (i.e., zero).

According to Method B, subprocess C230 computes the Credit Support Amount required to cover the determined Basis, by: first adding together the Basis and the Independent Amount applicable to the Transferor; then subtracting the Independent Amount applicable to the Secured Party; the Credit Support Amount is the resulting amount provided that this figure is larger than or equal to the Threshold; if it is not, then Credit Support Amount is nil.

Notably, changes in Credit Support Amounts are most commonly brought about by changes in the Basis and/or changes in the Value of Credit Support Assets. Assuming that the value of the Credit Support Assets remains constant: a plain delivery results from an increase in Basis whose sign has not changed; a plain return results from a decrease in Basis whose sign has not changed; and a combination results from a change in the sign of the Basis, where the absolute value of the previous Basis is returned and the absolute amount of the new Basis is delivered.

Also, while Credit Support Assets transferred to cover the Basic Amount and Credit Support Assets transferred to cover a determined Basis are both maintained in the same GCSS account(s), they are, however, always reported as separate line items, according to well established convention in the financial community.

Computing the Delivery and Return Amounts

After computing the credit support amount, Subprocess C230 proceeds to compute the Delivery and/or Return Amounts as follows. The Delivery Amount for a Transferor on any given day is computed as the difference between the Credit Support Amount and the value of Credit Support Assets (valuated on that given day), provided that the resulting figure exceeds the Minimum Transfer Amount. However, if the resulting amount does not exceed the Minimum Transfer Amount, then the Delivery Amount is nil. The Return Amount for a Secured Party on any given day is computed as the difference between the value of Credit Support Assets and the Credit Support Amount (valuated on that given day), provided that the resulting figure exceeds the Minimum Transfer Amount. However, if the resulting amount does not exceed the Minimum Transfer Amount then the Return Amount is nil.

For any given Valuation Date (V), the Delivery and Return Amounts are computed using the latest GCSS re-pricing of assets at the time at which movement takes place (D). Accrued interest, not included as coupons, is automatically re-routed by the GCSS to the originator of securities. The GCSS also checks daily the credit ratings of securities within the system to ensure that any downgrades do not violate the eligibility tables of affected counterparties.

After the Delivery and/or Return Amounts are computed, subprocess C230 proceeds to round these amounts to the nearest rounding integer using the rounding procedures agreed to by the counterparties as follows:

Standard: Delivery Amounts, if not an exact multiple of the rounding integer, will be rounded up to the nearest integral multiple of the rounding integer. Return Amounts, if not an exact multiple of the rounding integer, will be rounded down to the nearest integral multiple of the rounding integer.

Upwards: Delivery Amounts and Return Amount, if not an exact multiple of the rounding integer, will be rounded up to the nearest integral multiple of the rounding integer.

Downwards: Delivery Amounts and Return Amounts, if not an exact multiple of the rounding integer, will be rounded down to the nearest integral multiple of the rounding integer.

Midpoint: Delivery Amounts and Return Amounts, if not an exact multiple of the rounding integer, will be rounded to the nearest integral multiple of the rounding integer, and amounts which are equal to an integral multiple of the rounding integer plus one half of the rounding integer are rounded up to the nearest integral multiple of the rounding integral.

After rounding the computed Delivery and Return Amounts, subprocess C230 reports to each pair of counterparties, the total figure of credit support assets (i.e., Delivery and Return Amounts or Amount to Move(ATM)) that are required to cover the total credit exposure therebetween using either U.S. Treasuries or U.S. Dollars.

As there typically will be hundreds of active credit support agreements in the GCSS at any instant in time, it is necessary for subprocess C230 described above to be carried out for each one of these agreements. Thereafter, the resulting Delivery and/or Return Amounts from these subprocesses will be stored in the GCSS Database.

As can be expected, the GCSS must have a record of which credit support agreements and counterparties thereto should be invited to participate in the next GCSP cycle. Subprocess C240 entitled CREATE NEXT CREDIT EXPOSURE is a server-based process which generates the schedule of counterparties who are to be invited to enter at a subsequent date (i.e., GCSP cycle), their next credit exposure figures. The Input to this subprocess is a set of credit support agreements; the Output thereof is the CREDIT EXPOSURE information structure; and the Event/Trigger is the date on which the rollover is scheduled to occur. This subprocess is initiated by the date and parameters defined within the credit support agreement. Only agreements that are active are considered. Those being prepared, under default or terminated, are excluded. The parameters analyzed by this subprocess include: the credit exposure frequency; the date of last credit exposure; and the status of the credit support agreement.

ASSET MOVEMENT OPTIMIZATION PROCESS OF THE PRESENT INVENTION

As customers do not have identical eligibility criteria, haircuts and preference tables, there is an opportunity for GCSS to calculate which assets are most cost-effective to deliver. For these customers permitted by their counterparties to re-use assets, the GCSS will enable efficient on-transfer of securities, minimizing aggregate system demand for credit support assets.

As shown in FIG. 15, GCSS customers may opt not to decide which of their assets will be moved in order to cover the computed credit support amounts, but rather elect to have such assets determined automatically using an Asset Movement Optimization Process in the illustrative embodiment, this Optimization Process determines which assets to move in order to provide cover, while minimizing the total market value of the assets to be moved among all pairs of counterparties who have opted for asset allocation using the Process.

Figure 11A:
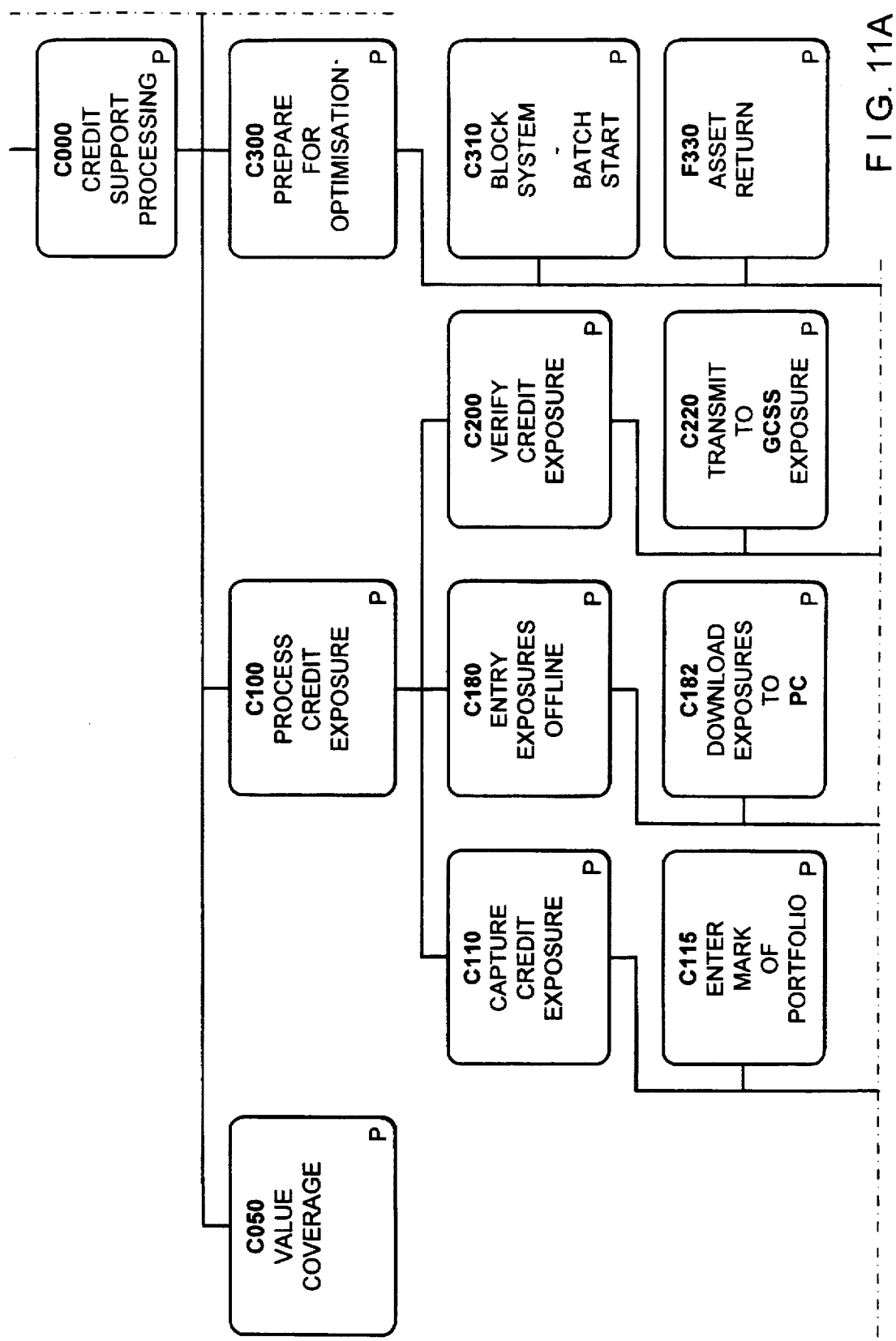
FIG. 11A is a schematic diagram representative of the Asset Movement Process of the present invention, showing the information items input to the process and optimization output therefrom for subsequent use by the GCSS in optimally allocating credit support assets of member parties to the system in order to cover the credit exposures thereof.
Figure 11B:
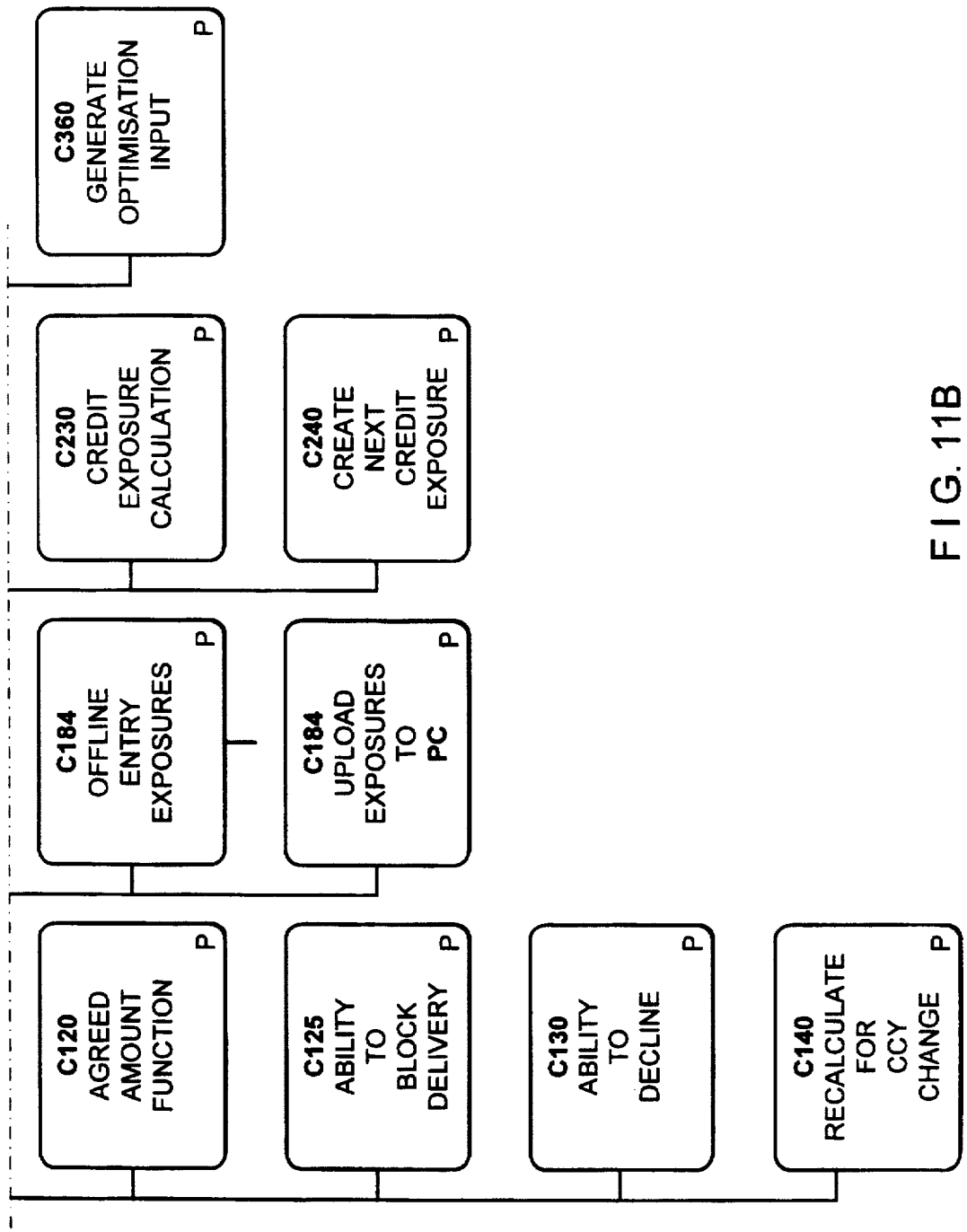
FIG. 11 is a schematic diagram illustrating the hierarchical arrangement among the various information subprocesses comprising the information process group entitled CREDIT SUPPORT PROCESSING.

As shown in FIG. 11A, the Movement Optimization Process of the present invention is viewed as a subsystem (i.e., subprocess) of the GCSS, to which an input information set is provided from the GCSS Database, and from which an output information set is produced for achieving optimal asset movement to effect cover of credit exposure among the counterparties. In general, the Asset Movement Optimization Process may be viewed as comprising three major stages, namely: a problem modelling stage; a problem solving stage; and a solution utilization stage. Each of these stages will be described below.

During the problem modelling stage, information elements which define an Asset Movement Optimization Model of the illustrative embodiment are extracted from the GCSS Database using a pre-optimization process (i.e., C300) described below.

Process C300 entitled PREPARE FOR OPTIMIZATION comprises a collection of subprocesses that prepares the GCSS for the Asset Movement Optimization Process of the present invention which, as a batch-process, attempts to reallocate credit support assets to best cover customer credit exposures. In general, this process has two steps: (1) prior to running the optimization process, it first sets a GCSS system variable to "Running Optimization" which blocks all incoming security reallocations, pledges, credit exposures from consideration; and (2) generates an output file containing all information items required by the Optimization Engine. The subprocesses comprising Process C300 will be described below.

Subprocess C310 entitled BLOCK SYSTEM-BATCH START is a server-based function which sets the GCSS into its optimization mode. The Input to this subprocess is the Master control table (i.e., information structure); the Output thereof is the Master control table; and the Event/Trigger is provided by time and/or GCSS Operator override. This subprocess sets the system run-mode indicator to Running Optimization. It also sets the date and time when the Optimization Run started. Until this indicator is reset by the POST-OPTIMIZATION PROCESS, no security movements, credit exposures or manual transfers will be considered, as the optimization process is a batch system requiring dedicated use of the asset records while it is operating.

Subprocess C360 entitled GENERATE OPTIMIZATION INPUT is a server-based process which collects (i.e., reads out) information from the GCSS database and produces an information file "external" to the GCSS Database, which is to be provided as input to the ASSET MOVEMENT Optimization Engine during the problem solving stage of the Asset Movement Optimization Process. The Input to subprocess C360 includes credit support amounts (i.e., Amounts to Move) asset pieces available, and rules for each credit support agreement considered in the optimization process;

the Output thereof is a file containing credit support Amounts to be Moved, asset pieces available, and rules for each credit support agreement; and the Event/Trigger of this subprocess is provided by the completion of subprocess C310. This process collects from the GCSS database, all parameters necessary for the "black box" optimization engine (i.e., GCSS Optimization Server 3) to allocate the assets in the GCSS to cover the determined credit exposures of the counterparties participating in the optimization process.

The information collected from the GCSS data base by subprocess C360 is first filtered by timezone (e.g., U.S., European, or Asian), and where necessary, frequency of credit exposure (e.g., daily, weekly, etc.). From such information collecting and processing operations, the input information set (i.e., the external information file) is formed comprising (in greater detail): counterparty code; total credit exposure expressed as total amounts plus Amounts to Move; yesterday's credit exposure; today's value of yesterday value; eligible security types; valuation percentages (i.e., Haircuts); Amount to Move (calculated from Threshold, etc.); asset pieces available; Minimum Denomination Amount (i.e., if set to ZERO, then can be broken into any size (per asset)); Roundup type; the value of credit support collateral already transferred (after haircuts); Currency of credit exposure; Basic Amount (if any); Independent Amount; Collateral available (including information specifying asset pieces, such as price, security type, and security code); and FX exchange rates (as credit support agreements are expressed in different currencies, and all input information to optimization engine must be in a single common currency so that it needs to only analyze numbers). Notably, the eligibility/preference tables are defined by security type. Also, if a counterparty receives another security from someone else, then the Optimization Process needs enough security information to be able to determine its security type. Also input information must reflect existing chains of asset transfer. This is achieved by handling asset pieces. Asset pieces at the end of a chain may no longer be in the system, as they may have been repoed out. Consequentially, the whole chain is, in effect, in place. If a counterparty cannot satisfy all his exposures, then his existing transfers may need to be frozen in place.

In order to understand the detailed operation of the Asset Movement Optimization Process, it will be helpful to keep several points in mind. The output of subprocess C360 is an information set constituting the Asset Movement Optimization Model of the illustrative embodiment. In general, this Optimization Model comprises two components, namely: (i) an objective function to be minimized or maximized; and (ii) a system of constraints which any optimal solution to the objective function must satisfy. The objective function is expressed as a mathematical expression whose variables are defined over the problem space of the GCSS. The system of constraints are also expressed as a set of mathematical expressions whose variables are also defined over the problem space. The dimensionality (i.e., n) of the problem space is determined by the number of variables used in the formulation of the objective function and the system of constraints. Understandably, the number n is an integer which depends on how the asset movement optimization problem is viewed and formulated, and thus will expectedly vary from embodiment to embodiment of the present invention. The (decision) variables of the objective function and the system of constraints must ultimately be decided upon in order to find an optimal solution. The goal of the Asset Movement Optimization Model of the illustrative embodiment is to find the amount of each asset type k that must be moved from counterparty i to counterparty j, such that the total market value of assets transferred among all pairs of counterparties (participating in the Optimization Process) is minimized, while satisfying the system of constraints represented by: the availability of assets; eligibility of asset transfers; minimum piece size restrictions; frozen assets; coverage of credit exposures; refusal to delivers; refusal to receives; designations (e.g., pledges); substitutions; and preferences. It is understood, however, that other performance measures might be selected in order to achieve a better suited goals for optimization in alternative embodiments of the GCSS. Examples of such performance measures include, but are not limited to: required coverage of credit exposures; minimum amount of original collateral provided; transfers match preference tables; minimum total volume of collateral delivered; transfers of large asset blocks; and minimum number of different assets transferred.

In the illustrative embodiment, each expression in the objective function is a first order linear equation. Also, each constraint of the Model is also expressed as a first order linear equation (e.g., an expression of equality or inequality). For simplicity of handling and processing, the variables and coefficients of these equations are arranged in sets of matrices. Collectively, these sets of matrices can be organized into a single matrix to provide the Asset Movement Optimization Model of the GCSS. The size of the matrix of FIG. 11B, and thus the size of the mathematical problem to be solved by the Asset Movement Optimization Process of the present invention, is dependent upon the number of columns and the number of rows in the matrix used to represent the Asset Movement Optimization Process. As shown, the number of columns is equal to $2(NAG)(k+1)$, where NAG is equal to the number of credit support agreements subject to the Asset Movement Optimization Process, and k is equal to the number of assets of the counterparties to the credit support agreements. The number of rows of the matrix is equal to $2(NAG)+NCP(k)$, where NAG is equal to the number of credit support agreements subject to the Asset Movement Optimization Process, k is equal to the number of assets of the counterparties to the credit support agreements, and NCP is equal to the number of counterparties (i.e., customers) participating in the Asset Movement Optimization Process. The number of bounds is equal to the number of columns in the matrix.

In the illustrative embodiment, the objective function of the Asset Movement Optimization Model comprises a set of decision variables, namely: $MVT(k, i \rightarrow j)$, which represents the market value of asset type k transferred from counterparty i to counterparty j, wherein k is an integer from 0, 1, 2, 3, ... N, and i=j=M, which is the number of active credit support agreements considered in the Asset Movement Optimization Model.

The Asset Movement Optimization Model also includes a number of parameters which are used to represent the objective function and system of constraints, namely: $ATM(k, i \rightarrow j)$ which represents the amount of asset type k (i.e., Delivery and/or Return Amount) to be moved from counterparty i to counterparty j; $HCR(k, i \rightarrow j)$, which represents the haircut rate for each asset type k transferred from counterparty i to counterparty j; $AMV(k, i)$, which represents the market value at the start of the day, of asset type k held by counterparty i; and $MDS(k)$, which represents the market value of the minimize piece size of asset type k; and $DES(k, i \rightarrow j)$, which represents the designation of asset type k to be transferred from counterparty i to counterparty j.

In the illustrative embodiment, the objective function of the Asset Movement Optimization Model comprises an expression defining a relation between defining the decision variables and the parameters of the Model, namely:

$$\sum_i \sum_j \sum_k MVT(k, i \rightarrow j)$$

The set of constraints of the Asset Movement Optimization Model comprises: the availability of collateral (i.e., assets) which is expressed mathematically as:

$$\sum_j MVT(k, i \rightarrow j) \leq AMV(k, i) + \sum_j MVT(k, j \rightarrow i);$$

eligibility of asset transfers which is expressed mathematically as $$MVT(k, i \rightarrow j) = 0;$$

minimum piece size restrictions which is expressed mathematically as $$MVT(k, i \rightarrow j) = y \, MPS(k);$$

frozen assets which is expressed mathematically as $$MVT(k, i \rightarrow j) = MVT(k, j \rightarrow i) = 0;$$

refusal to delivers which is expressed mathematically as $$MVT(k, i \rightarrow j) = MVT(k, j \rightarrow i) = 0;$$

refusal to receives which is expressed mathematically as $$MVT(k, j \rightarrow i) = MVT(k, j \rightarrow i) = 0;$$

required coverage of exposures which is expressed mathematically as $$\sum_k [MVT(k, i \rightarrow j)][1 - HCR(k, i \rightarrow j)] \geq ATM(k, i \rightarrow j);$$

designations (e.g., pledges) which is expressed mathematically as $$MVT(k, i \rightarrow j) \geq DES(k, i \rightarrow j);$$

preferences which is expressed mathematically as $$\left[ \sum_m (Availability(m))(Eligibility(m, i \rightarrow j)) \right] \quad \begin{array}{l} MVT(k, i \rightarrow j) = 0, \\ \text{where } m: \\ \text{preference}(m) > \text{pref}(k) \end{array}$$

In general, there are two principally different approaches that may be used to achieve asset movement optimization, namely: (1) by optimally reallocating (i.e., "reshuffling") all of the available assets among the pairs of counterparties to cover credit exposures among the pairs of counterparties to all credit support agreements; or (2) by optimally allocating (i.e., transferring) only the difference in credit support assets required to cover "changes in" outstanding credit exposures between the counterparties to the credit support agreements. From a practical point of view, each of these approaches has its advantages and disadvantages. Using the reshuffling approach results in a more efficient use of collateral, but requires substantially longer time to compute an optimal solution to the problem. Using the difference approach results in fewer returns/substitutions and collateral remains resident longer, but requires a shorter time to compute an optimal solution to the problem. In the illustrative embodiment, the second approach has been adopted for the Asset Movement Optimization Process of the GCSS. As will become apparent below, the selective of the difference approach influences the expressions used to represent the objective function and the system of constraints employed in the linear programming formulation of the Asset Movement Optimization Model.

In order to lessen the constraints posed by the problem (e.g., the availability of assets, eligibility of asset transfers, minimum piece size restrictions, frozen assets, required coverage of credit exposures, refusal to delivers, refusal to receives, designations, and preferences), the Asset Movement Optimization Process of the illustrative embodiment employs a group of Hierarchy Precedence Rules for deliveries and returns.

The hierarchical set of rules to be followed by the Asset Movement Optimization Process for asset deliveries (i.e., ATM(k, i→j) are set forth below in their order of priority of use:

1. Firstly, move from counterparty i to counterparty j, on-transferred collateral;
    1a. move from counterparty i to counterparty j, on-transferred collateral following the preferences of counterparty j; and
    1b. move from counterparty i to counterparty j, on-transferred collateral having the lowest valuation percentages (i.e., haircuts);
2. Secondly, move original (i.e., own) collateral from counterparty i to counterparty j;
    2a. move from counterparty i to counterparty j, original collateral, following the preferences of counterparty j; and
    2b. move from counterparty i to counterparty j, original collateral having the lowest valuation percentages (i.e., haircuts).

The hierarchical set of rules to be followed by the Asset Movement Optimization Process for asset return (i.e., ATM (k, j→i) are set forth below in their order of priority of use:

1. Firstly, move from counterparty j to counterparty i, only assets previously provided to counterparty i;
2. Secondly, move from counterparty j to counterparty i, collateral matching the preferences of counterparty i (i.e., returnee); and
3. Thirdly, move from counterparty j to counterparty i, collateral having the highest valuation percentages (i.e., haircuts).

Requests by a counterparty for the return of specific assets will be accommodated and returned by the Asset Movement Optimization Process as each asset subject to a specific request instruction will be frozen in the returnee's account in order to prevent it from being used by the Optimization Process. Asset Return Requests that are passed to the Asset Movement Optimization Process will generate chained requests similar to substitution requests but with no countervalue. The GCSS will look only at assets still in the system (i.e., ignore those repoed out) and then follow the Precedence Rules for asset returns, described above.

Figure 11C:
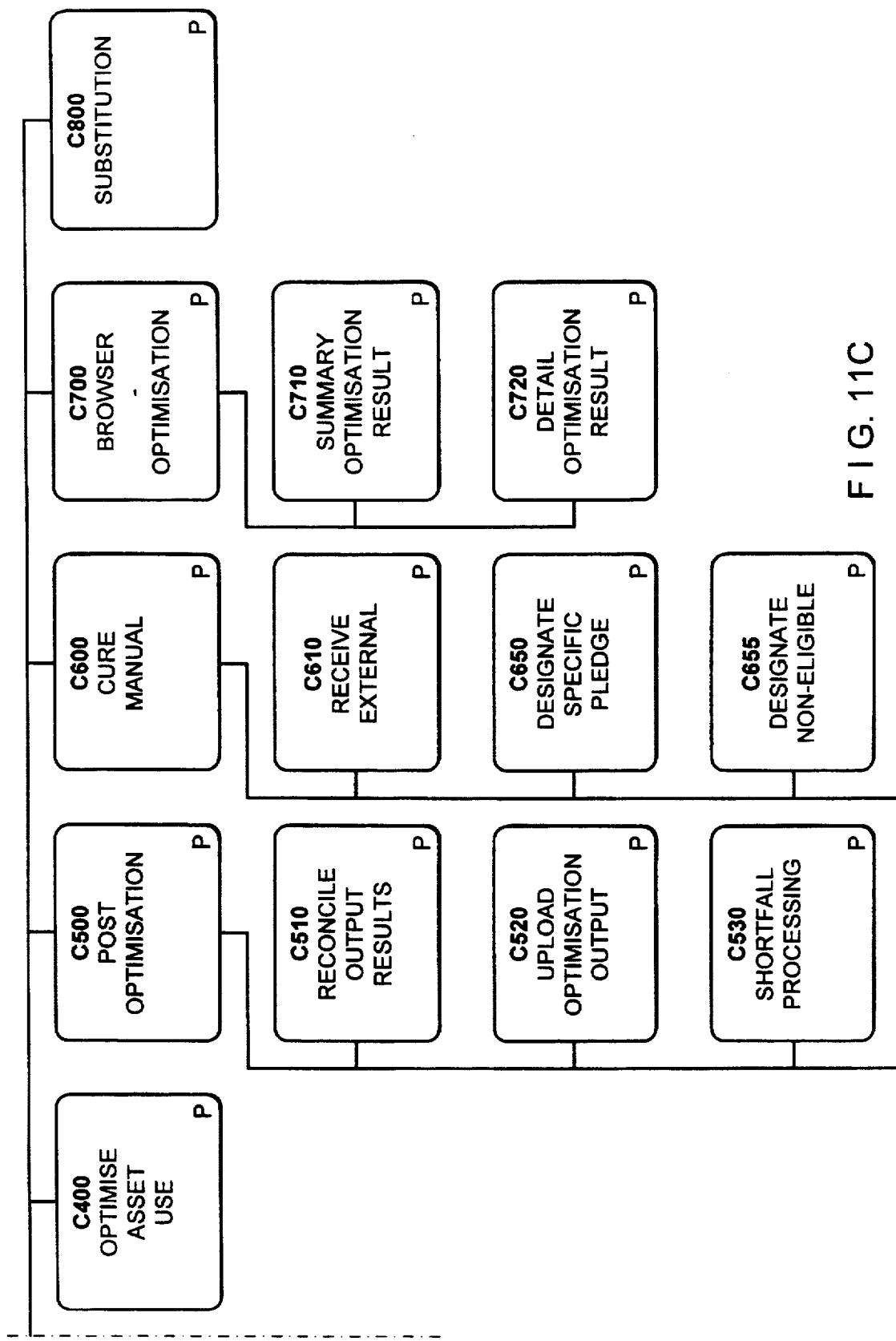
Figure 11D:
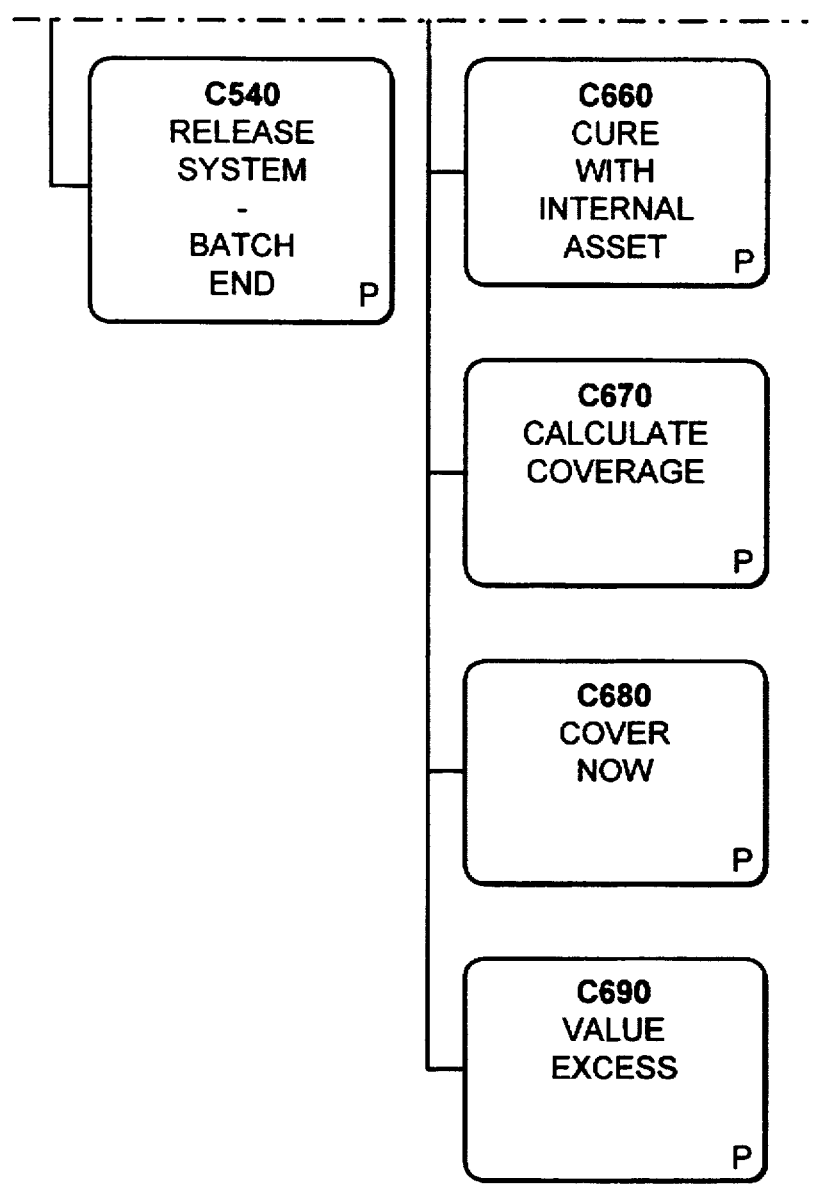
Figure 11E:
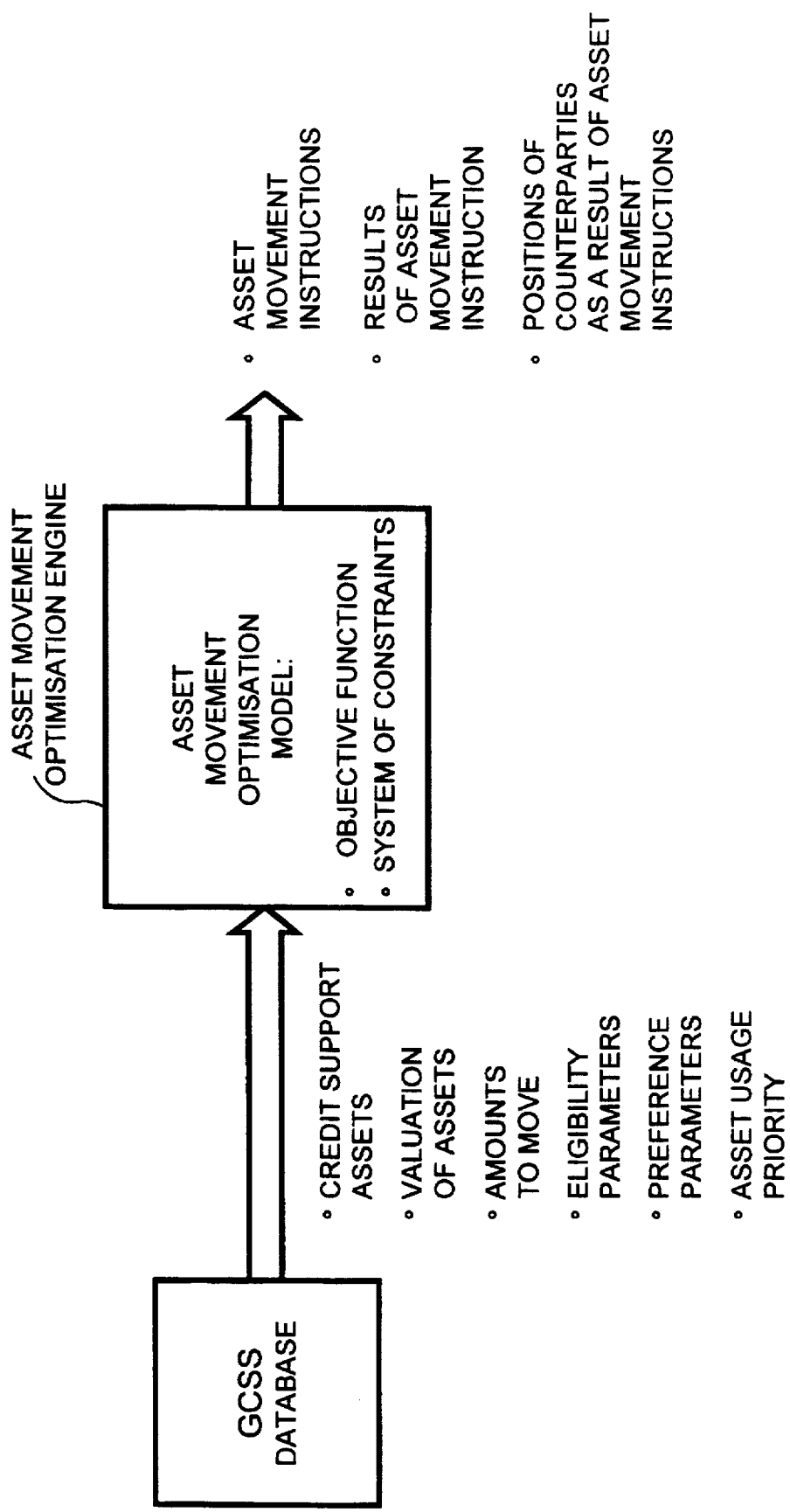
Figure 12A:
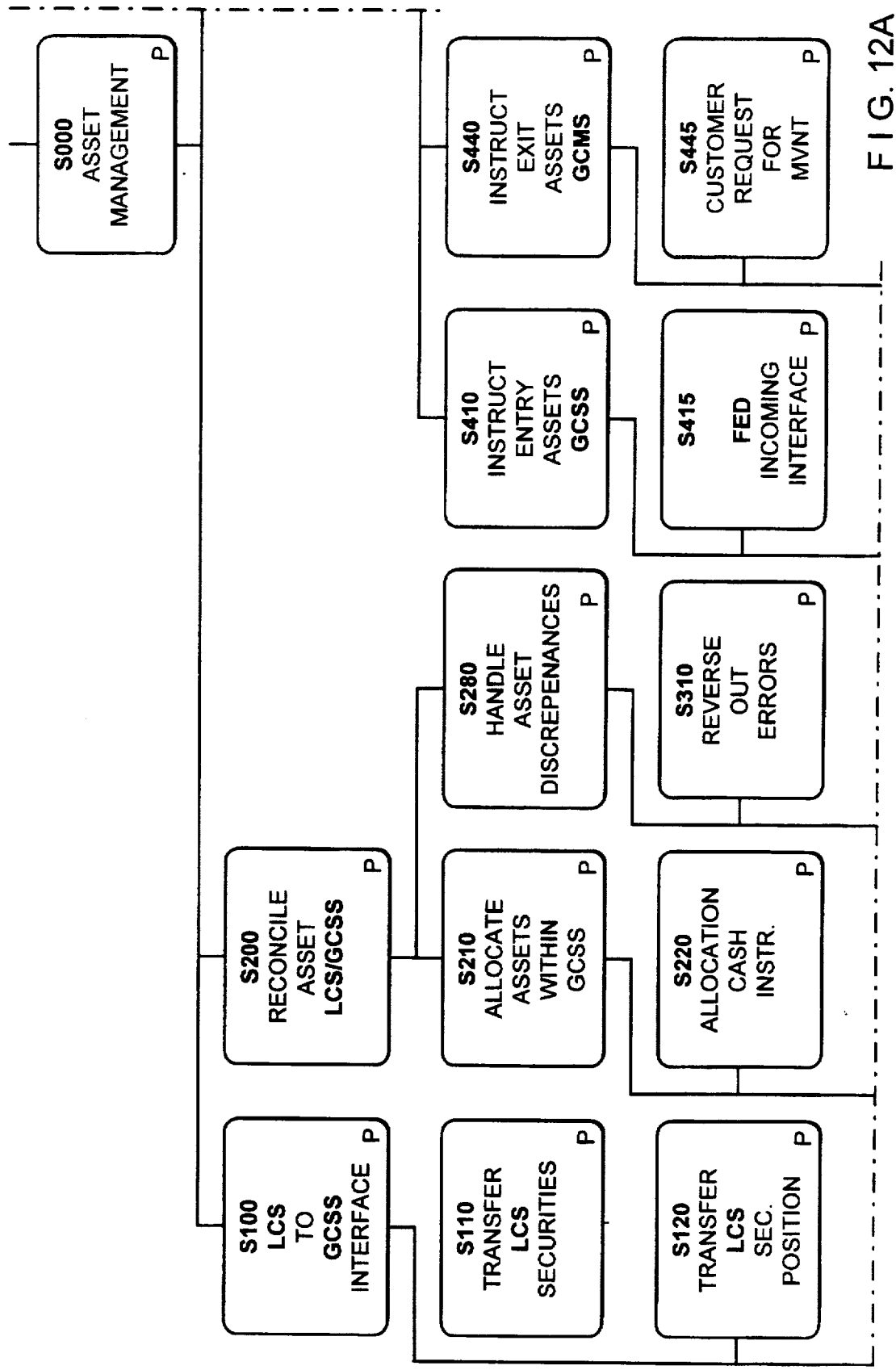
FIG. 12 is a schematic diagram illustrating the hierarchical arrangement among the various information subprocesses comprising the information process group entitled ASSET MANAGEMENT.
Figure 12B:
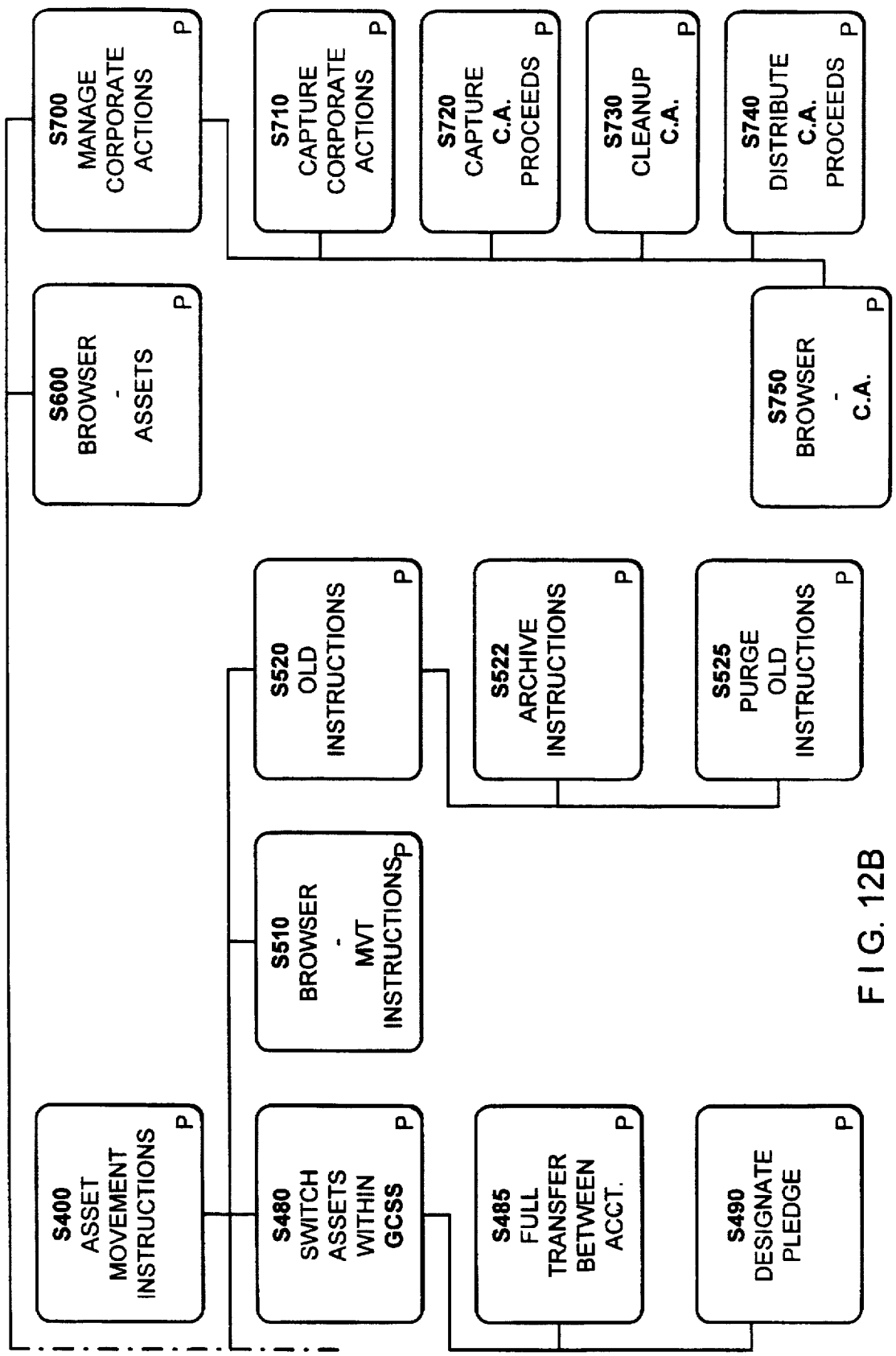
Figure 12C:
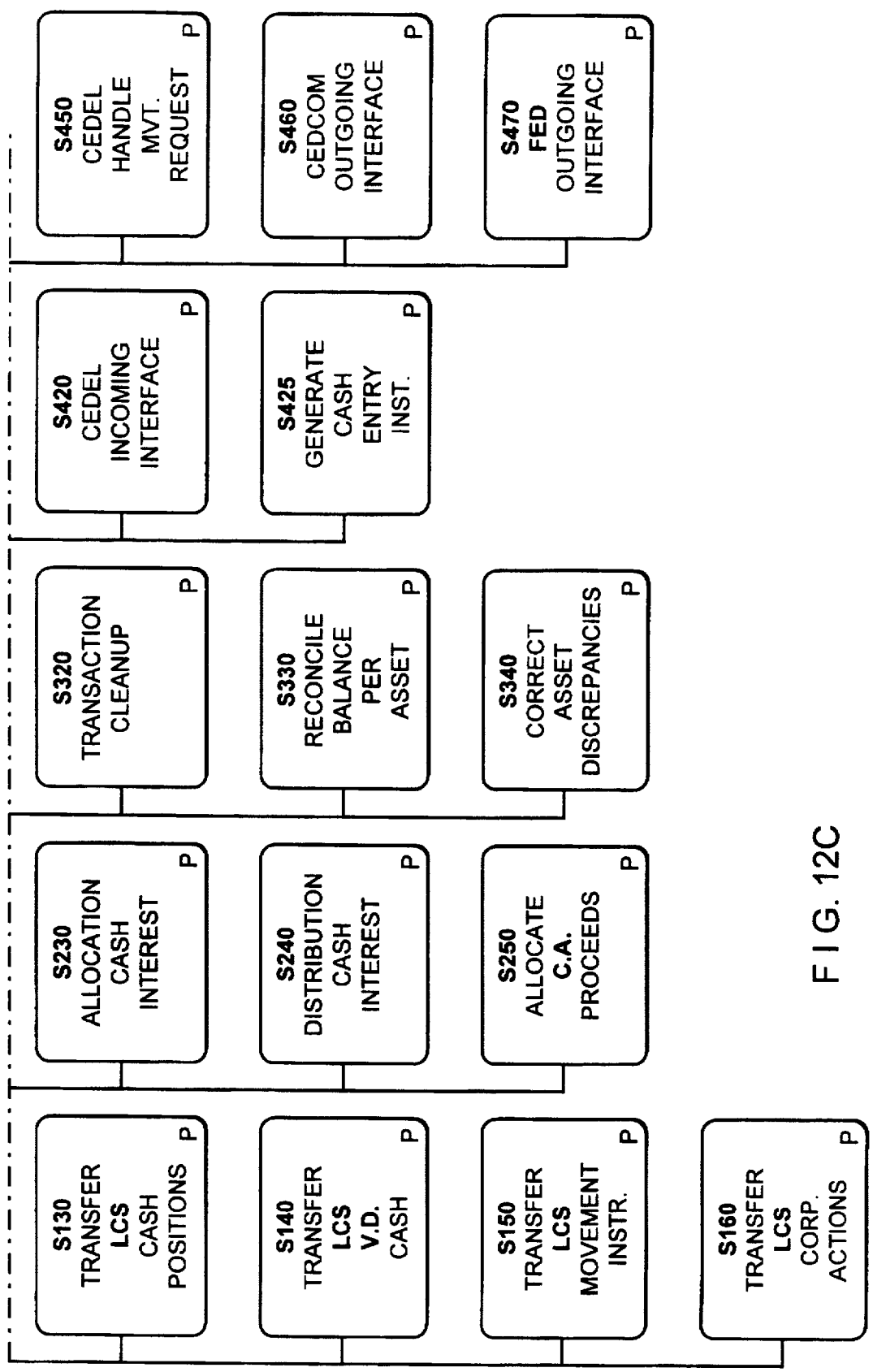

As indicated in FIG. 11C, using the difference-approach implementation of the Asset Movement Optimization Model, reduces the objective function to minimizing the shortfall asset deliveries and returns between all of the counterparties to all of the participating agreements, while satisfying the above-identified system of constraints.

As shown in FIG. 11A, during the problem solving stage of the Asset Movement Optimization Process, a computational engine is used to solve the matrices comprising the Asset Movement Optimization Model, and thus provide an optimal solution to the objective function while satisfying the system of constraints to the problem. The optimal solution obtained from the computational engine is expressed in vector form and represents the recommended set of Amounts to Move {ATM (k, i→j)} in order to satisfy the complex objective function and system of constraints of the Asset Movement Optimization Model of the GCSS, for a particular optimization cycle.

In the illustrative embodiment, the computational engine is realized by a computationally efficient "interior point" algorithm known as CPLEX, commercially available from the CPLEX Inc., of Incline Village, Nevada. The CPLEX algorithm uses the information contained within the matrix model of the Asset Movement Optimization Process illustrated in FIG. 11A. Operational details of the CPLEX algorithm can be found in the publication entitled "INTERIOR POINT METHOD FOR LINEAR PROGRAMMING: COMPUTATIONAL STATE OF THE ART" by L. J. LUSTIG, R. E. MARSTEN, AND F. D. SHANO published in ORSA Journal of Computing, Volume 8, 1994.

In order to carry out the problem solving stage of the Asset Movement Optimization Process is carried out by subprocess C400 entitled OPTIMIZE ASSET USE is executed in the GCSS. This subprocess is a server-based function which carries out the problem solving aspects of the Optimization Process. The Input to this subprocess is a flat file generated from subprocess C360; the Output thereof is a flat file containing the optimization results; and the Event/Trigger is provided sequentially after the completion of subprocess C360. In the preferred embodiment, this subprocess is be carried out in a batch manner by the CPLEX program running on a GCSS Optimization Server 3.

During the solution utilization stage of the process, the optimization output from the computational engine is interpreted by subprocess C500 entitled POST-OPTIMIZATION, in order to produce an output information set that can be (1) readily used by the GCSS to effect optimized movement of assets within the Omnibus Account, and (2) expressed in a format that is understandable to GCSS customers. Typically, the output information set comprises the following information items: asset movement (i.e., transfer) instructions; the results of executed asset movement instructions; and the positions of counterparties as a result of asset movement instructions.

Process C500 entitled POST OPTIMIZATION is collection of a server-based processes which, following optimization process, performs the following functions: checks the optimization results to ensure, for example, that all assets in equals are assets out; loads the results into the appropriate information structures of the GCSS database; resets the system to its On-Line mode of operation, rather than its Optimization mode; and if necessary, re-triggers the processing of outstanding asset movement instructions, credit exposures and the like. These subprocesses will be described below.

Subprocess C510 entitled RECONCILE OUTPUT RESULTS is a server-based function which checks the results produced from the Asset Movement Optimization Process. The Inputs to this subprocess is a flat file containing the optimization results (produced from subprocess C500); the Outputs thereof is a status flag (e.g., either—OK, Warning or FATAL ERROR); and the Event/Trigger is provided by the completion of subprocess C500. This process checks the output from the optimization process to ensure the output is correct. Check the data is correct (e.g., by ensuring that no securities are created, that securities in=securities out, that original allocation is consistent for each counterparty, and that all chains are complete). If this subprocess determines that the results are correct (i.e., acceptable by a predetermined measure of reliability), then the file is checked as such by way of a predetermined header record.

Subprocess C520 entitled UNLOAD OPTIMIZATION OUTPUT is a server-based function which unloads the optimization results into the GCSS database. The Inputs to this subprocess is a flat file containing the optimization results (produced by subprocess C500); the Output is the update of asset piece and credit exposure tables; and the Event/Trigger is provided by the completion of process C510.

Subprocess C530 entitled SHORTFALL PROCESSING is a server-based function which identifies coverage shortfalls and set flags in the GCSS database to indicate the same. There are no Inputs to this subprocess; the Output to the subprocess is an Update to Master Table; and the Event/Trigger is provided by the completion of process C520. This process examines coverage of exposures under all credit support agreements (i.e., after asset movement optimization) and sets an attribute on the Agreement Status (e.g., Covered or Shortfall). If there is a shortfall, then the subprocess indicates the size of the shortfall, and if the shortfall is a new shortfall, the process sets the date the new shortfall began. Using GCSS Asset Movement Results screens shown in FIGS. 15I and 15J, GCSS can easily identify credit support agreements which are not adequately covered, and be allowed to carry out any corrective action in connection therewith.

Subprocess C540 entitled RELEASE SYSTEM-BATCH END is a server-based function which releases the system into its on-line mode. The Input to this subprocess is MASTER information structure; the Output thereof is an update to this information structure to change it system status flag to on-line mode; and the Event/Trigger is provided by the completion of process C530 and/or GCSS Operator override. After the post optimization processing is completed, this subprocess returns the GCSS for on-line user access and then notify end users, either by way of a general notice board or some other messaging system. Thereafter, all security (i.e., asset) movement requests, credit exposures and manual pledges are possible.

Process C600 entitled CURE MANUAL is a screen-based function realized by GUI and a backend process on the GCSS server, which allows customers to identify shortfalls, and transfer assets to cover related obligations. In particular, this process allows a GCSS customer to perform the following functions: pledging assets if they exist in the customer's own GCSS account (assuming they are eligible); transferring assets out of the customer's own GCSS accounts; transferring assets from a Cedel (LES) account of the customer to its GCSS account in order to replenish the same; manually covering by way of the "cover my counterparties now" function provided by process C670; and applying for Substitution Requests.

Process C610 entitled RECEIVE EXTERNAL allows a customer to bring additional coverage (i.e., cash and U.S. treasuries) into his GCSS account, from sources outside the GCSS, whenever the GCSS account is short of sufficient assets to cover credit exposures.

Process C650 entitled DESIGNATE SPECIFIC PLEDGE is a process allows customers to specify a request that a specific security line be used to cover part (or all) of a specified exposure under a particular credit support agreement. This process, in addition to following the normal eligibility rules, requires the following information items as input: the agreement to be covered; the amount of exposure being covered (e.g., Basic Amount, Independent Amount, and computed credit exposure); the specific assets to be used to cover; the nominal amount of specified asset; and the date the specified assets must be returned to the GCSS account. Using this input, the process performs the following functions: calculates the value of specified assets, considering current asset price and haircut (i.e., if the asset is in a different currency that the exposure, then this figure must be converted to the exposure currency at the current market rate); sets the date the designation started; sets the timestamp; and sets the user identification of the user who made the asset designation request. Subject to any other constraints, the process then deems these specified assets as "frozen" for the specified credit exposure, by defining the date when the designation expires. After this date, the 'return assets' process is runs (prior to optimization) in order to close the designation and attempt to return the asset to the GCSS account. Notably, within the GCSS, a designation is just another type of transfer, except that it has been manually created by a customer, and has a lifespan specified by its Return Date.

Process C655 entitled DESIGNATE NON-ELIGIBLE allows customers to specifically request that a specific, normally non-eligible security line is used to cover part (or all) of a specified exposure under a particular credit support agreement. This process is special sub-option of the normal C650 Cure process with a designation feature. This process employs a mechanism similar to used in other processes of the GCSS, except that the designation provided by this process is NOT a full coverage designation, and therefore must be substituted with an eligible asset as soon as possible. Thus, until a suitable asset is in place, an asset designated by this process cannot switched.

Process C660 entitled CURE WITH INTERNAL ASSET allows a customer to directly transfer a specific security line to another GCSS customer in order to cure a credit exposure. This process is executed immediately in order to update the position of both sides and generates a ticket and asset movement chain in connection therewith. While th functionality provided by this process is very similar to that provided the designation process described above, it is different in that the coverage only applies for short predetermined time period (e.g., one day) which can be set automatically within the GCSS.

Process C670 entitled CALCULATE COVERAGE calculates the total assets required to cover the outstanding credit exposure under a credit support agreement. The operation of this process is as follows. The user select credit support agreements are to be considered and then highlighted. The process then selects which asset types could be used to cover the credit exposure of the selected credit support agreements, and then applies the haircuts for each agreement as per its haircuts, and calculates the amount to be brought in. The process considers available assets that have not yet been used and displays the results, including an indication of which exposures were not covered.

Process C680 entitled COVER NOW allows GCSS customers to request (i.e., instruct) the GCSS to directly cover a selected group of credit support agreements in which there exists a credit support shortfall. This process involves first selecting which agreements are to be covered by any set of agreements that have been manually selected by the GCSS user. Following the full eligibility rules, the process then automatically assigns identified assets in a manner which covers the exposures a manner that represents the best use of the available assets. Unlike the asset movement optimization process, this particular process does not attempt to optimize across the system.

Process 6C90 entitled EVALUATE EXCESS is a process which allows customers to evaluate the current value of surplus assets (i.e., assets not provided to counterparties to cover). This utilizes the original asset sales, assets pieces, security price, and FX rate. Process C700 entitled BROWSER-OPTIMIZATION is a screen-based process which allows customers to view their credit exposure, identify how effectively these exposures have been covered, and analyze which assets have been used to cover such credit exposures.

Process C710 entitled SUMMARY OPTIMIZATION RESULT is a screen-base process which allows customers to view the status of their exposures after asset movement optimization has occurred within the GCSS. This process employs a number of filtering functions which filter information by: all agreements; all agreements in a specified timezone; all agreements with shortfall (i.e., counterparty at fault); and all agreements with shortfall (i.e., principal at fault). The process also employs a number of sorting functions which sort information by: agreement number; counterparty; size of exposure; and size of shortfall. For each credit exposure selected, the GCSS will display: the details of agreements; the size of the exposure; and the size of shortfall. The size of the shortfall will be summed. However, overcoverage in one credit support agreement of a customer cannot be netted against a shortfall in another credit support agreement thereof.

Process C720 entitled DETAIL OPTIMIZATION RESULT is a screen-based process which allows customers to analyze the details of pledges used to resolve (i.e., cover) credit exposures. Notably, reports produced by this process considers manual cures as well as designation's inasmuch as these instructions are, in principal, part of the optimization results.

In the GCSS, the process of ASSET MANAGEMENT employs an array of subprocesses that are used to maintain records of assets within the GCSS, manage transactions and asset transfers therewithin, and perform other ancillary functions. The details of these subprocess, which underlie these basic system capabilities will be described below.

Process C800 entitled SUBSTITUTION is a GUI/server based process which allows customers to replace (i.e., substitute) one or more presently provided credit support assets (in GCSS accounts) with one or more replacement assets whose value must be equal to or exceed the value of the presently provided assets. While in the illustrative embodiment, substitution requests are counterparty-specific in that they must be mutually agreed upon within their credit support agreement, it is understood, however, that in alternative embodiments of the present invention, the GCSS can be adapted to allow non-counterparties to request specific substitution requests. In general, a counterparty must consent to a substitution request at all time other than optimized asset movement, where it is handled automatically. A counterparty in disagreement with the request for substitution may avoid it being handled automatically during the optimized asset movement mode, by freezing the asset in question (i.e., issuing an asset freeze instruction). In the illustrative embodiment, substitutions may be entered at any time, but will only be handled (i.e., executed) automatically on the day entered if the request was made prior to 10:00 a.m. in the U.S. processing cycle. For example, if the substitution request was entered with the GCSS before 10:00 a.m. NYC time, then the substitutes (i.e., party being asked to return the specified asset and accepted the substituted asset) can consent before 12:00 noon. At 12:00 noon, the remaining pending requests are provided as input to the Asset Movement Optimization Process. If the Asset Movement Optimization Process cannot satisfy the substitution request, then the substitutes can still consent in the afternoon. If the substitute does not consent by this time, then the pending request remains in the FIFO queue maintained by the GCSS Process Server 5 or 6, for input to the next Asset Movement Optimization Process. If, however, the substitute request is entered after 10:00 a.m., then it can be consented to in the afternoon, or put in the FIFO queue for processing the following day. A substitution request that is passed to the Asset Movement Optimization Process will generate the bilateral substitution requests down the length of the chain of asset transfer, to request the asset substitution. If the substitution requester cancels the substitution request, then Asset Movement Optimization Process will cancel all the substitution requests that were automatically generated.

In the illustrative embodiment, a substitution request will be partially filled wherever possible (i.e., a portion of the requested asset piece will be returned to the requester whenever possible, based on the premise that a partial asset return is better that no asset return at all). The substitution request will be adjusted to reflect the remaining amount and the requester may cancel the substitution request at any time prior to fulfillment (i.e., execution). Failed substitution requests will be put on a list of pending substitution requests which are handled on a first in, first out, basis. To improve the efficiency of the GCSS and increase the probability that requests for asset substitutions and returns will occur (i.e., be executed), the GCSS can be readily modified to have only one flag for asset reuse purposes (i.e., a Reuse Flag), instead of separate flags for rehypothocation and repo. In such an alternative embodiment, the reuse flag must be always be set to N (i.e., no) for charge agreements. Flags for transfer and UCC agreements will be set by the counterparties.

Subprocess S100 entitled LCS TO GCSS INTERFACE comprises, in fact, a group of processes which collectively function to transmit all necessary information from the LCS subsystem to the GCSS system, illustrated in FIG. 2. In as much as the GCSS has a need for information contained within the mainframe-based LCS system, this information transfer functionality is of great importance. Each of the subprocesses comprising the LCS TO GCSS INTERFACE, are deigned to perform the following functions:

(1) extract the information from the correctly determined spot within the LCS processing cycle;

(2) transmit the extracted information from LCS to the GCSS server in a secure manner; and (3) load up the extracted information into the GCSS database. In the illustrative embodiment, this information system interface is realized using CEDCOM, a high-speed data communication system developed and used by Cedel in its financial transaction management systems. Using the CEDCOM system, the GCSS can directly dial into the Cedel's LCS computer and obtain all of the necessary information required by the GCSS system, except for security data.

Subprocess S110 entitled TRANSFER LCS SECURITIES is a batch-type process (involving file transfer and GCSS database insertion) which effects twice daily, the transfer of the LCS securities information from the LCS system to the GCSS, as illustrated in FIGS. 1 and 2. The Input to this subprocess includes LCS security information as defined below; the Output thereof is updates to the GCSS database; and the Event/trigger is provided by the completion of LCS processing cycles. As input, this subprocess requires, per security, the following items of static security information from the LCS system: Common code; ISIN code; Domestic security code (Cusip for U.S. treasuries); Security description; Nominal currency; Maturity date; Flag indicating if security still active; Next coupon date; Security convertibility code; Delivery code; Depository code; Security rating code S&P; Security rating code Moody; Security rating code Mikuni; Security rating code Cedel; Minimum denomination size; Security price; and Price basis (actual or percentage). Additional attributes which are maintained by GCSS include a flag indicating if security has been used within GCSS Security type code (General Classification), and an internal investment grade of asset. This load operation will need to derive the internal investment grade of the bond. This can be done in bands of the industry codes. Preferably, the GCSS security-type code will be determined by analyzing the following items: security convertibility code; security description; nominal currency; delivery code; and depository This information will then be manually modified by GCSS Operations personnel to correct any problems or data exceptions.

Subprocess S120 entitled TRANSFER LCS SECURITY POSITION is realized as demon processes and mainframe processes which collectively transfer the securities position of the GCSS Omnibus Account from Cedel's LCS system 17 to the GCSS after each processing run. The Input to this subprocess is LCS Asset positions by Asset code (from LCS); the Output is updates to GCSS database table recording daily LCS omnibus asset positions by asset code; and the Event/Trigger is provided by the completion of CEDEL LCS processing runs. The GCSS system has a single account within the Cedel LCS system for all its assets. GCSS customers will transmit their movements into the LCS system via this single GCSS account. On behalf of its customers, GCSS instructs the LCS system to deliver assets out of this account to the customer. (This could be to either another Cedel account or out the system, typically by way of the FED system for U.S. treasuries.

After each settlement run, the subprocess determines the current balances for each security held in the GCSS Omnibus Account. These account balances are then be used to reconcile to the GCSS balance after applying the transfer instructions which are also downloaded from the LCS system. The information required after each settlement run is: the security common code; the nominal quantity of security; the Cedel price of security; and the valuation of the position. This information is held in the Account Portfolio Report supplied to customers twice daily. Once transferred, this information is stored in the GCSS original asset table, along with the date.

Subprocess S130 entitled TRANSFER LCS CASH POSITIONS is realized as demon processes and mainframe processes which transfer daily Omnibus Account Cash Positions from the LCS system to the GCSS. The Input to this subprocess is the LCS Cash Positions by currency; the Output is the updates to the GCSS database table which records daily LCS Omnibus Cash Balances by currency; and the Event/Trigger is the run commenced after completion of the LCS system processing runs. After each settlement run in the LCS system, the subprocess determines the current cash balance in the LCS Omnibus Account for each active currency. In many practical systems, only a limited number of currencies need to be used (e.g., USD, GBP, DEM, FRN and perhaps BEF). The information required after each settlement run is: the Currency Code (i.e., ISO) and the Cash Balance. This information is held in the Account Portfolio Report supplied to customers twice daily.

Subprocess S140 entitled TRANSFER LCS VALUE DATED CASH is realized as both UNIX processes (possibly demon) and mainframe processes, which transfer value-dated cash records from the LCS system to the GCSS. The Input to this subprocess is LCS value-dated cash records for an entire month the Output thereof is updates to the GCSS database for value-dated cash inputs from the LCS system; and the Event/Trigger is provided by the completion of the LCS month-end processing run. In the LCS system, interest processing is carried out once a month on cash balances, typically about the 10th of the month. The reason for this is that interest is paid on value dated funds since funds can only be confirmed a number of days after receipt. The GCSS Cash Balances will be treated as a normal Customer Account in the LCS system. Normally each currency is in credit. Therefore, the information required by this subprocess, for each currency, per day in the month, is: the Currency code; the day in month; the Cash Balance; the Interest Rate; and Amount of interest. Should it be easier, the information can also be reported as follows: credit balance; credit interest rate; credit amount of interest received. This information is held in the monthly Scale of Interest Report supplied to GCSS customers by way of a CEDCOM 2000 terminal associated with the CEDcom telecommunication system, shown in FIG. 2. The GCSS will upload this information and then distribute it to the appropriate GCSS account, while accounting to the daily GCSS Account Balances in each particular currency (see process S240).

Subprocess S150 entitled TRANSFER LCS MOVEMENT INSTRUCTIONS is realized as Demon processes and mainframe processes, which transfer all security and cash transactions from the LCS to the GCSS, as illustrated in FIG. 2. The Input to this subprocess is LCS Securities and Cash transactions; the Output thereof is the TIB messages, one for each Asset and Cash transaction; and the Event Trigger is provided by the completion of the LCS processing run. All movements into and out of the GCSS account will be carried out with normal Cedel instructions. The GCSS account is made up of many GCSS customer subaccounts. To identify these subaccounts, the wording record of the Cedel instruction to which the GCSS account refers, has a perforated definition. In the future embodiments, the Cedel message can be enriched with a beneficiary account which will make this operation more secure. For each transfer instruction. The subprocess requires the following information items: Instruction type; Customer instruction reference; Cedel instruction reference; Account 1 principal. (should always be GCSS omnibus account number); Account 2 (customer trading account if internal); Security code; Nominal amount; Cash currency; and Cash amount should only apply to cash (Security instructions should always be free of payment); Trade date; Requested execution date; Actual execution date; Value date; Instruction status; and Wording data. This information is held in the Processing Results Report supplied to GCSS customers twice daily. This report includes both instructions executed and those in suspense. This information will be loaded into the GCSS instruction table. From the wording record, the GCSS account will be extracted. If this cannot be done, the instruction must be set as 'AWAITING REPAIR'. These unallocated instructions will be allocated later using the TRANSACTION CLEANUP process.

Subprocess S160 entitled TRANSFER LCS CORPORATE ACTIONS is realized by demon and mainframe processes which transfers records of all Corporate actions from the LCS system to the GCSS that affects the LCS assets in the GCSS Omnibus Account. The Input to this subprocess is LCS Corporate action instructions; the Output is TIB messages (i.e., one for each Corporate action); and the Event/Trigger is provided by the completion of the nightly processing run in the LCS system. The function of this subprocess is to transfer anticipated corporate actions from the LCS system to the GCSS. Anticipated corporate action will initially be coupon payments and redemptions to be paid into the GCSS account. The IPAR report data for the GCSS account is provided from the LCS system. The information required by this subprocess, per anticipated payment, is: the Security code; the Type of payment; the Record date of payment; the Payment date; the Amount paid per Basis; Payment basis; Nominal amount on which payment will be made; Payment currency; Anticipated cash payment; and any comments. This information will be loaded into the CORPORATE ACTIONS information structure of the GCSS database.

Subprocess S200 entitled RECONCILIATION BETWEEN GCSS AND LCS is a server-based process which carries out reconciliation tasks between all GCSS and LCS transactions. This function is performed in a semi-automated manner, in that, when assets are out-of-balance, human interaction is called into action to analyze and correct the detected problems. In the illustrative embodiment of the GCSS, all instructions recorded for asset movements or corporate actions will be double-recorded in both the GCSS and in the LCS system. Some of those transactions will be first recorded in the GCSS with subsequent confirmation from the LCS system. For example, asset movements direct from the Federal Reserve Bank will be first recorded in the GCSS and subsequently confirmed by an instruction from the LCS system. Thus the notion of unconfirmed transactions must factor into the reconciliation function of this subprocess.

Process S210 entitled ALLOCATE ASSETS WITHIN GCSS comprises a group of processes which collectively allocate assets to the proper account within GCSS. In the illustrative embodiment of the present invention, there are four types of asset-related instructions that must be handled within GCSS, namely: Security Movement Instructions; Cash Movement Instructions; Monthly Interest Credits Instructions; and Corporate Actions Instructions (i.e., pertaining to Coupons and Redemptions).

Below the various subprocess that transfer these asset-related instructions and process the same will be described.

Subprocess S220 entitled ALLOCATE SECURITY INSTRUCTIONS is realized by TIB Demon process and an Updates Database, and functions to allocate (i.e., transfer) Security Movement Instructions from the LCS system to the proper GCSS account in the GCSS. The Input to this subprocess is an asset movement instruction encoded in the form of a TIB message; the Output thereof is Updates to the Security Positions and Asset Movement Instructions (both Allocated and Unallocated); and the Event/Trigger for this subprocess is the receipt of a TIB message. This subprocess receives the asset movement instruction encoded in the form of a TIB message, and then parses the asset movement instruction to determine if the proper information is contained in the instruction. It then attempts to Allocate this asset movement to the proper GCSS account for credit or debit. If the transaction is successfully allocated, the Customer Asset Position is updated to reflect the debit or credit. Also, a GCSS Asset Movement Instruction is created to record this transfer. If the transaction instruction is unable to be allocated, then it is marked as unallocated and stored in the TRANSACTIONS information field (i.e., table) in the GCSS database for later manual allocation. This subprocess is designed to handle the possibility of duplicate instructions from the LCS system, which can occur for cases where the transaction originates within the GCSS, but is processed by the LCS system (e.g., transfers from the GCSS out of the system). Also this situation can occur when the asset transfer is from the FRB because the GCSS system will receive notice directly from the SPEED system and then receive a duplicate instruction the following day from the LCS system.

Subprocess S240 entitled ALLOCATE CASH INSTRUCTIONS is also realized as a TIB demon process and an Updates Database, and functions to Allocate Cash Transfer Instructions from the LCS system to the proper account in the GCSS. The Input to this subprocess is an asset movement instruction encoded in the form of a TIB message; the Output thereof is Updates to the Cash Positions (i.e., Customer Asset Position) to the Asset Movement Instructions (both Allocated and Unallocated); and the Event/Trigger for this subprocess is the receipt of a TIB message. The Input to this subprocess is an asset movement instruction encoded in the form of a TIB message; the Output thereof is Updates to the Security Positions and Asset Movement Instructions (both Allocated and Unallocated); and the Event/Trigger for this subprocess is the receipt of a TIB message Notably, Cash is received only from the LCS system and not directly from the FRB or from any other cash correspondent bank.

Subprocess S240 entitled DISTRIBUTION OF CASH INTEREST is a semi-automated GUI process, which provides a means for reading and writing database records, allows GCSS operators to distribute the Cash interest received from the LCS system into the proper sub-accounts of GCSS which held the cash assets. The Input to this subprocess is value dated cash records of the Omnibus Account for an entire month, Historic cash balances within GCSS by currency and account; the Output is updated to the GCSS customer asset positions and transaction records; and the Event/Trigger is provided by the completion of the CEDEL month-end processing run. This subprocess reconciles the Omnibus daily cash balances reported in the LCS system with the GCSS account cash balances. The subprocess allocates the interest paid to the Omnibus Account across the various accounts that held cash on each particular day. Notably, unlike in the case with coupon payments, the interest is accrued to final pledgee and not to the original owner of the cash. Also, interest paid is not compounded within the month.

Subprocess S250 entitled ALLOCATE CORPORATE ACTIONS is a semi-automated function which allows the GCSS operator to reconcile and process the corporate action transaction received from the LCS system. The Input to this subprocess is a list of corporate actions; the Output thereof is updates to the database tables such as Corporate Actions Table which maintains a record of all corporate actions, Security Table which maintains a record of all Deletion of Security if redeemed fully; Security Positions Table which maintains a record of all Debits (and credits) of securities for redemptions and exchanges; Cash Positions Table which maintains a record of all Credits of cash to customer accounts for coupon and redemption proceeds, and Allocated Cash Table which maintains a record of all Transactions records for transactions above cash amounts; and the Event/Trigger is provided by the completion of LCS processing runs. This subprocess applies to many types of corporate actions that must be processed in the GCSS. For reconciliation purposes, there are two important corporate actions: coupon payments and redemptions. In order to process a coupon payment, a matching cash transfer instruction credits the Omnibus Account for the entire amount of the coupon payment. During execution, the subprocess determines the proper accounts to credit the prorated amount of the coupon payment. Then the subprocess determines who was the owner of record (original owner) of the collateral on the day of record, and thereafter allocates the coupon amount proportionally amongst the accounts owing that security on the date of record. In addition, this subprocess deletes the asset from the security position of each account and deletes the security from the security table. Notably, the processing a redemption in the GCSS is similar to the processing of a coupon in the sense that there is a proportional allocation of proceeds of both a coupon and a redemption amount, to the accounts of the asset holders.

Process S280 entitled HANDLE ASSET DISCREPANCIES comprises a group of related subprocesses which are used collectively by the GCSS for reconciling any asset discrepancies that may exist between the transactional records of the LCS and the GCSS, and processing the same in order to correct any detected problems. The subprocesses which support such functionalities will be described below.

Subprocess S320 entitled TRANSACTION CLEANUP is realized as a GUI process, a TIB Publisher and a Updated Database, and allows the customer to interactively process and clean-up unallocated or erroneous transactions. The Input to this subprocess involves the user browsing the Unallocated and Allocated transactions in the Asset Movement Instructions table stored; the Output thereof is the publication of messages on the TIB subject (e.g., Cash Movement Record, Erroneous Transactions, etc.); and the Event/Trigger of this subprocess is provided by the user interactively triggering the subprocess. The user of this subprocess, typically a GCSS Operations employee, is able to browse and sort the incoming transactions by status (allocated/unallocated) and other relevant parameters. User must manually determine the proper account for crediting unallocated transactions. Often this will require phone calls to the crediting party if the instruction failed to include the proper GCSS account number. The user may also need to work with allocated transactions in special circumstances.

Subprocess S310 entitled REVERSE OUT EFFORTS is realized as either a Demon TIB Consumer or a logical process within the Operations GUI, and provides a function for reversing out incorrect transactions in GCSS. The Input to this subprocess is the receipt of a TIB Message relating to an erroneous transaction; the Output of the subprocess, depending on the type of reversal owed, is either a CEDCOM message sent to the LCS system containing a transaction instruction and/or reversal of a specific transaction within GCSS effected by way of a modification to the GCSS database; and the Event/Trigger of this subprocess is provided by the receipt of T1B message or logical equivalent. During execution, this subprocess receive a message instructing the sequence of steps to be performed to correct the incorrect transaction, and thereafter executes these steps to correct the transaction.

Subsequence S340 entitled RECONCILE BALANCE PER ASSET is realized by Demon processes and mainframe processes, and allows customers to reconcile daily account balances between the GCSS and the LCS system on a per asset basis. The Input to this subprocess is LCS Asset positions, LCS Cash Balances, GCSS Asset Positions, GCSS Cash Positions, and Unconfirmed transactions; the Output thereof is a TIB message on Asset discrepancy Record; and the Event/Trigger is provided by the completion of the GCSS transfers and the asset allocations, but in theory can be executed at anytime. For each asset in GCSS, the subprocess reconciles the daily balance in the LCS system with the sum of the balances of the same asset in all of the GCSS accounts. In doing so, the subprocess takes into account the possibility that GCSS accounts will reflect unconfirmed transactions that are not yet reflected in the LCS account balance. In general, then, this subprocess performs a filtering function, processing all or a subset of the assets and flagging those which require manual attention. The repair of discrepancies is left to subprocess S310, described below.

Subprocess S310 entitled CORRECT ASSET DISCREPANCIES is a semi-automated GUI based-process which allows GCSS customers to correcting Asset Discrepancies. The Input to this subprocess is the receipt of a TIB message (i.e., Asset Discrepancy Record); the Output thereof, depending on the type of correction required, is either a CEDCOM message sent to the LCS system containing a transaction instruction, and/or a modification to the transactions and asset balances within the GCSS; and the Event/Trigger of the subprocess is the receipt of a TIB message or logical equivalent. During execution, this subprocess receives a set of assets for which the balance does not match between the LCS system and the GCSS. Then using the GUI provided by a GCSS workstation, this subprocess allows the GCSS operator to access asset-related information to uncover the source of the discrepancy. Such information includes: transactions on the specified asset; previous GCSS and LCS asset balances; and unallocated asset balances. Thereafter, the GCSS operator must determine the source of discrepancy and correct it by issuing a CEDCOM transaction or by modifying assets and transactions within the GCSS.

Process S400 entitled ASSET MOVEMENT INSTRUCTIONS comprises a group of processes which collectively provides the functionality of asset movement into, out of, and between accounts in the GCSS. Notably, this process does not allocate assets to particular accounts (except for inter-account transfers), but rather provides for the transfer of assets or asset-related instructions. The various subprocesses which support this functionality will be described below.

Subprocess S410 entitled INSTRUCT ASSET ENTRY (RECEIPT OF SECURITIES) provides for the asynchronous transfer of asset transfer instructions between the Federal Reserve Bank System (FRB) and the GCSS using the Citibank SPEED system interface. In the illustrative embodiment, an FRB interface has been selected as it enables GCSS customers to cure shortfalls with U.S. Treasuries more easily, and enable expeditious out-transfers from the GCSS for purposes of Repo (i.e., securities repurchasing). As there are two possible sources of Asset Transfer Instructions in the GCSS, and because information sent directly to and from the GCSS is purposely replicated in the LCS system, this subprocess duplicates transfer instructions sent from the LCS to and from the GCSS that have already been received directly to and from the SPEED system. This functionality accounts for this situation and employs the duplicate instruction transmission for confirmation that the instruction was accepted into the LCS system. Notably, both digital and manual interfaces may be realized between the Citibank SPEED system and the GCSS system, as both such mechanisms are interchangeable.

Subprocess S415a entitled FED INCOMING INTERFACE is a real-time Demon TIB Feed Handler which a provides a direct link to the Citibank SPEED system for purpose of allowing the GCSS system to receive security (i.e., asset) transfer instructions from the FRB. This subprocess also handles the transmission of delivery instructions described in the Asset Instruction Delivery process. The Input to this subprocess are SPEED protocol signals and information about the instruction transfer; the Output thereof is a TIB message containing the instruction details; and the Event/Trigger is provided by an asynchronous notification from the SPEED system. During execution, this subprocess receives asynchronously from the SPEED system, direct electronic input notifying the GCSS that the SPEED system has executed a new transaction for receipt of securities. Upon receipt of this SPEED message, the subprocess parses the contents of the underlying transaction, the reformats the contents into a TIB message format, and then sends the TIB message for later capture and allocation. This functionality is much like a digital data feed handler.

Subprocess S415b entitled FED INCOMING INTERFACE is a GUI screen-based function used by GCSS Operations Personnel to manually enter into the GCSS, information indicating that a new transaction has been executed in the Citibank SPEED system. The Input of this subprocess is manual input rekeyed from the screen of a Citibank SPEED terminal; the Output is a TIB message containing the details of the executed instruction; and the Event/Trigger is input produced by GCSS personnel observing (i.e., monitoring) the SPEED terminal. During its execution, this process receives manual input indicating that a new transaction has been executed in the SPEED system. In response thereto, the subprocess constructs a TIB message which, with the contents of that transaction, is sent to a GCSS server for later capture and allocation.

Process S440 entitled INSTRUCT ASSET EXIT enables the exiting (i.e., delivery) of assets from the GCSS system. All asset delivery (i.e., exit) instructions are issued by GCSS customers (except for the case of transaction reversal, which is initiated by GCSS Operations personnel in the handling of asset discrepancies between the LCS system and the GCSS). During INSTRUCT ASSET EXIT process, a GCSS user issues a transfer instruction to the GCSS in a two step process. First, using the GCSS customer workstation, he or she requests that the GCSS creates an asset exit instruction relating to a certain quantity of a specified security. The GCSS validates this request and constructs the default delivery instruction for that security. The user then views this instruction and is given the opportunity to modify it before committing it to execution in the system. After instruction approval, the asset delivery instruction is asynchronously and instantaneously transmitted to the specified external system (e.g., the FRB) in order to enable a particular transaction (e.g., Repo). The subprocesses used to carry out this system functionality are described below.

Subprocess S445 entitled CUSTOMER REQUEST FOR MOVEMENT is a GUI process used by Customer to enabling him or her to request the transfer of assets out of their GCSS Account and into an LCS account or a specified entity disposed outside the GCSS system. The Input to this subprocess is user input such as a Detailed Movement Request including the user's name, the asset to be moved, the quantity of asset, and default delivery instructions pertaining to the asset; the Output thereof is a Movement Request including the user's name, the type of asset to be moved, and the quantity of asset, and an Approved Movement Instruction including the user's name, the type of asset to be moved, and the quantity of asset, and default delivery instructions; and the Event/Trigger of this subprocess is provided by User initiated input. During execution, this subprocess is initiated by the user making a request that a specific quantity of a specific security be transferred out of the GCSS. This results in a message being sent to the GCSS Customer Instruction Process server, which interprets and validates the customer's request and uses the default delivery instructions for that security to construct a detailed Transfer Instruction Form for display to the user. If the request to transfer the securities is deemed invalid by the subprocess, then an error message is displayed to the user. In a typical application, a variety of reasons could cause transfer requests to be invalidated, namely: the user does not own (enough of) the requested security to be transferred; the request is made during Asset Movement Optimization (i.e., when all assets are frozen); the asset is pledged as credit support to a counterparty; the asset was received as a pledge from a counterparty who set the repo (i.e., re-use) flag to false; or the user does not have permission (i.e., authorization) to transfer from the specified account. If the transfer deemed valid by the subprocess, then the detailed Transfer Instruction Form is displayed for the user to approve or modify before transmission. A user can edit the delivery instructions, modify the amount, change the security type etc. Once the user is satisfied with the transfer request, it is again sent to the GCSS Customer Instruction Processing Server for execution. The request may be rejected (if the security type or amount was changed). Otherwise, the request is processed and a confirmation message is displayed to the user when the transfer is completed and acknowledged.

Subprocess S450 entitled CEDEL HANDLE MOVEMENT REQUEST is a server-based process which also interacts with TIB processes and the GCSS database in order to process a customer instruction for transfer of assets from GCSS. The Input to this subprocess comprises: a Request for Movement containing the user's name, the type of asset to be moved, and the quantity of asset; an Approved Request for Movement containing the user's name, the type of asset to be moved, the quantity of asset, and default delivery instructions; Security Master Table; User Account Default Delivery Instructions; User Account Securities positions; Credit Support Movements; and System Optimization Flag. The Output of this subprocess comprises: an Approved Movement Request (from manager process) containing the user's name, the type of asset to be moved, the quantity of asset, and default delivery instructions; Updates to Security Position and Transaction Log; and TIB messages pertaining, for example, to the Delivery of Assets to FRB and Delivery of Assets from LCS. The Event/Trigger of this subprocess is the Receipt of Movement Request from the user. During execution, this server-based (sub)process receives a message from the user requesting transfer of a specific quantity of a specific security. The server checks the validity of the request and if invalid signals an error to the user. In a typical application, a variety of reasons could cause transfer request to be invalidated, namely: the user does not own (enough of) the requested security to be transferred; the request is made during system optimization (i.e., when all assets are frozen); the asset is provided as credit support to a counterparty; the asset was received as a transfer from a counterparty who set the repo flag to false; or the user does not have permission (i.e., authorization) to transfer from the specified account. If the request is valid, then the server process constructs a detailed Asset Transfer Instruction Form using the default delivery instructions for the security. This asset Transfer Instruction Form is then transmitted back to the user. This server-based process then waits for receipt of an Approved Asset Transfer Instruction Form from the process user. When it receives this approved form, it again validates the Transfer because the user may have changed the quantity of security code. If the transfer is deemed valid, then the GCSS Process Server 5 transmits that instruction to the FRB Outgoing Interface by way of either the TIB subject GCSS.DELIVER.ASSET.FRB, or the LCS CEDCOM Outgoing Interface by way of the TIB subject GCSS.DELIVER.ASSET.LCS. When confirmation of transfer Instruction is received, then the server-based subprocess debits the security balances in the user's GCSS account and records the transaction in a transaction log.

Subprocess S470 entitled Outgoing Interface is a real-time TIB Feed Handler which, as shown in FIG. 2, provides a direct link to the Citibank SPEED system 20 for purposes of instructing the delivery of security and cash assets from the GCSS system to the FRB 25. This is the same physical process as the one employed in the Instruct Asset Entry process. The Input to this subprocess is a TIB message which contains the delivery instructions; the Output is SPEED protocol signals and information about the asset transfer instruction; and the Event/Trigger is provided by asynchronous receipt of the TIB message. During execution, this subprocess receives a TIB message which contains the instruction details for a transfer of assets from the Citibank account to the FRB wire. This subprocess reformats the information into a format suitable for the SPEED system and sends the message. A confirmation message is then passed back to the GCSS Customer Instruction Processing server.

Subprocess S460 entitled CEDCOM OUTGOING INTERFACE is real-time TIB Feed Handler which, as shown in FIG. 2, provides a link between the LCS system and the GCSS for purposes of instructing the delivery of security and cash assets from the GCSS Omnibus Account in the LCS system to outside of the GCSS. This subprocess creates the instructions necessary to cause the transfer of asset from the GCSS Omnibus Account in the LCS system, out of the system. The Input to this subprocess is TIB messages, e.g., GDSS.DELIVER.ASSET.FRB and GDSS.DELIVER.ASSET.LCS; the Output thereof is a TIB message; and the Event/Trigger for this subprocess is provided by asynchronous receipt of the TIB message. During execution, this subprocess receives a TIB message on subject GDSS.DELIVER.ASSET.LCS, which contains the instruction details for a transfer of assets from the GCSS Omnibus Account out of the system. When the subprocess receives a TIB message on subject GDSS.DELIVER.ASSET.FRB, then it the generates the instructions to the LCS system which record that the transfer was made independently by way of the FRB outgoing interface. The purpose of this operation is to record the delivery so that the LCS account is updated. This process may issue its transfer instructions to the LCS system in one of several possible ways, including, for example: by an information screen which a GCSS Operator uses to access information for rekeying (i.e., reentry) into a CEDCOM terminal; by a process that prints out a valid LCS transaction instruction for manual input to the LCS; or by an electronic communications link (possibly with CEDCOM) 22 that directly reformats the instruction for transmission to the LCS system. Using subprocess S460, a customer is enabled to exit an asset from the GCSS in three different ways: (1) over a real-time telecommunication link (e.g., Fedwire/SPEED); (2) to a LCS account; and (3) to a regular external domestic account by a link fully controlled and recorded by the LCS system, or GCSS operator.

Process S480 entitled TRANSFER (i.e., SWITCH) ASSETS BETWEEN ACCOUNTS comprises a collection of subprocesses which allow a GCSS customer to transfer assets between accounts in the GCSS. This process involves two steps: the customer first requests an asset transfer and then the GCSS handles (processes) the asset transfer request.

While this process does not include the facility for "standing instructions", it can be used as a processing server to another process which accepts and monitors conditions to trigger standing instructions. The subprocesses carrying out this process will be described below.

Subprocess S482 entitled CUSTOMER REQUEST FOR TRANSFER is a GUI process which enables a GCSS customer to request that assets be transferred between GCSS accounts in the LCS system of the illustrative embodiment. Input to this subprocess is User Input including the User's Name, the Account Number, the Asset Code, the Quantity of Asset to be transferred, and the Account Number to be credited for the transfer; the Output thereof is an Account Transfer Request including the User's Name, the Account Number, the Asset Code, the Quantity of Asset to be transferred, and the Account Number to be credited for the transfer; and the Event/Trigger is provided by user initiation. During execution, this subprocess provides a GUI facility which a customer uses to request a transfer of assets between GCSS accounts in the LCS system of the GCSS. This subprocess is initiated by the user making a request that a specific quantity of a specific security be transferred between two GCSS accounts. In the illustrative embodiment, user need only have permission on one of two accounts (i.e., the one debited). A transfer request by the customer results in a message being sent to the GCSS Process server 5. This server-based subprocess interprets and validates the customer's request, constructs a detailed set of transfer instructions, which are then transmitted back to the user. Of course, if the request to transfer the securities is invalid, an error message is returned to the user. A variety of reasons could cause a transfer request to be invalid including: the Customer Account does not own (enough of) the requested security to be transferred; the particular asset requested to be transferred is frozen or pledged as credit support to another GCSS account; or the particular asset is received by the Customer Account as credit support; the request is made during the Asset Movement Optimization Process (when all assets are frozen); or the customer (i.e., user) does not have permission to transfer the specified asset between the specific account(s). Assuming the request to transfer is validated by the subprocess, then a detailed Transfer Instruction Form is displayed for the user to approve or modify. A user can edit the Transfer Instruction Form to modify the amount, change the security type, etc. Once the user is satisfied with the transfer request, it is again sent to the GCSS Process server for execution. Once again, the asset transfer request may be rejected (i.e., if the security type or amount was changed). Otherwise, the asset transfer request is processed and a confirmation message is displayed on the user's GUI display screen when the transfer is completed by the GCSS Process server.

Subprocess S487 entitled HANDLE ASSET TRANSFER REQUEST is a server-based subprocess which interacts with the GCSS Database in order to process Asset Transfer Instructions made by GCSS customers using subprocess S482, described above. The Input to this subprocess are: an Account Transfer Request which includes the User's Name, the Account Number, the Asset Code, the Quantity of Asset to be transferred, and the Account Number to be credited for the transfer; the User Permission Table; the Account Allocated Transaction (log); the User Account Securities positions; Credit Support Movements (Pledges); and Miscellaneous User Account Status Flags (e.g., Frozen). The Output thereof comprises the following information items: a Proposed Account Transfer (to user) including the User's Name, the Account Number, the Asset Code, the Quantity of Asset to be transferred, and the Account Number to be credited for the transfer; Updates to Security Positions and Account Transaction Log; and TIB messages announcing the execution of the transfer. The Event/Trigger is provided by receipt of a User Transfer Request. This process receives a message from the User requesting transfer of a specific quantity of a specific security between two user accounts. The processserver checks the validity of the request, and if invalid, signals an error to the user. A variety of reasons could cause transfer requests to be invalid, including: the Customer Account does not own (enough of) the requested security to be transferred; the particular asset is frozen or provided as credit support to another account; the particular asset is received by the Customer Account as credit support; the request is made during the Asset Movement Optimization Mode (i.e., when all assets are frozen); the user does not have permission to transfer the specified assets between the specific account(s). If the request is valid, then the server process constructs a detailed Asset Transfer Instruction Form which is then transmitted back to the user. This server process then waits for receipt of an Approved Asset Transfer Instruction Form from the user process. When it receives this approved form, it again validates the Transfer because the user may have changed the quantity or security code. If the Transfer is deemed valid, the Customer Instruction Processing server then creates the dual-entries debiting and crediting the specific accounts. When finished, the server process publishes a TIB message alerting other processes to the fact that the transfer has occurred.

Process S490 entitled DESIGNATE SPECIFIC PLEDGE comprises a pair of subprocesses which enables a customer (i.e., user) to provide a specific Asset(s) to be provided to a specific counterparty as collateral to cover a specific credit exposure (i.e., credit support amount) under a particular credit exposure agreement. The subprocesses enabling this functionality will be described below.

Subprocess S495 entitled CUSTOMER DESIGNATE PLEDGE is a GUI-based subprocess which enables a Customer to designate, by instruction, a specific Asset to be provided to a specific counterparty to cover a credit support amount under a particular credit exposure agreement. The Inputs to this subprocess is User Input comprises the following information items: a Proposed Transfer(s) including Asset(s) to be transferred; the Amount or "enough to cover" flag; the Credit Support Agreement(s); a Flag to indicate whether a substitution is requested; and a Flag to indicate whether a mini-optimization is to be performed. The Output of the subprocess comprises a Request (i.e., instruction) for transfer and an Approved Specific transfer having the same structural details as specified above. The Event/Trigger is provided by User initiation. This subprocess is initiated by the user inputing a request that a transfer be made for a specific security toward a specific credit support agreement. The input pledge request results in a message being sent to the GCSS Process server 5. This server process interprets and validates the customers request, computes the credit support amount for the transfer, and transmits the proposed pledge back to the user for approval. If the request to transfer the securities is invalid, the an error message is returned to the user. A variety of reasons can cause transfer request to be invalidated, including, for example: the Customer Account does not own (enough of) the requested security to be provided; the particular asset is provided as credit support to another account; the particular asset in the Customer Account is the result of a credit support movement but is not reusable; the request is made during the Asset Movement Optimization Mode (i.e., when all assets are frozen); or the user does not have permission to designate transfers from the specific account(s). If the transfer is valid, then a detailed Transfer Designation Form is displayed for the user to approve or modify before it is sent to the Customer Instruction Processing server for execution. A user can edit the transfer to modify the amount, change the security type, etc. Once the user is satisfied with the transfer, it is sent to the GCSS Process server 5 for execution. Once again, the request may be rejected (i.e., if the security type or amount has been changed). Otherwise, the request is processed and a confirmation message is displayed when the pledge is completed by the GCSS Process server 5.

Subprocess S496 entitled PROCESS PLEDGE DESIGNATION is a server-based subprocess which interacts with the GCSS Database and processes customer instructions (i.e., requests) in order to provide (i.e., transfer) designated assets to specific counterparty as collateral to cover a credit support amount under a specific credit exposure agreement. The Input to this subprocess comprises: a Transfer Request (i.e., instruction) including the User's Name, the Account Number, the Asset Code, and the Quantity or "Enough to Cover"; the Credit Support Agreement; a Substitution Flag; a Mini-Optimization flag; the User Permission Table; the Credit Support Agreements; the Counterparty Eligible Collateral; the Counterparty Haircut Table; the Credit Support Movements (Pledges); the Security Positions; the Allocated Transactions; and Miscellaneous User Account Status Flags (e.g., Frozen). The Output to this subprocess comprises: the Proposed Transfer (to User) including the User's Name, the Account Number, the Asset Code, the Quantity of asset pledged, the Credit Support Agreement for pledge, Substitution Flag, Mini-Optimization flag, Computed Credit Support Amount, Remaining Shortfall, and Securities Returned; Updates to Security Positions and Account Transaction Log; Updates to Credit Support Movements (possible multiple if chains broken); and TIB messages announcing the execution of the transfer. The Event/Trigger of this subprocess is provided by the Receipt of a Transfer (i.e., Pledge) Request.

During execution, this subprocess receives a message from the User requesting the transfer of a specific quantity of a specific security under a specific credit support agreement. The process server checks the validity of the request, and if invalid, signals an error to the user. A variety of reasons could cause transfer requests to be invalid, including for example: the Customer Account does not own (enough of) the requested security to be transferred; the particular asset is transferred as credit support to another account; the particular asset in the Customer Account is the result of a credit support movement but is not-rehypothocatable; the request is made during the Asset Movement Optimization mode (i.e., when all assets are frozen); or the user does not have permission to designate transfers from the specified account(s). If the request is valid, then the server process constructs a detailed Transfer Designation Form which is then transmitted back to the user. This includes the calculation of the credit support amount, and the nominal transfer amount, if the request is for "enough to cover". This serve process then waits for receipt of an approved Pledge Designation Form from the user subprocess. When it receives this approved form, the server process again validates the transfer because the user may have changed the quantity or security code. If the Pledge is deemed valid, then the GCSS Instruction Processing Server updates the Credit Support Movement tables to reflect the new transfer and modifies the Security positions of both source and destination accounts. When finished, the server subprocess publishes a TIB message alerting other processes to the fact that the transfer has occurred. If a transfer request requires a substitution and the recipient of the transfer does not have enough of the requested collateral available to return, then the server subprocess must attempt to unwind the asset movement chain that is based on the asset which is requested to be returned. It is possible that the chain may not be able to be unwound for a variety of reasons including, for example: the asset has been transferred out of the system (for repo or other reason); the replacement asset is not be eligible to the entire chain; or one link in the asset movement chain is frozen. Notably, in the event that a substitution cannot be made, then the server process requests the return of securities from a particular account that guarantees a return within a specified time or the counterparty pays some penalty. The unwinding of the asset movement chain and those computations can be accomplished by way of a set of recursive method calls.

METHOD OF USING THE GCSS OF THE PRESENT INVENTION

1. Opening A Customer Account Within The GCSS

Each GCSS member shall have at least one account within the GCSS as part of the GCSS Omnibus Account within the LCS system. GCSS customers may elect to have multiple accounts within GCSS to reflect their organizational hierarchy and may create their own hierarchy of accounts. In addition to a GCSS account, GCSS members may elect to have a LCS account with the LCS system. While GCSS members are not required to have an LCS account, they would benefit from an LCS account because such an account shall make repo easier.

The GCSS automatically issues account numbers as the accounts are opened with the system. GCSS operations personnel shall issue, modify, and manage all customer supervisory user logins. Customer supervisory personnel shall have the capability of: adding new users; assigning and changing user passwords for users in their accounts; deleting users; and assign and modify access privileges.

In the GCSS, each GCSS account is treated as a unique GCSS customer and can have its own GCSS Operating Agreement and account hierarchy. However, customers may elect to have multiple accounts in a hierarchy under a single "master" account. To illustrate the flexibility of the account structure in the GCSS, customers may elect to have multiple "master" accounts each with its own hierarchy under a single GCSS Operating Agreement.

General customer details are stored in the GCSS database once a party has opened an account with the GCSS. Such customer details include, but are not limited to, the customer name, address, telephone number, GCSS customer number, GCSS account number, billing information, and communication information. In the illustrative embodiment of the GCSS, all GCSS accounts are held and managed by a common fiduciare, and thus the customer is required to provide the GCSS Operator with power-of-attorney so that the GCSS can legally move assets unilaterally between parties.

All GCSS accounts are protected through a user-based access/entitlement security mechanism. Access rights are set by a "superuser" (GCSS administrator) assigned by the customer and verified within GCSS operations personnel. Those persons with customer "superuser privileges" have the ability to create new users within their organization and set user entitlements. Only GCSS users, authorized by GCSS administrators, have the ability to create and modify agreements, enter credit exposures, add, modify and delete eligible assets, and setup new users under a GCSS account.

Customers may transfer securities into and out of their LCS account independently of their GCSS account. Thus, in the illustrative embodiment, GCSS customers must issue an instruction either within GCSS or within the LCS system in order to move assets between these two information storage and retrieval systems. As illustrated in FIG. 2, a GCSS customer uses the CEDCOM 2000 shown in FIG. 2, to issue instructions to the LCS system to move securities between their LCS account and their GCSS account. Customers may elect to move USD and/or U.S. treasuries between the GCSS and their U.S. Federal Reserve account via the Fedwire using SPEED system, illustrated in FIG. 2.

All GCSS accounts are protected through a user-based access/entitlement security mechanism. Access rights are set by a "superuser" (GCSS administrator) assigned by the customer and verified within GCSS operations personnel. Those persons with customer superuser privileges have the ability to create new users within their organization and set user entitlements. Only GCSS users, authorized by GCSS administrators, have the ability to create and modify agreements, enter credit exposures, add, modify and delete eligible assets, and setup new users under a GCSS account.

On an ongoing basis, the GCSS maintains records of the interests that GCSS customers have in the assets held within the GCSS, and customers are able to access records relating to these assets by way of the GCSS communications system.

2. Creating A Credit Support Agreement Within The GCSS

The GCSS of the illustrative embodiment requires all users to login into the GCSS via a login window created at the GUI of either a GCSS Customer Workstation or other terminal within the GCSS. The login window is displayed whenever a GCSS client-based process is started. Typically, access to GCSS is through a GCSS Customer Workstation, except in cases of direct database manipulation by a GCSS Database Server.

Terms of the different credit support agreements are captured for each GCSS customer. A pair of customers will generally have one agreement in place, although GCSS can provide for multiple agreements corresponding to different product lines. Each agreement is assigned a unique agreement number and defines: the Counterparty; Agreement Date; eligible Securities; Valuation Percentages (i.e., Haircuts); Re-use authorization (i.e., rehypothocation, etc.); frequency of exposure entry (e.g., daily, weekly, or monthly); Frequency of securities valuation (e.g., daily, weekly, or monthly); Thresholds; Minimum Transfer Amounts; Independent amounts; Permissible delay to cover (e.g., 0=same day, 1,2); Holiday convention; and "One-way" or "two-way" credit support provision. GCSS will track credit support timing and report on the satisfaction of cover requirements by the counterparty.

Eligible securities may be selected from any of the cash instruments or securities accepted by the GCSS Operator. As indicated by its corresponding information structure, the eligibility table of the illustrative embodiment lists: Security types (e.g., bonds, equities, notes, etc.); Currencies; Credit rating; Issuer (e.g. Government vs. Corporate vs. Supranational); and Haircuts applicable to each asset category. Customers may also establish counterparty-specific eligibility tables, to either restrict or broaden their eligibility criteria and/or haircuts in their dealings with specific counterparties.

During the credit support agreement formation process, GCSS customers establish a preference table, similar in appearance in their eligibility tables, in order to indicate in rank order which assets they would prefer to deliver when an asset delivery is necessary to cover, and which assets they would prefer to receive in an asset return situation when overcollateralization has occurred.

At any time, except optimization, GCSS customers can retrieve, clone, approve, and terminate the same credit support agreement. GCSS customers have the ability to set holiday calendars, set rounding specifications, set outgoing preferences, set netting specifications, and set the asset movement. The GCSS automatically issues agreement version numbers if an agreement field is changed by a user, and store versions of agreements and provide mechanisms for tracking and retrieving the same.

Once the party modifying the agreement has pressed the <Send> button on the GUI of a GCSS Customer Workstation, the system automatically notifies the appropriate counterparty of a change to an agreement. The system shall not allow a version of an agreement to become effective until both parties have approved that version. Only one version of an agreement can be effective at a time. The GCSS shall permit either party to unilaterally terminate an agreement. Upon termination of a credit support agreement, the system automatically freezes all assets associated with that agreement.

3. Managing Credit Support Assets Among Parties To Credit Support Agreements Within The GCSS Referring now to FIGS. 13A to FIG. 14B, the method of collateralization support process of the present invention will now be described from a GCSS customer point of view.

Selection of GCSS Processing Cycle

Figure 13A:
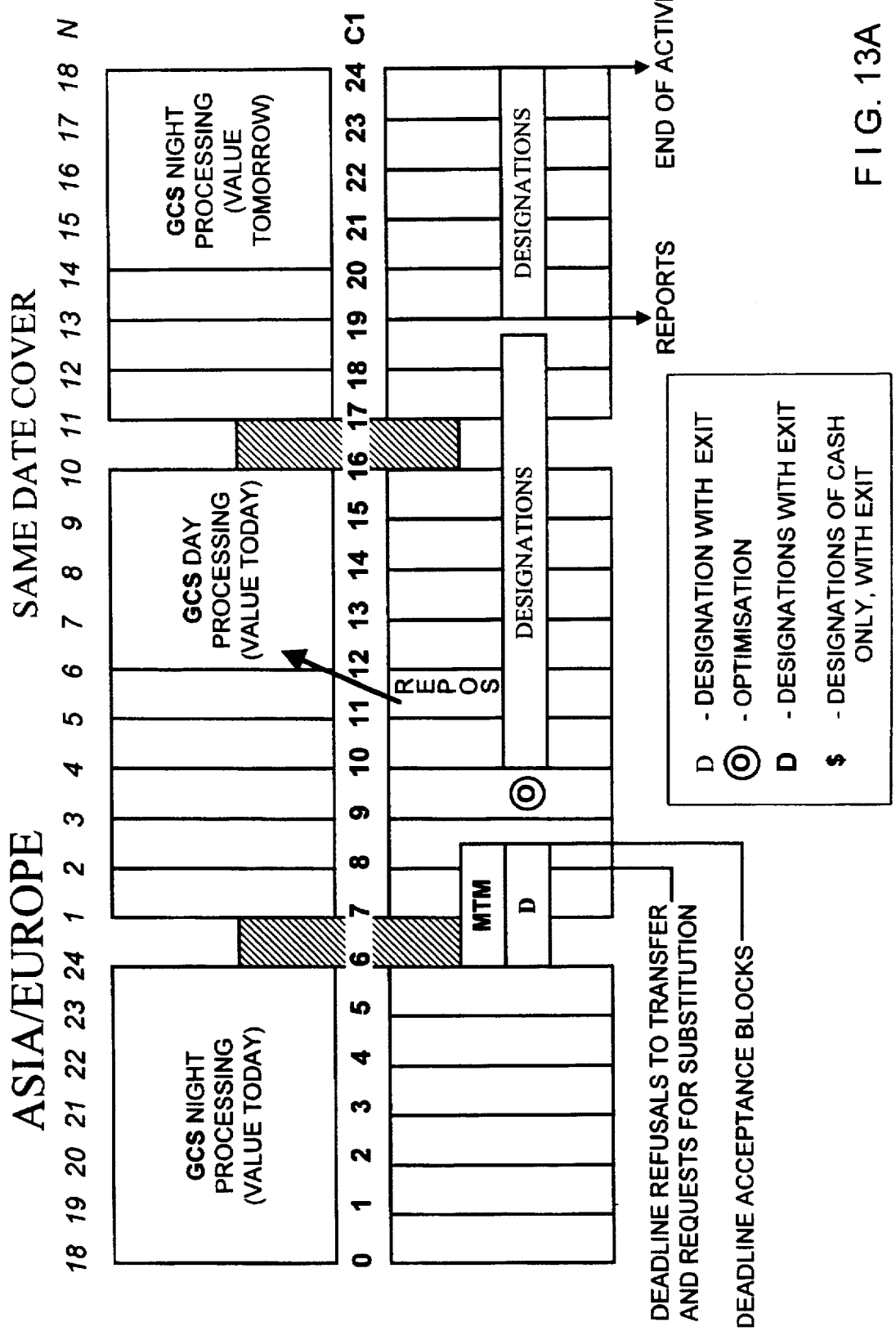
FIGS. 13A and 13B provide a schematic diagram of the user activity of the GCSS by different parties (i.e., customers) in different time-zones, during a 24 hour period of system operation, in which same day cover is provided by the GCSS.
Figure 13B:
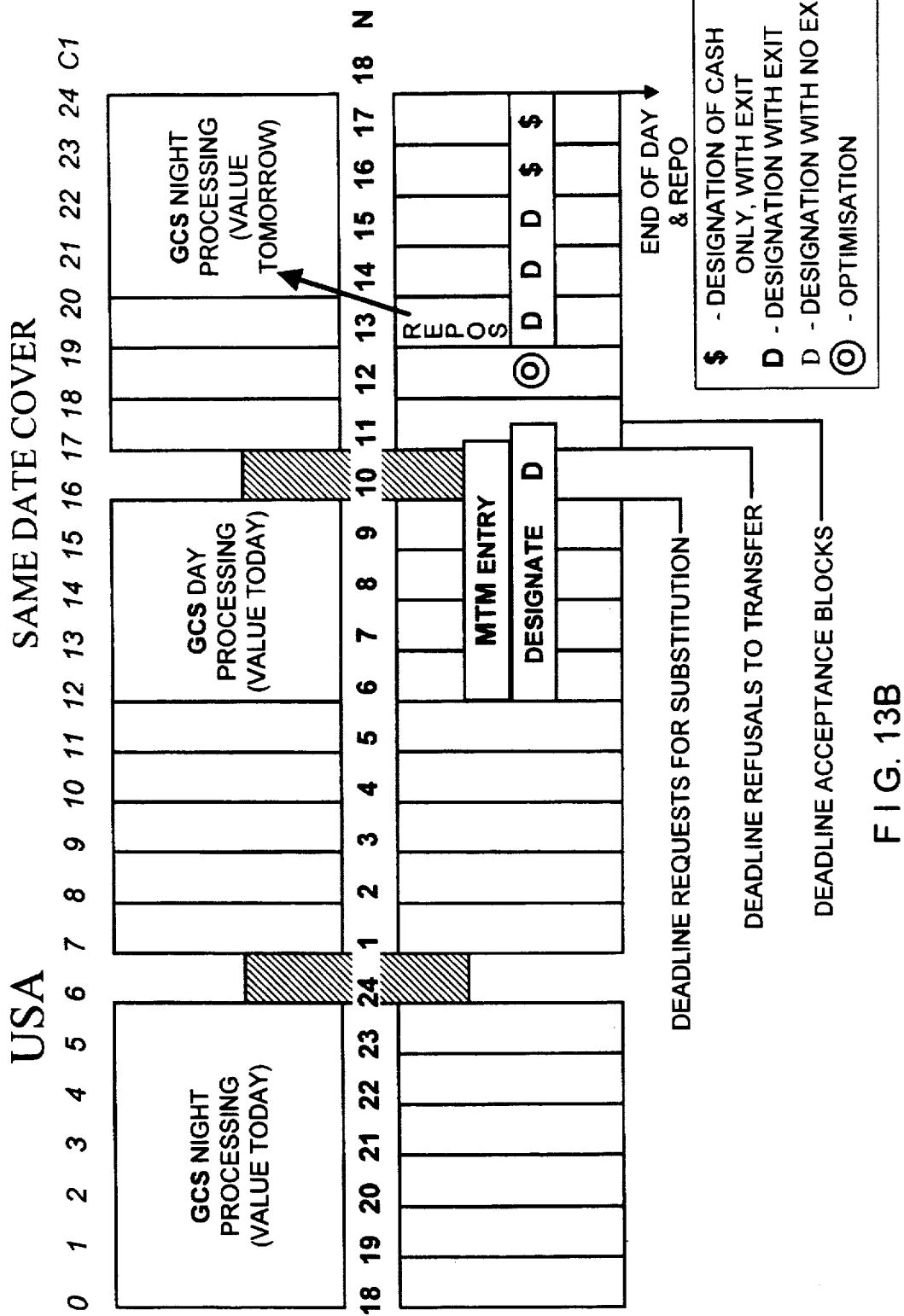

As illustrated in FIGS. 13A to 13B, the GCSS supports Asian, American and European time zones by providing its customers in USA, Europe and Asia with the option of using one of two time-zone GCSS processing cycles in which asset movement optimization is performed. The first cycle shown in FIG. 13A is designed to accommodate GCSS customers in Asia and Europe, whereas the second cycle shown in FIG. 13B is designed to accommodate GCSS customers in the United States (USA). Costumers agree which of the two main cycles they will use as their cycle.

Using the GCSS, counterparties may enter their credit exposure figures (i.e., MTMs) at convenient times during the Notification Period, and will have an agreed period (i.e., Resolution Period) during which they may resolve disputes prior to entries becoming effective in the GCSS. Preferably, although not essential, the agreed period will be when it is expected that office personal supporting MTM computation and like processes are awake and working for the CGSS customer in the normal course of business. If there is no window of communication practicable between two counterparties, then they may choose to enter their exposure figures at different times, and use the GCSS to apply automated rules to determine the effective credit exposure to be used as a basis for processing.

Exposure Entry Period

In FIGS. 14A and 14B, the different phases of a Global Credit Support Processing Cycle (GCSPC) about which Asset Movement Optimization revolves is shown in greater detail.

As illustrated in FIG. 14A, at about 5 or so hours before the Asset Movement Optimization Process is prescheduled to occur, GCSS customers are provided a time window (the "Notification Period") within which they may or may not transmit by way of their GCSS Customer Workstation, their exposure number (i.e., mark-to-market figure) for each credit support agreement. During the Notification Period, the users may see their counterparties' entered credit exposure figure only if they have entered their own into the system. After the Cut-Off Time, no more exposure entries are accepted and final exposure reports are generated by the GCSS.

During the Resolution Period, the counterparties to each credit support agreement are provided an opportunity to correct by amendment errors in their entered figures, or resolve any disputes that may arise with regard to exposure figure differences between the counterparties. Up until the end of the Notification Period, counterparties may send in new credit exposure figures, and only if they have done so before the Notification Period, may they amend their credit exposures up until the Cut-off Time. At the end of the Cut-Off Time, the GCSS will consider only the most recent received credit exposure figure, unless credit exposures have been locked-in through the non-dispute mechanism which will be described in greater details hereinafter.

After the Cut-Off Time, the GCSS automatically computes the Basis using the rules embodied within subprocess C230 described above, and then using the determined Basis, computes the Credit Support Amount. Then using the computed Credit Support Amount, the GCSS thereafter automatically computes the Delivery and Return Amounts, which are then rounded using agreed upon rounding procedures.

At this stage of the GCSS process, the GCSS automatically reports to each pair of counterparties, the total figure of credit support assets required to cover the total credit exposure therebetween using either U.S. Treasuries or U.S. Dollars. These amounts, the Delivery and Return Amounts (i.e., Amounts to Move) and the Basic Amount, are reported as separate line items to the counterparties of the corresponding credit support agreement.

At this stage of the GCS process, each GCSS customer is presented with at least three options, namely: (1) to issue one or more asset movement instructions and cover counterparty exposure by asset movement designations; (2) issue one or more asset movement instructions and then await for the Asset Movement Optimization Process to automatically cover the computed required credit exposures; or (3) simply await for the Asset Movement Optimization Process to automatically cover the computed required credit exposures.

Below is a summary of the various instructions that GCSS users may issue to the GCSS by way of pressing function buttons on workstation GUI-screens prior to the asset movement stages of the GCSS process: Release of Securities Instruction; On-Transfer of Asset Instruction (rehypothocation); Instant Asset Allocation (i.e., Cover My Counterparties Now); Designation of Asset Movement Instruction; Refusal to Deliver Asset Instruction; Decline to Accept Instruction; Exclude from Optimization (i.e., Freeze) Instruction; Release Asset from GCSS Instruction; Repo (Repurchase) Asset Instruction; and Recall of Assets Instruction.

In the illustrative embodiment, there are a number of ways in which to move assets to cover outstanding credit exposures using asset-related transfer instructions (i.e., requests) which are issued by the manual initiation by the GCSS customer. Various techniques for moving credit support assets within the GCSS will be described briefly below.

Credit support assets can be transferred between GCSS customers (i.e., counterparties to a credit support agreement) by issuing asset movement instructions to the LCS system.

When covering credit exposure using U.S. Treasuries and/or USD, these assets can be transferred into the Omnibus Account by way of the Fedwire.

When using non-U.S. securities and cash assets to cover credit exposure, the transfer of these assets are handled through the LCS system. In such instances, special statements are required in the instructions to identify that an asset is to be transferred into a particular GCSS slot in the Omnibus Account of the LCS system. For outbound assets, the GCSS creates a special instruction to the LCS system in order to move a security out of the GCSS omnibus account and send it to an outside party.

Real-time credit support asset transfers between GCSS and non-GCSS customers can be achieved by way of asset-related instructions which transfer assets into or out of the GCSS account.

As shown in FIG. 15A, GCSS customers who choose not to cover by "manually initiated" asset movement, may choose to participate in the Asset Movement Optimization Process of the GCSS. In this mode of system operation, the GCSS of the illustrative embodiment automatically determines for each set of participating counterparties $\{i,j\}$ all of the set of Amount to Moves, i.e., $\{ATM(k,i-j)\}$, which minimizes the total market value of the assets transferred among the counterparties considered in Asset Movement Optimization Model. In one illustrative embodiment, the GCSS uses the computed ATMs to automatically and simultaneously move the assets between the GCSS accounts thereof, and thereafter transmit each of the counterparties a complete report of the completed asset movement operations, the resulting positions of the counterparties, etc. In an alternative embodiment, the customers can be given the option to cover their credit exposures using the Optimized Accounts to move (i.e., Delivery and Return Amount), in which case the resulting ATMs are considered asset movement proposals, rather than asset movement instructions to be automatically carried out by the GCSS. In this alternative or optional mode of operation, the counterparties are provided additional control over their assets, but may not choose to cover in the most efficient manner for one reason or another.

As illustrated in FIG. 14B, the GCSS will thereafter automatically notify a customer of the need to bring more assets into the system to meet new, higher credit support requirements, as well as to cover an adverse movement in the value of priorly provided credit support assets. This is the equivalent of a "margin call". During this shortfall/EXCESS Notification Period, the GCSS will also notify a customer of an excess of credit support assets.

Customers are given a time period after "Shortfall Notification," in which to manually moved assets in order to cure the notified shortfall in credit support assets. In order to achieve a cure thereof, each GCSS customer may move assets to their GCSS account using any one of the following ways: (1) transferring eligible assets from a clearing and settlement account in the LCS subsystem operated by the GCSS or other Operator (i.e.,these transfers are effected by book-entry via the next available daytime or nighttime GCSS processing cycle); (2) providing the GCSS Operator with a power of attorney to draw assets from a clearing and settlement account in LCS system, and transfer them to the customer's GCSS account; (3) entering into a securities borrowing arrangement within the LCS subsystem to obtain a loan of the required securities; or (4) moving eligible securities over a cross-border link into the customer's GCSS account in the LCS system, by instructing the GCSS Operator to deliver eligible securities to the designated depository for those securities, for subsequent deposit into the customer's GCSS account. Such deliveries to GCSS are timed according to the cross-border link being used.

Credit exposure and asset management are facilitated by the GCSS periodically reporting to each customer on the following matters: available positions, i.e., customer's own securities/cash which it originated into the system and which are not in use; amounts delivered out, grouped by secured party and agreement number; amounts received, grouped by transferor and agreement number; amounts on-transferred, sub-divided by the IDs of transferor and on-transferee, and agreement numbers; new credit support amounts expected in from counterparties; new credit support amounts required ("margin call"); and exceptions (shortages not yet adjusted, etc.).

As a result of such reporting, GCSS customers are able to monitor their credit exposures and assets in GCSS. Accurate information on credit support requirements and excess assets enable more efficient asset management. As the timing of GCS processing cycles are "sandwiched" between the processing cycles of the LCS system in the illustrative embodiment, efficient delivery of securities into the GCSS (and removal therefrom) for trading purposes is greatly facilitated.

In general, the GCSS provides a number of custodial functions including account reporting, coupon and dividend payments, billing, etc.

For example, various type of reports can be produced for GCSS participants. Where a customer has several account, GCSS shall aggregate their accounts so that they have a consolidated view of their assets position. Reports provide for roll-ups and hierarchical account structures that customers create in the GCSS.

The GCSS credit income from GCSS securities directly to the originator as long as the security remains in the GCSS. As described hereinabove, this is achieved in the GCSS by maintaining for every security position (i.e., sum of asset pieces) a notation of its originator, regardless of actual position in the system as a result of asset re-use (i.e., transfers and on-transfers). This functionality makes it easier to satisfy the general requirements in credit support agreements that the secured party or transferee make payments to the pledgor, chargor, or transferor in amounts equal to any income derived on securities.

The GCSS ensures that coupons are paid directly to the original owner of the security. This is based on GCSS balances at record date. Because GCSS has no knowledge of a non-GCSS party, it is necessary for the GCSS customer to issue all coupon payments to their non-GCSS counterparties.

The GCSS will credit income from cash balances in the GCSS to the holder of cash.

In the illustrative embodiment, GCSS customers would be charged by the GCSS Operator for: securities transfers into and out of the GCSS; the average (daily) number of Credit Support Agreements held in any month; the value of the actual assets for which GCSS Operator is custodian; the (average daily) value of assets on-transferred within the GCSS; customer-initiated substitutions; out-of-pocket expenses incurred in relation to securities which exit or enter the system; and extraordinary expenses incurred by the GCSS Operator relating to specific customers.

A comprehensive audit trail can be created so that all GCSS transactions can be recreated for audit, regulatory, and recovery purposes.

While the illustrative embodiment of the GCSS described above will have many applications in the financial industry, it is understood that various modifications thereto will occur to those with ordinary skill in the art. However, all such modifications and variations are deemed to be within the scope and spirit of the present invention as defined by the accompanying claims to invention.

What is claimed is:

1. A computer-based information network for use by a plurality of users located in remote locations around the globe in order to manage credit support agreements between parties engaged in financial transactions, said computer-based information network comprising:

(1) information storage means for recording various types of information including
  (a) credit support agreement information representative of the terms of at least one credit support agreement between a pair of counterparties, wherein each said counterparty has assets providable as collateral to the other said counterparty for covering a credit exposure existing between said counterparties during a specified time period,
  (b) asset specifying information representative of the amount and type of assets of each said counterparty during said specified time period, which can be provided by one said counterparty to the other said counterparty as a credit support amount to cover credit exposure existing therebetween in accordance with the terms of said credit exposure agreement,
  (c) credit exposure information representative of credit exposure figures which may have been entered into said information storage means by said counterparties during said specified time period,
  (d) credit support amount information representative of the amount of assets required to be provided by one said counterparty to the other said counterparty under said credit support agreement, based on the credit exposure figures that may have been entered into acid information storage means during said specified time period, and
  (e) credit support asset information representative of the assets provided by one said counterparty to the other said counterparty as credit support assets to cover at least a portion or the credit exposure existing therebetween during said (predetermined) specified time period;

(2) information processing means for processing one or more of said various types of information items recorded in said information storage means in order to
  (a) compute said credit support amount using said credit support agreement information, said credit exposure information and said credit support amount information, and
  (b) update the status of said credit support asset information to reflect the amount and type of assets provided by one said counterparty to the other said counterparty to cover at least a portion of said computed credit support amount during said specified time period;

(3) information entry means for entering said information into said information storage means; and (4) information display means for displaying said information to users of said computer-based information network.

2. The computer-based information network of claim 1, wherein said information storage means comprises a relational database having a plurality of interrelated information storage structures, each said information storage structure having a plurality of information fields for storage of information items of a prespecified type.

3. The computer-based information network of claim 1, wherein said information entry means comprises a plurality of remotely located computer-based systems, and said information storage means and said information processing means comprise at least one centrally-located computer-based system.

4. The computer-based information network of claim 1, wherein the credit exposure figures of each pair of said counterparties are entered into said information storage means expressed in the form of mark-to-market figures derived from the underlying transactions between said counterparties under said credit support agreement.

5. The computer-based information network of claim 4, wherein the mark-to-market figure entered into said information storage means by one slid counterparty is not displayed to paid other counterparty unless said other counterparty has entered its mark-to-market figure into said information storage means.

6. The computer-based information network of claim 1, wherein said credit support agreement information further comprises information representative of a plurality of pairs of counterparties, each said pair of counterparties having at least one credit support agreement therebetween, and information representative of said at least one said credit support agreement between each said pair of counterparties.

7. The computer-based information network of claim 6, wherein said credit support agreement information further comprises information representative of a plurality of pairs of counterparties, each said pair of counterparties having at least one credit support agreement therebetween, and information representative of said at least one said credit support agreement between each said pair of counterparties.

8. The computer-based information network of claim 7, wherein at least one of said information structures includes an information storage field which stores information items representative of a chain of asset movement with respect to one or more of said credit support assets, reflecting the re-use thereof among said plurality of counterparties.

9. A computer-based information network for managing credit exposure between counterparties to a plurality of credit support agreements, comprising:

(1) an information storage system for storing various types of information including information representative of
  (a) assets of counterparties to a plurality of credit support agreements for use in covering credit exposures thereof over a specified time period, and
  (b) said plurality of credit support agreements; and (2) an information processing means for processing said information representative of said assets in order to effectively reflect a movement of certain of said assets to cover said credit exposures over said specified time period, wherein said information processing means further comprises asset movement optimization means for determining an optimal movement of certain of said assets to cover said credit exposures over said specified time period, and wherein said asset movement optimization means comprises a computational process which utilizes an objective function and a system of constraints related to the market value of said assets at about said specified time period, which are available for use in covering said credit exposures of said plurality of counterparties.

10. A computer-based information system for use by a plurality of users located in remote locations around the globe in order to manage credit support agreements between parties engaged in financial transactions, said computer-based information system comprising:

(1) information storage means for recording various types of information items including
  (a) credit support agreement information representative of the terms of at least one credit support agreement between a pair of counterparties, wherein each said counterparty has assets providable as collateral to the other said counterparty for covering a credit exposure between said counterparties during a specified time period,
  (b) asset specifying information representative of the amount and type of assets of each said counterparty during said specified time period, which can be provided by one said counterparty to the other said counterparty as a credit support amount to cover the credit exposure existing therebetween in accordance with the terms of said credit exposure agreement,
  (c) credit exposure information representative of the credit exposure figures-s which may have been entered into said information storage means by said counterparties during said specified time period,
  (d) credit support amount information representative of the amount of assets required to be provided by one said counterparty to the other said counterparty under said credit support agreement, based on the credit exposure figures that may have been entered into said information storage means during said specified time period, and
  (e) credit support asset information representative of the assets provided by one said counterparty to the other said counterparty as credit support assets to cover at least a portion of the credit exposure existing therebetween during said specified time period;

(2) information processing means for processing one or more of said various types of information items recorded in said information storage means in order to
  (a) compute said credit support amount using said credit support agreement information, said credit exposure information and said credit support amount information, and
  (b) update the status of said credit support asset information representative to reflect the amount and type of assets provided by one said counterparty to the other said counterparty to cover at least a portion of said computed credit support amount during said specified time period;

(3) information entry means for entering said information into said information storage means; and (4) information display means for displaying said information to users of said computer-based system.

* * * * *